(12) United States Patent
Santhanam et al.

(10) Patent No.: US 11,877,169 B2
(45) Date of Patent: Jan. 16, 2024

(54) TECHNIQUES FOR USER EQUIPMENT POWER SAVING

(71) Applicant: QUALCOMM Incorporated, San Diego, CA (US)

(72) Inventors: Arvind Vardarajan Santhanam, San Diego, CA (US); Brian Clarke Banister, San Diego, CA (US); Kuo-Chun Lee, San Diego, CA (US); Bhupesh Manoharlal Umatt, Poway, CA (US); Nitin Pant, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 234 days.

(21) Appl. No.: 17/529,113

(22) Filed: Nov. 17, 2021

(65) Prior Publication Data

US 2022/0174522 A1   Jun. 2, 2022

Related U.S. Application Data

(60) Provisional application No. 63/120,580, filed on Dec. 2, 2020.

(51) Int. Cl.
*H04L 12/26* (2006.01)
*H04W 24/08* (2009.01)
(Continued)

(52) U.S. Cl.
CPC ........... *H04W 24/08* (2013.01); *H04L 5/0048* (2013.01); *H04W 24/10* (2013.01); *H04W 36/08* (2013.01)

(58) Field of Classification Search
CPC ..... H04W 24/08; H04W 24/10; H04W 36/08; H04W 36/30; H04W 48/20; H04L 5/0048; H04L 5/001
See application file for complete search history.

(56) References Cited

U.S. PATENT DOCUMENTS 9,357,464 B2 *  5/2016  Olofsson ............. H04W 36/245
10,313,951 B2 *  6/2019  Fujishiro ............... H04W 36/30
(Continued)

FOREIGN PATENT DOCUMENTS

CN      110402594 A  * 11/2019  ............ H04W 24/10
EP        3087778 B1 *  6/2018  ........... G01S 5/0252
(Continued)

OTHER PUBLICATIONS

International Search Report and Written Opinion—PCT/US2021/059845—ISA/EPO—dated Mar. 14, 2022.

*Primary Examiner* — Thai D Hoang
(74) *Attorney, Agent, or Firm* — Dalei Dong; Holland & Hart LLP

(57) ABSTRACT

Methods, systems, and devices for wireless communications are described. A user equipment (UE) may be configured to receive a downlink transmission from a first cell, where the downlink transmission includes information for performing one or more actions associated with a second cell. The UE may identify a satisfaction of a trigger condition associated with one or more parameters at the UE based on a power level of the UE being less than or equal to a threshold power level, a throughput at the UE being less than or equal to a threshold throughput, or both. The UE may additionally identify at least one bandwidth associated with the second cell based on a previous wireless connection. The UE may compare, the at least one bandwidth associated with the second cell with a threshold bandwidth. The UE may then perform at least one action associated with a procedure based on the comparing.

30 Claims, 16 Drawing Sheets

(51) Int. Cl.
    *H04W 36/08*     (2009.01)
    *H04L 5/00*     (2006.01)
    *H04W 24/10*     (2009.01)

(56) References Cited

U.S. PATENT DOCUMENTS

| | | | |
|---|---|---|---|
| 11,632,787 B2* | 4/2023 | Xu | H04L 5/0094 370/329 |
| 2011/0188472 A1* | 8/2011 | Jeon | H04W 36/00837 370/331 |
| 2020/0351792 A1 | 11/2020 | Ghelichi | |
| 2020/0396682 A1* | 12/2020 | Vivanco | H04W 52/0209 |
| 2021/0160706 A1* | 5/2021 | Wu | H04B 7/0695 |
| 2021/0235356 A1* | 7/2021 | Lu | H04W 36/30 |
| 2021/0298000 A1* | 9/2021 | Park | H04W 72/23 |
| 2022/0132377 A1* | 4/2022 | Santhanam | H04W 52/367 |
| 2022/0303920 A1* | 9/2022 | Kim | H04W 52/367 |
| 2022/0353938 A1* | 11/2022 | Siomina | H04L 1/1854 |
| 2023/0209432 A1* | 6/2023 | Polaganga | H04W 36/30 370/332 |
| 2023/0232298 A1* | 7/2023 | Parichehrehteroujeni | H04W 36/0058 370/331 |

FOREIGN PATENT DOCUMENTS

| | | | | |
|---|---|---|---|---|
| WO | WO-2020142501 A1 * | 7/2020 | | H04L 5/001 |
| WO | WO-2020199228 A1 | 10/2020 | | |
| WO | WO-2020228011 A1 | 11/2020 | | |
| WO | WO-2021126798 A1 | 6/2021 | | |
| WO | WO-2023014894 A1 * | 2/2023 | | |

* cited by examiner

TECHNIQUES FOR USER EQUIPMENT POWER SAVING

CROSS REFERENCE

The present application for patent claims the benefit of U.S. Provisional Patent Application No. 63/120,580 by SANTHANAM et al., entitled "TECHNIQUES FOR USER EQUIPMENT POWER SAVING," filed Dec. 2, 2020, assigned to the assignee hereof, and hereby incorporated by reference in its entirety.

FIELD OF TECHNOLOGY

The following relates to wireless communications, including techniques for user equipment power saving.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support wireless communications over multiple radio access technologies, over multiple frequency ranges, or both. In some cases, a user equipment (UE) may experience varying levels of power consumption while communicating via different radio access technologies, different channels (e.g., different frequency ranges), or both. For example, communicating via NR or 5G radio access technologies may result in higher power consumption at the UE as compared to communicating via LTE or 4G radio access technologies. Further, channels associated with higher frequency ranges within NR/5G radio access technologies may be associated with larger bandwidths as compared to channels associated with lower frequency ranges within NR/5G radio access technologies. In this regard, higher frequency ranges within NR/5G radio access technologies may result in higher power consumption at the UE as compared to lower frequency ranges due to the larger bandwidths. Some conventional techniques have attempted to reduce power consumption at UEs based on bandwidths of given cells, but such conventional techniques have been found to be deficient.

SUMMARY

The described techniques relate to improved methods, systems, devices, and apparatuses that support techniques for user equipment power saving. Generally, the described techniques are directed to improved power savings techniques for a user equipment (UE). In particular, techniques described herein may enable a UE to establish wireless connections with New Radio (NR) and/or fifth generation (5G) cells within lower frequency ranges (e.g., smaller bandwidths) in order to prevent large increases in power consumption at the UE. In this regard, as compared to some power savings techniques which enact a blanket prohibition on NR/5G communications, techniques described herein may provide improved power saving granularity by enabling UEs to select (or avoid) specific channels (e.g., avoid specific frequency ranges/bandwidths) supported by NR/5G cells. For example, while communicating with a first cell (e.g., Long Term Evolution (LTE) cell, low-bandwidth NR cell) a UE may identify a trigger condition for implementing power-saving techniques. The trigger condition may include a low power state of the UE, a low throughput at the UE, a low mobility state at the UE, or the like. Subsequently, the UE may receive an indication for the UE to perform a procedure (e.g., cell addition procedure, cell handover procedure) with a second cell (e.g., high-bandwidth NR cell). In this example, the UE may compare a bandwidth of a channel associated with the second cell to a bandwidth threshold. If the bandwidth of the channel of the second cell is greater than or equal to the bandwidth threshold (and therefore associated with high power consumption), the UE may refrain from completing the procedure with the respective channel of the secondary cell. For instance, the UE may refrain from measuring reference signals and/or reporting measurements associated with the channel of the second cell in order to refrain from completing the procedure with the respective channel. Additionally or alternatively, the UE may enter an idle state or transmit an indication of a radio link failure (RLF) in order to refrain from completing the procedure with the respective channel. By enabling the UE to perform (or refrain from performing) procedures with channels of the second cell on a channel-by-channel basis, techniques described herein may support power savings techniques at the UE while simultaneously allowing the UE to establish NR/5G connections which are associated with lower power consumptions.

A method for wireless communication at a user equipment (UE) is described. The method may include receiving a downlink transmission from a first cell, the downlink transmission including information for performing one or more actions associated with a second cell, identifying a satisfaction of a trigger condition associated with one or more operational parameters at the UE based on a power level of the UE being less than or equal to a threshold power level, a throughput at the UE being less than or equal to a threshold throughput, or both, identifying, based on the satisfaction of the trigger condition, at least one bandwidth associated with the second cell based on a previous wireless connection between the second cell and the UE, a previous wireless connection between the second cell and an additional UE, or both, comparing the at least one bandwidth associated with the second cell with a threshold bandwidth, and performing at least one action associated with a procedure based on the comparing.

An apparatus for wireless communication at a UE is described. The apparatus may include a processor, memory coupled with the processor, and instructions stored in the memory. The instructions may be executable by the processor to cause the apparatus to receive a downlink transmission from a first cell, the downlink transmission including information for performing one or more actions associated with a second cell, identify a satisfaction of a trigger condition associated with one or more operational parameters at the UE based on a power level of the UE being less than or equal to a threshold power level, a throughput at the UE being less than or equal to a threshold throughput, or both, identify, based on the satisfaction of the trigger condition, at least one bandwidth associated with the second cell based on a previous wireless connection between the second cell and the UE, a previous wireless connection between the second cell and an additional UE, or both, compare the at least one bandwidth associated with the second cell with a threshold bandwidth, and perform at least one action associated with a procedure based on the comparing.

Another apparatus for wireless communication at a UE is described. The apparatus may include means for receiving a downlink transmission from a first cell, the downlink transmission including information for performing one or more actions associated with a second cell, means for identifying a satisfaction of a trigger condition associated with one or more operational parameters at the UE based on a power level of the UE being less than or equal to a threshold power level, a throughput at the UE being less than or equal to a threshold throughput, or both, means for identifying, based on the satisfaction of the trigger condition, at least one bandwidth associated with the second cell based on a previous wireless connection between the second cell and the UE, a previous wireless connection between the second cell and an additional UE, or both, means for comparing the at least one bandwidth associated with the second cell with a threshold bandwidth, and means for performing at least one action associated with a procedure based on the comparing.

A non-transitory computer-readable medium storing code for wireless communication at a UE is described. The code may include instructions executable by a processor to receive a downlink transmission from a first cell, the downlink transmission including information for performing one or more actions associated with a second cell, identify a satisfaction of a trigger condition associated with one or more operational parameters at the UE based on a power level of the UE being less than or equal to a threshold power level, a throughput at the UE being less than or equal to a threshold throughput, or both, identify, based on the satisfaction of the trigger condition, at least one bandwidth associated with the second cell based on a previous wireless connection between the second cell and the UE, a previous wireless connection between the second cell and an additional UE, or both, compare the at least one bandwidth associated with the second cell with a threshold bandwidth, and perform at least one action associated with a procedure based on the comparing.

In some examples of the method, apparatuses, and non-transitory computer-readable medium described herein, performing the at least one action associated with the procedure may include operations, features, means, or instructions for refraining from completing the procedure associated with the channel supported by the second cell based on the at least one bandwidth associated with the channel being greater than or equal to the threshold bandwidth.

In some examples of the method, apparatuses, and non-transitory computer-readable medium described herein, performing the at least one action associated with the procedure may include operations, features, means, or instructions for completing the procedure associated with the channel supported by the second cell based on the at least one bandwidth associated with the channel being less than or equal to the threshold bandwidth.

In some examples of the method, apparatuses, and non-transitory computer-readable medium described herein, identifying the at least one bandwidth associated with the second cell may include operations, features, means, or instructions for determining the at least one bandwidth associated with the second cell based on the previous wireless connection between the second cell and the UE, where the downlink transmission may be received after communicating with the second cell and storing the at least one bandwidth in memory.

In some examples of the method, apparatuses, and non-transitory computer-readable medium described herein, identifying the at least one bandwidth associated with the second cell may include operations, features, means, or instructions for transmitting, to the first cell, the second cell, a second UE, or any combination thereof, a request for information associated with the at least one bandwidth of the second cell based on the satisfaction of the trigger condition and receiving an indication of the at least one bandwidth associated with the second cell in response to the request, where identifying the at least one bandwidth may be based on the indication.

Some examples of the method, apparatuses, and non-transitory computer-readable medium described herein may further include operations, features, means, or instructions for identifying that the trigger condition may have been satisfied may be based on identifying that the UE may be in an idle mode of operation or a connected mode of operation.

Some examples of the method, apparatuses, and non-transitory computer-readable medium described herein may further include operations, features, means, or instructions for transmitting, to the first cell, an uplink transmission indicating the satisfaction of the trigger condition and receiving, from the first cell based on transmitting the uplink transmission, a second downlink transmission including information for performing the at least one action associated with the procedure.

In some examples of the method, apparatuses, and non-transitory computer-readable medium described herein, performing the at least one action may include operations, features, means, or instructions for receiving the one or more reference signals from the second cell, the one or more reference signals associated with a set of channels supported by the second cell, performing a set of measurements for the one or more reference signals received from the second cell, and transmitting, to the first cell, a measurement report based on performing the set of measurements, where the measurement report omits measurements associated with one or more channels of the set of channels based on the at least one bandwidth associated with the one or more channels being greater than or equal to the threshold bandwidth.

In some examples of the method, apparatuses, and non-transitory computer-readable medium described herein, performing the at least one action may include operations, features, means, or instructions for receiving, from the second cell, a reference signal associated with a channel supported by the second cell, where the at least one bandwidth may be associated with the channel and refraining from performing measurements for the received reference signal based on the at least one bandwidth associated with the channel being greater than or equal to the threshold bandwidth.

In some examples of the method, apparatuses, and non-transitory computer-readable medium described herein, performing the at least one action may include operations, features, means, or instructions for transmitting, to the first cell, an uplink transmission associated with a radio link failure at the UE based on the at least one bandwidth being greater than or equal to the threshold bandwidth.

In some examples of the method, apparatuses, and non-transitory computer-readable medium described herein, performing the at least one action may include operations, features, means, or instructions for receiving one or more reference signals from the second cell, the one or more reference signals associated with a set of channels supported by the second cell, performing a set of measurements for the one or more reference signals received from the second cell, and transmitting, to the first cell, a measurement report based on performing the set of measurements, where the measurement report omits measurements associated with one or more channels of the set of channels based on the at least one bandwidth associated with the one or more channels being greater than or equal to the threshold bandwidth.

In some examples of the method, apparatuses, and non-transitory computer-readable medium described herein, performing the at least one action may include operations, features, means, or instructions for receiving, from the second cell, a reference signal associated with a channel supported by the second cell and refraining from performing measurements for the received reference signal based on the at least one bandwidth associated with the channel being greater than or equal to the threshold bandwidth.

In some examples of the method, apparatuses, and non-transitory computer-readable medium described herein, performing the at least one action may include operations, features, means, or instructions for transmitting, to the first cell, an uplink transmission associated with a radio link failure at the UE based on the at least one bandwidth being greater than or equal to the threshold bandwidth.

In some examples of the method, apparatuses, and non-transitory computer-readable medium described herein, performing the at least one action may include operations, features, means, or instructions for entering an idle mode of operation based on the at least one bandwidth being greater than or equal to the threshold bandwidth.

Some examples of the method, apparatuses, and non-transitory computer-readable medium described herein may further include operations, features, means, or instructions for identifying the at least one bandwidth associated with the second cell based on an indication of the at least one bandwidth included within the downlink transmission.

In some examples of the method, apparatuses, and non-transitory computer-readable medium described herein, the procedure includes a cell handover procedure, a cell addition procedure, a cell change procedure, a cell redirection procedure, or any combination thereof.

In some examples of the method, apparatuses, and non-transitory computer-readable medium described herein, the first cell may be associated with a first radio access technology, and the second cell may be associated with a second radio access technology different from the first radio access technology.

In some examples of the method, apparatuses, and non-transitory computer-readable medium described herein, the first radio access technology includes a long-term evolution radio access technology, a fourth generation radio access technology, or both and the second radio access technology includes a New Radio access technology, a fifth generation radio access technology, or both.

In some examples of the method, apparatuses, and non-transitory computer-readable medium described herein, the first cell and the second cell may be associated with a common radio access technology.

In some examples of the method, apparatuses, and non-transitory computer-readable medium described herein, the common radio access technology includes a New Radio access technology, a fifth generation radio access technology, or both.

A method for wireless communication at a UE is described. The method may include identifying a satisfaction of a trigger condition associated with one or more operational parameters at the UE based on a power level of the UE being less than or equal to a threshold power level, a throughput at the UE being less than or equal to a threshold throughput, or both, identifying, based on the satisfaction of the trigger condition, at least one bandwidth associated with a second cell based on a previous wireless connection between the second cell and the UE, a previous wireless connection between the second cell and an additional UE, or both, comparing, the at least one bandwidth associated with the second cell with a threshold bandwidth, selectively adjusting one or more parameters for performing one or more actions associated with the second cell based on the comparing, and performing at least one action associated with a procedure based on the adjusting.

An apparatus for wireless communication at a UE is described. The apparatus may include a processor, memory coupled with the processor, and instructions stored in the memory. The instructions may be executable by the processor to cause the apparatus to identify a satisfaction of a trigger condition associated with one or more operational parameters at the UE based on a power level of the UE being less than or equal to a threshold power level, a throughput at the UE being less than or equal to a threshold throughput, or both, identify, based on the satisfaction of the trigger condition, at least one bandwidth associated with a second cell based on a previous wireless connection between the second cell and the UE, a previous wireless connection between the second cell and an additional UE, or both, compare, the at least one bandwidth associated with the second cell with a threshold bandwidth, selectively adjust one or more parameters for performing one or more actions associated with the second cell based on the comparing, and perform at least one action associated with a procedure based on the adjusting.

Another apparatus for wireless communication at a UE is described. The apparatus may include means for identifying a satisfaction of a trigger condition associated with one or more operational parameters at the UE based on a power level of the UE being less than or equal to a threshold power level, a throughput at the UE being less than or equal to a threshold throughput, or both, means for identifying, based on the satisfaction of the trigger condition, at least one bandwidth associated with a second cell based on a previous wireless connection between the second cell and the UE, a previous wireless connection between the second cell and an additional UE, or both, means for comparing, the at least one bandwidth associated with the second cell with a threshold bandwidth, means for selectively adjusting one or more parameters for performing one or more actions associated with the second cell based on the comparing, and means for performing at least one action associated with a procedure based on the adjusting.

A non-transitory computer-readable medium storing code for wireless communication at a UE is described. The code may include instructions executable by a processor to identify a satisfaction of a trigger condition associated with one or more operational parameters at the UE based on a power level of the UE being less than or equal to a threshold power level, a throughput at the UE being less than or equal to a threshold throughput, or both, identify, based on the satisfaction of the trigger condition, at least one bandwidth associated with a second cell based on a previous wireless connection between the second cell and the UE, a previous wireless connection between the second cell and an additional UE, or both, compare, the at least one bandwidth associated with the second cell with a threshold bandwidth, selectively adjust one or more parameters for performing one or more actions associated with the second cell based on the comparing, and perform at least one action associated with a procedure based on the adjusting.

In some examples of the method, apparatuses, and non-transitory computer-readable medium described herein, performing the at least one action associated with the procedure may include operations, features, means, or instructions for refraining from completing the procedure associated with the channel supported by the second cell based on the at least one bandwidth associated with the channel being greater than or equal to the threshold bandwidth.

In some examples of the method, apparatuses, and non-transitory computer-readable medium described herein, performing the at least one action associated with the procedure may include operations, features, means, or instructions for completing the procedure associated with the channel supported by the second cell based on the at least one bandwidth associated with the channel being less than or equal to the threshold bandwidth.

In some examples of the method, apparatuses, and non-transitory computer-readable medium described herein, identifying the at least one bandwidth associated with the second cell may include operations, features, means, or instructions for determining the at least one bandwidth associated with the second cell based on the previous wireless connection between the second cell and the UE and storing the at least one bandwidth in memory.

Some examples of the method, apparatuses, and non-transitory computer-readable medium described herein may further include operations, features, means, or instructions for transmitting, to a first cell, an uplink transmission indicating the satisfaction of the trigger condition and receiving, from the first cell based on transmitting the uplink transmission, a downlink transmission including additional information for performing the at least one action associated with the procedure.

In some examples of the method, apparatuses, and non-transitory computer-readable medium described herein, selectively adjusting the one or more parameters may include operations, features, means, or instructions for selectively increasing a reference signal received power threshold, a reference signal received quality threshold, or both.

In some examples of the method, apparatuses, and non-transitory computer-readable medium described herein, and the method, apparatuses, and non-transitory computer-readable medium may include further operations, features, means, or instructions for receiving one or more reference signals from the second cell, the one or more reference signals associated with one or more channels supported by the second cell, performing a set of measurements for the one or more reference signals received from the second cell, and determining that measurements associated with the one or more channels satisfy the reference signal received power threshold, the reference signal received quality threshold, or both, where performing the at least one action may be based on determining that the measurements associated with the one or more channels satisfy the reference signal received power threshold, the reference signal received quality threshold, or both.

In some examples of the method, apparatuses, and non-transitory computer-readable medium described herein, the measurements associated with the one or more channels satisfy the reference signal received power threshold if the measurements may be greater than or equal to the reference signal received power threshold and the measurements associated with the one or more channels satisfy the reference signal received quality threshold if the measurements may be greater than or equal to the reference signal received quality threshold.

A method for wireless communication at a UE is described. The method may include receiving a downlink transmission from a first cell, the downlink transmission including information for performing one or more actions associated with a second cell, identifying a trigger condition associated with one or more operational parameters at the UE is satisfied, comparing, based on the trigger condition being satisfied, one or more bandwidths associated with the second cell with a threshold bandwidth, and performing at least one action associated with a procedure based on the comparing.

An apparatus for wireless communication at a UE is described. The apparatus may include a processor, memory in electronic communication with the processor, and instructions stored in the memory. The instructions may be executable by the processor to cause the apparatus to receive a downlink transmission from a first cell, the downlink transmission including information for performing one or more actions associated with a second cell, identify a trigger condition associated with one or more operational parameters at the UE is satisfied, comparing, base at least in part on the trigger condition being satisfied, one or more bandwidths associated with the second cell with a threshold bandwidth, and perform at least one action associated with a procedure based on the comparing.

Another apparatus for wireless communication at a UE is described. The apparatus may include means for receiving a downlink transmission from a first cell, the downlink transmission including information for performing one or more actions associated with a second cell, means for identifying a trigger condition associated with one or more operational parameters at the UE is satisfied, means for comparing, based on the trigger condition being satisfied, one or more bandwidths associated with the second cell with a threshold bandwidth, and means for performing at least one action associated with a procedure based on the comparing.

A non-transitory computer-readable medium storing code for wireless communication at a UE is described. The code may include instructions executable by a processor to receive a downlink transmission from a first cell, the downlink transmission including information for performing one or more actions associated with a second cell, identify a trigger condition associated with one or more operational parameters at the UE is satisfied, comparing, base at least in part on the trigger condition being satisfied, one or more bandwidths associated with the second cell with a threshold bandwidth, and perform at least one action associated with a procedure based on the comparing.

Some examples of the method, apparatuses, and non-transitory computer-readable medium described herein may further include operations, features, means, or instructions for transmitting, to the first cell, an uplink transmission indicating that the trigger condition associated with the one or more operational parameters at the UE may have been satisfied and receiving, from the first cell based on transmitting the uplink transmission, a second downlink transmission including information for performing the at least one action associated with the procedure.

In some examples of the method, apparatuses, and non-transitory computer-readable medium described herein, performing the at least one action associated with the procedure may include operations, features, means, or instructions for refraining from completing the procedure associated with a channel supported by the second cell based on a bandwidth associated with the channel satisfying the threshold bandwidth.

In some examples of the method, apparatuses, and non-transitory computer-readable medium described herein, performing the at least one action associated with the procedure may include operations, features, means, or instructions for completing the procedure associated with a channel supported by the second cell based on a bandwidth associated with the channel failing to satisfy the threshold bandwidth.

In some examples of the method, apparatuses, and non-transitory computer-readable medium described herein, performing the at least one action may include operations, features, means, or instructions for receiving the one or more reference signals from the second cell, the one or more reference signals associated with a set of channels supported by the second cell, performing a set of measurements for the one or more reference signals received from the second cell, and transmitting, to the first cell, a measurement report based on performing the set of measurements, where the measurement report omits measurements associated with one or more channels of the set of channels based on a bandwidth associated with the one or more channels satisfying the threshold bandwidth.

In some examples of the method, apparatuses, and non-transitory computer-readable medium described herein, performing the at least one action may include operations, features, means, or instructions for receiving, from the second cell, a reference signal associated with a channel supported by the second cell; and refraining from performing measurements for the received reference signal based on a bandwidth associated with the channel satisfying the threshold bandwidth.

In some examples of the method, apparatuses, and non-transitory computer-readable medium described herein, performing the at least one action may include operations, features, means, or instructions for transmitting, to the first cell, an uplink transmission associated with a RLF at the UE based on the one or more bandwidths satisfying the threshold bandwidth.

In some examples of the method, apparatuses, and non-transitory computer-readable medium described herein, performing the at least one action may include operations, features, means, or instructions for receiving one or more reference signals from the second cell, the one or more reference signals associated with a set of channels supported by the second cell, performing a set of measurements for the one or more reference signals received from the second cell, and transmitting, to the first cell, a measurement report based on performing the set of measurements, where the measurement report omits measurements associated with one or more channels of the set of channels based on a bandwidth associated with the one or more channels satisfying the threshold bandwidth.

In some examples of the method, apparatuses, and non-transitory computer-readable medium described herein, performing the at least one action may include operations, features, means, or instructions for receiving, from the second cell, a reference signal associated with a channel supported by the second cell and refraining from performing measurements for the received reference signal based on a bandwidth associated with the channel satisfying the threshold bandwidth.

In some examples of the method, apparatuses, and non-transitory computer-readable medium described herein, performing the at least one action may include operations, features, means, or instructions for transmitting, to the first cell, an uplink transmission associated with a RLF at the UE based on the one or more bandwidths satisfying the threshold bandwidth.

In some examples of the method, apparatuses, and non-transitory computer-readable medium described herein, performing the at least one action may include operations, features, means, or instructions for entering an idle mode of operation based on the one or more bandwidths satisfying the threshold bandwidth.

Some examples of the method, apparatuses, and non-transitory computer-readable medium described herein may further include operations, features, means, or instructions for determining the one or more bandwidths associated with the second cell based on an indication of the one or more bandwidths included within the downlink transmission.

Some examples of the method, apparatuses, and non-transitory computer-readable medium described herein may further include operations, features, means, or instructions for determining the one or more bandwidths associated with the second cell based on a previous wireless connection between the UE and the second cell.

Some examples of the method, apparatuses, and non-transitory computer-readable medium described herein may further include operations, features, means, or instructions for transmitting a request for information associated with the one or more bandwidths of the second cell and receiving an indication of the one or more bandwidths of the second cell based on transmitting the request.

In some examples of the method, apparatuses, and non-transitory computer-readable medium described herein, the one or more operational parameters at the UE associated with the trigger condition include a power level of the UE, an absence of an external power source coupled to the UE, a mobility state of the UE, or any combination thereof.

In some examples of the method, apparatuses, and non-transitory computer-readable medium described herein, identifying the trigger condition associated with the one or more operational parameters at the UE may be satisfied may include operations, features, means, or instructions for identifying that the power level of the UE satisfies a power level threshold, identifying the mobility state of the UE satisfies a mobility state threshold, or both.

In some examples of the method, apparatuses, and non-transitory computer-readable medium described herein, the one or more operational parameters at the UE associated with the trigger condition include a throughput of wireless communications at the UE, an energy efficiency of wireless communications at the UE, a RSRP metric of wireless communications at the UE, or any combination thereof.

In some examples of the method, apparatuses, and non-transitory computer-readable medium described herein, identifying the trigger condition associated with the one or more operational parameters at the UE may be satisfied may include operations, features, means, or instructions for identifying that the throughput satisfies a threshold throughput, identifying that the energy efficiency satisfies a threshold energy efficiency, identifying that the RSRP metric satisfies a threshold RSRP, or any combination thereof.

In some examples of the method, apparatuses, and non-transitory computer-readable medium described herein, the procedure associated with the second cell includes a cell handover procedure, a cell addition procedure, a cell change procedure, a cell redirection procedure, or any combination thereof.

In some examples of the method, apparatuses, and non-transitory computer-readable medium described herein, a bandwidth of the one or more bandwidths associated with the second cell satisfies the threshold bandwidth if the bandwidth may be greater than or equal to the threshold bandwidth.

In some examples of the method, apparatuses, and non-transitory computer-readable medium described herein, the first cell may be associated with a first radio access technology, and the second cell may be associated with a second radio access technology different from the first radio access technology.

In some examples of the method, apparatuses, and non-transitory computer-readable medium described herein, the first radio access technology includes a LTE radio access technology, a 4G radio access technology, or both, and the second radio access technology includes an NR access technology, a 5G radio access technology, or both.

In some examples of the method, apparatuses, and non-transitory computer-readable medium described herein, the first cell and the second cell may be associated with a common radio access technology.

In some examples of the method, apparatuses, and non-transitory computer-readable medium described herein, the common radio access technology includes an NR access technology, a 5G radio access technology, or both.

A method for wireless communication at a UE is described. The method may include identifying a trigger condition associated with one or more operational parameters at the UE is satisfied while communicating with a first cell, comparing, based on the trigger condition being satisfied, one or more bandwidths associated with a second cell with a threshold bandwidth, selectively adjusting one or more parameters for performing one or more actions associated with the second cell based on the comparing, and performing at least one action associated with a procedure based on the adjusting.

An apparatus for wireless communication at a UE is described. The apparatus may include a processor, memory in electronic communication with the processor, and instructions stored in the memory. The instructions may be executable by the processor to cause the apparatus to identify a trigger condition associated with one or more operational parameters at the UE is satisfied while communicating with a first cell, comparing, base at least in part on the trigger condition being satisfied, one or more bandwidths associated with a second cell with a threshold bandwidth, selectively adjust one or more parameters for performing one or more actions associated with the second cell based on the comparing, and perform at least one action associated with a procedure based on the adjusting.

Another apparatus for wireless communication at a UE is described. The apparatus may include means for identifying a trigger condition associated with one or more operational parameters at the UE is satisfied while communicating with a first cell, means for comparing, based on the trigger condition being satisfied, one or more bandwidths associated with a second cell with a threshold bandwidth, means for selectively adjusting one or more parameters for performing one or more actions associated with the second cell based on the comparing, and means for performing at least one action associated with a procedure based on the adjusting.

A non-transitory computer-readable medium storing code for wireless communication at a UE is described. The code may include instructions executable by a processor to identify a trigger condition associated with one or more operational parameters at the UE is satisfied while communicating with a first cell, comparing, base at least in part on the trigger condition being satisfied, one or more bandwidths associated with a second cell with a threshold bandwidth, selectively adjust one or more parameters for performing one or more actions associated with the second cell based on the comparing, and perform at least one action associated with a procedure based on the adjusting.

Some examples of the method, apparatuses, and non-transitory computer-readable medium described herein may further include operations, features, means, or instructions for transmitting, to the first cell, an uplink transmission indicating that the trigger condition associated with the one or more operational parameters at the UE may have been satisfied and receiving, from the first cell based on transmitting the uplink transmission, a second downlink transmission including additional information for performing the at least one action associated with the procedure.

In some examples of the method, apparatuses, and non-transitory computer-readable medium described herein, performing the at least one action associated with the procedure may include operations, features, means, or instructions for refraining from completing the procedure associated with a channel supported by the second cell based on the adjusting and a bandwidth associated with the channel satisfying the threshold bandwidth.

In some examples of the method, apparatuses, and non-transitory computer-readable medium described herein, performing the at least one action associated with the procedure may include operations, features, means, or instructions for completing the procedure associated with a channel supported by the second cell based on a bandwidth associated with the channel failing to satisfy the threshold bandwidth.

In some examples of the method, apparatuses, and non-transitory computer-readable medium described herein, the one or more parameters include a cell reselection priority metric.

In some examples of the method, apparatuses, and non-transitory computer-readable medium described herein, selectively adjusting the one or more parameters may include operations, features, means, or instructions for selectively increasing a RSRP threshold, a RSRQ threshold, or both.

In some examples of the method, apparatuses, and non-transitory computer-readable medium described herein, and the method, apparatuses, and non-transitory computer-readable medium may include further operations, features, means, or instructions for receiving one or more reference signals from the second cell, the one or more reference signals associated with a set of channels supported by the second cell, performing a set of measurements for the one or more reference signals received from the second cell, and determining that measurements associated with the one or more channels satisfy the adjusted RSRP threshold, the adjusted RSRQ threshold, or both, where performing the at least one action may be based on determining that the measurements associated with the one or more channels satisfy the adjusted RSRP threshold, the adjusted RSRQ threshold, or both.

In some examples of the method, apparatuses, and non-transitory computer-readable medium described herein, the measurements associated with the one or more channels satisfy the adjusted RSRP threshold if the measurements may be greater than or equal to the adjusted RSRP threshold, and the measurements associated with the one or more channels satisfy the adjusted RSRQ threshold if the measurements may be greater than or equal to the adjusted RSRQ threshold.

DETAILED DESCRIPTION

Figure 1:
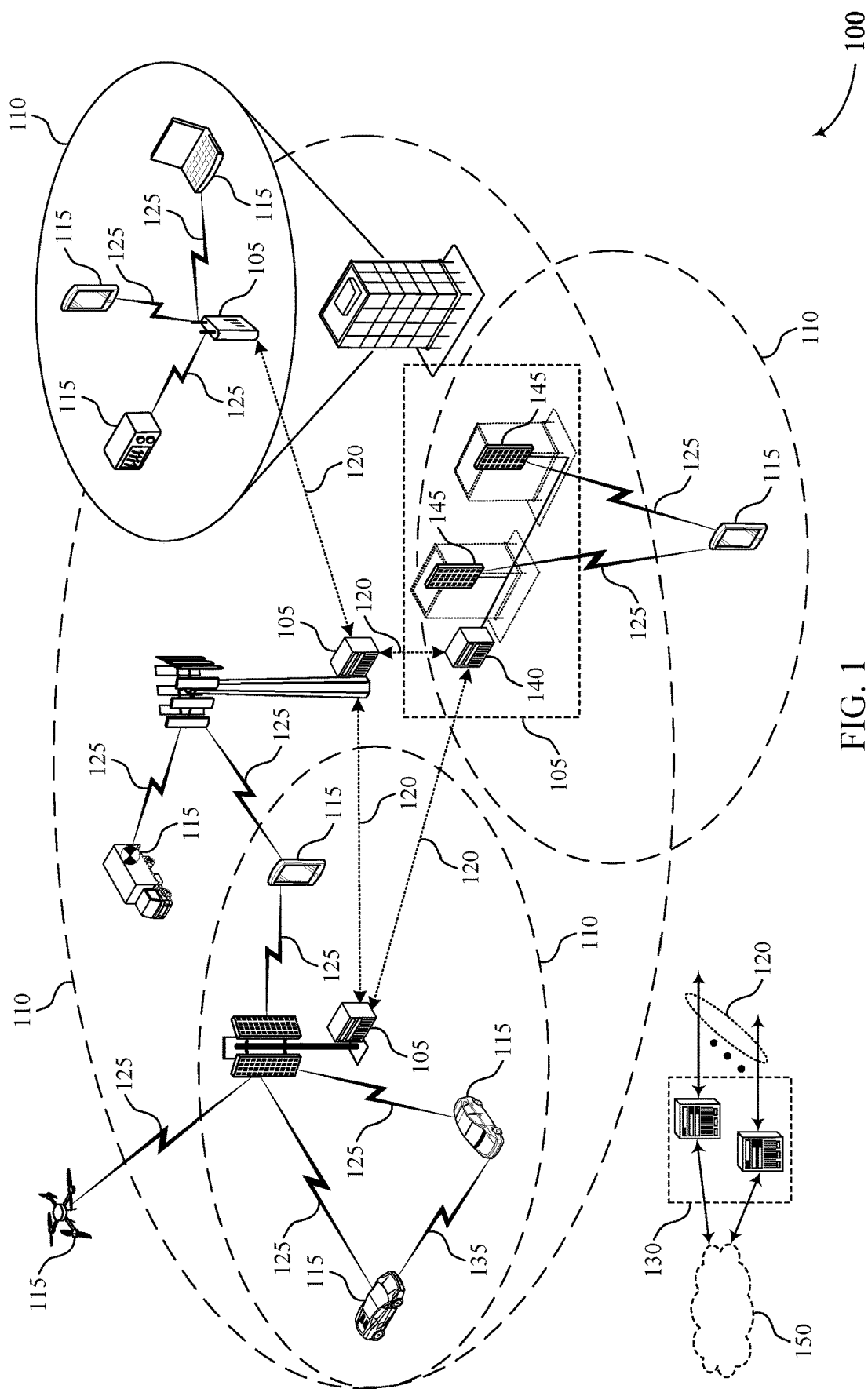
FIG. 1 illustrates an example of a wireless communications system that supports techniques for user equipment power saving in accordance with aspects of the present disclosure.

Some wireless communications systems may support wireless communications over multiple radio access technologies, over multiple frequency ranges, or both. In some cases, a user equipment (UE) may experience varying levels of power consumption while communicating via different radio access technologies, frequency ranges, or both. For example, communicating via New Radio (NR) or fifth generation (5G) radio access technologies may result in higher power consumption at the UE as compared to communicating via Long Term Evolution (LTE) or fourth generation (4G) radio access technologies. Further, channels associated with higher frequency ranges (e.g., 60-100 MHz frequency ranges) within NR/5G radio access technologies may be associated with larger bandwidths as compared to channels associated with lower frequency ranges (e.g., 20-40 MHz frequency ranges) within NR/5G radio access technologies. Thus, increasing channel bandwidths may be associated with higher power consumptions at the UE.

In cases where a UE is communicating with an LTE/4G cell, the network may attempt to perform a cell reselection procedure, a cell addition procedure, or another procedure in order to establish a connection between the UE and an NR/5G cell. While communications with an NR/5G cell may result in an improvement of wireless communications, establishing such a connection may result in an increase in power consumption at the UE. Thus, performing a cell selection/addition procedure with the NR/5G cell may be undesirable in cases where the UE has low battery, or otherwise needs to conserve power. Some conventional techniques may enable the UE to completely preempt any wireless connections with NR/5G cells. However, these conventional techniques do not enable the UE to establish NR/5G connections within channels associated with lower frequency ranges in order to take advantage of more efficient NR/5G communications while simultaneously mitigating substantial increases in power consumption.

Accordingly, techniques described herein are directed to improved power savings techniques for a UE. In particular, techniques described herein may enable a UE to establish wireless connections with channels of NR/5G cells associated with lower frequency ranges (e.g., smaller bandwidths) in order to prevent large increases in power consumption at the UE. In this regard, as compared to some conventional power savings techniques which enact a blanket prohibition on NR/5G communications, techniques described herein may provide improved power saving granularity by enabling UEs 115 to perform (or refrain from performing) procedures with specific channels of a second cell on a channel-by-channel basis based on a bandwidth (e.g., a stored bandwidth) associated with each of the respective channels.

For example, while communicating with a first cell (e.g., LTE cell, low-bandwidth NR cell) a UE may identify a trigger condition for implementing power-saving techniques. The trigger condition may include a low power state of the UE, a low throughput at the UE, a low mobility state at the UE, or the like. Subsequently, the UE may receive an indication for the UE to perform a procedure (e.g., cell addition procedure, cell handover procedure) with a second cell (e.g., high-bandwidth NR cell). In this example, the UE may compare stored bandwidths associated with channels of the second cell to a bandwidth threshold. If a stored bandwidth of a channel of the second cell is greater than or equal to the bandwidth threshold (and therefore associated with high power consumption), the UE may refrain from completing the procedure with the respective channel of the secondary cell. For instance, the UE may refrain from measuring reference signals and/or reporting measurements associated with the channel of the second cell in order to refrain from completing the procedure with the respective channel. Additionally or alternatively, the UE may enter an idle state or transmit an indication of a radio link failure (RLF) in order to refrain from completing the procedure with the respective channel. Comparatively, if a stored bandwidth of a channel of the second cell is less than the bandwidth threshold (and therefore associated with lower power consumption), the UE may complete the procedure with the respective channel of the second cell.

Techniques described herein may provide for improved power savings at a UE by enabling the UE to perform or refrain from performing procedures (e.g., cell addition procedures, cell handover procedures) with individual channels of a second cell based on the respective bandwidths of the individual channels. By enabling the UE to perform (or refrain from performing) procedures with channels of a second cell on a channel-by-channel basis, techniques described herein may support power savings techniques at the UE while simultaneously allowing the UE to establish wireless connections with channels that are associated with lower power consumptions.

Aspects of the disclosure are initially described in the context of wireless communications systems. Additional aspects of the disclosure are described in the context of example process flows. Aspects of the disclosure are further illustrated by and described with reference to apparatus diagrams, system diagrams, and flowcharts that relate to techniques for user equipment power saving.

FIG. 1 illustrates an example of a wireless communications system 100 that supports techniques for user equipment power saving in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 5, 10, 15, 20, 40, 50, 60, 80, or 100 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), highest signal-to-interference-plus noise ratio (SINR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some aspects, the UEs 115 and the base stations 105 of the wireless communications system 100 may support techniques for improved power savings techniques at the UEs 115. In particular, techniques described herein may enable a UE 115 of the wireless communications system 100 to perform procedures (e.g., cell addition procedures, cell handover procedures) with channels of a second cell (e.g., secondary cell, NR cell, 5G cell) associated with lower frequency ranges (e.g., smaller bandwidths) in order to prevent large increases in power consumption at the UE 115. In this regard, as compared to some conventional power savings techniques which enact a blanket prohibition on NR/5G communications, techniques described herein may provide improved power saving granularity by enabling UEs 115 to perform (or refrain from performing) procedures with specific channels of a second cell on a channel-by-channel basis based on a bandwidth associated with each of the respective channels.

For example, while communicating with a first cell (e.g., LTE cell, low-bandwidth NR cell) a UE 115 of the wireless communications system 100 may identify a trigger condition for implementing power-saving techniques. The trigger condition may include a low power state of the UE 115, a low throughput at the UE 115, a low mobility state at the UE 115, or the like. Subsequently, the UE 115 may receive an indication for the UE 115 to perform a procedure (e.g., cell addition procedure, cell handover procedure) with a second cell of the wireless communications system 100. Each of first and second cells may be supported by one or more base stations 105 of the wireless communications system 100, and may be associated with a common radio access technology, different radio access technologies, or both. In this example, the UE 115 may compare bandwidths associated with channels of the second cell to a bandwidth threshold. If a bandwidth of a channel of the second cell is greater than or equal to the bandwidth threshold (and therefore associated with high power consumption), the UE 115 may refrain from completing the procedure with the respective channel of the second cell. For instance, the UE 115 may refrain from measuring reference signals and/or reporting measurements associated with the channel of the second cell in order to refrain from completing the procedure with the respective channel. Additionally or alternatively, the UE 115 may enter an idle state or transmit an indication of an RLF in order to refrain from completing the procedure with the respective channel. Comparatively, if a bandwidth of a channel of the second cell is less than the bandwidth threshold (and therefore associated with lower power consumption), the UE 115 may complete the procedure with the respective channel of the second cell.

Techniques described herein may provide for improved power savings at a UE 115 by enabling the UE 115 to perform or refrain from performing procedures (e.g., cell addition procedures, cell handover procedures) with individual channels of a second cell based on the respective bandwidths of the individual channels. By enabling the UE 115 to perform (or refrain from performing) procedures with channels of a second cell on a channel-by-channel basis, techniques described herein may support power savings techniques at the UE 115 while simultaneously allowing the UE 115 to establish wireless connections with channels of cells of the wireless communications system 100 that are associated with lower power consumptions.

Figure 2:
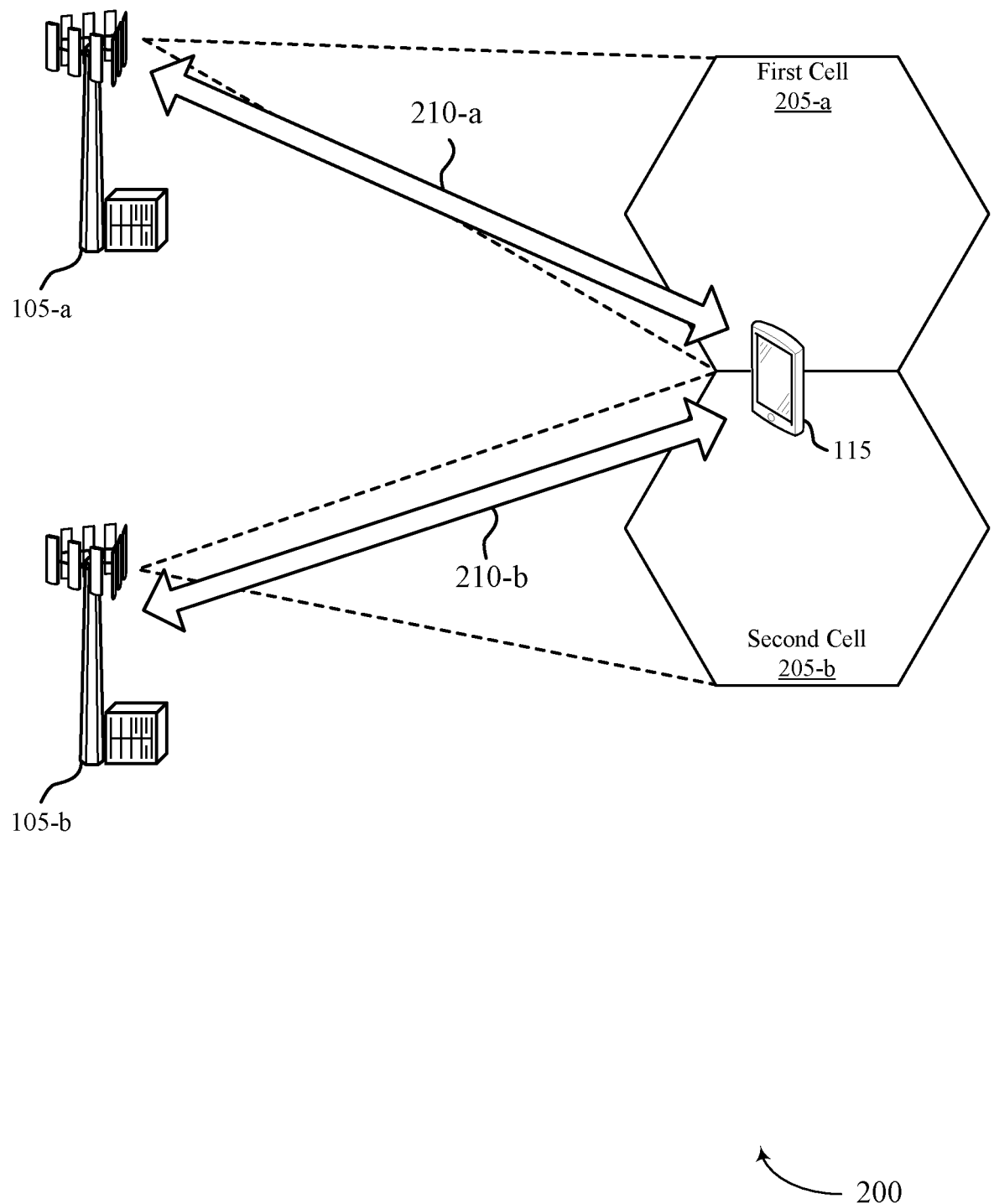
FIG. 2 illustrates an example of a wireless communications system that supports techniques for user equipment power saving in accordance with aspects of the present disclosure.

FIG. 2 illustrates an example of a wireless communications system 200 that supports techniques for user equipment power saving in accordance with aspects of the present disclosure. In some examples, wireless communications system 200 may implement aspects of wireless communications system 100. The wireless communications system 200 may include a UE 115, a first base station 105-a, and a second base station 105, which may be examples of UEs 115 and base stations 105, as described with reference to FIG. 1.

The wireless communications system 200 may support wireless communications with wireless devices (e.g., UE 115) via one or more cells 205 (e.g., serving cells) of the wireless communications system 200. In particular, each cell 205 may be supported by one or more base stations 105 of the wireless communications system 200. For example, as shown in FIG. 2, the wireless communications system 200 may include a first cell 205-a supported by the first base station 105-a, and a second cell 205-b supported by the second base station 105-b. The cells 205 may include primary cells (PCells), secondary cells (SCells), primary-secondary cells (PSCells) of a secondary cell group (SCG), or any combination thereof. The wireless communications system 200 may include any quantity of cells 205 supported by any quantity of base stations 105. For example, in additional or alternative cases, the first cell 205-a and the second cells 205-b may both be supported by the first base station 105-a. In this regard, a single base station 105 may be configured to support multiple cells 205.

In some aspects, the first cell 205-a and the second cell 205-b may be associated with a common frequency band (e.g., intra-band carrier aggregation) or different frequency bands. Moreover, each cell 205 may include multiple channels which are each associated with different bandwidths, frequency ranges, or both. In some aspects, the first cell 205-a, the second cell 205-b, or both, may include a PCell, an SCell, a PSCell of an SCG, or any combination thereof. For example, in cases where the first cell 205-a includes a PCell, the second cell 205-b may include an SCell.

In some cases, techniques described herein may be implemented in the context of dual connectivity, standalone (SA) applications, non-standalone (NSA) applications, or any combination thereof. In some cases, the first cell 205-a, the second cell 205-b, or both, may be associated with a given radio access technology, such as a 5G radio access technology, an NR access technology, a 4G radio access technology, an LTE radio access technology, or any combination thereof. In this regard, the second cell 205-b may be associated with the same or different radio access technology as the radio access technology associated with the first cell 205-a. In this regard, the power savings techniques described herein may be implemented in the context of procedures associated with E-UTRAN NR-dual connectivity (ENDC) procedures, NR-dual connectivity (NRDC), or both.

For example, in cases where the first cell 205-a is associated with a 4G or LTE radio access technology, the second cell 205-b may be associated with a 5G radio access technology, an NR access technology, or both. Moreover, in some cases, the first cell 205-a and the second cell 205-b may be associated with common or different frequency bands associated with a common radio access technology.

For example, in some cases, both the first and second cells 205-a and 205-b may be associated with an NR access technology, where the first cell 205-a is associated an FR1 frequency band of the NR access technology and the second cell 205-b is associated an FR2 frequency band of the NR access technology.

In some aspects, the UE 115-a may communicate with the cells 205 (e.g., communicate with base stations 105 supporting the cells 205) using one or more channels, beams, carriers (e.g., component carriers), communication links, or any combination thereof. For example, each cell 205 may be associated with one or more channels which facilitate wireless communications between the UE 115-a and the respective cells 205. For the purposes of simplicity, each cell 205 is shown as being associated with a communication link 210, where each communication link may include one or more channels which support wireless communications between wireless devices (e.g., UE 115) and the respective base stations 105. For example, the UE 115-a may communicate with the first cell 205-a (e.g., communicate with the first base station 105-a supporting the first cell 205-a) via a first communication link 210-a. Similarly, the UE 115-a may communicate with the second cell 205-b (e.g., communicate with the second base station 105-b supporting the second cell 205-b) via a second communication link 210-b. In some aspects, the first communication link 210-a and the second communication link 210-b may include examples of access links (e.g., Uu links) which facilitate wireless communications between the UE 115 and the respective cells 205. The first communication link 210-a and the second communication link 210-b may include bi-directional links that can include both uplink and downlink communication. For example, the UE 115 may transmit uplink transmissions, such as uplink control signals or uplink data signals, to the first cell 205-a (e.g., to the first base station 105-a supporting the first cell 205-a) using the first communication link 210-a, and the first cell 205-a (e.g., first base station 105-a supporting the first cell 205-a) may transmit downlink transmissions, such as downlink control signals or downlink data signals, to the UE 115 using the first communication link 210-a.

Some portions of the present disclosure are shown and described in the context of a UE (e.g., UE 115) communicating with one or more cells (e.g., first cell 205-a, second cell 205-b). Wireless communications between a UE and a cell may be understood to include communications between the UE and a base station, transmission-reception point (TRP), or other wireless communications device which supports the respective cell. For example, as used herein, the UE 115 illustrated in FIG. 1 may be said to communicate with the first cell 205-a by transmitting uplink transmissions and/or receiving downlink transmissions from the first base station 105-a via the first communication link 210-a. Similarly, the UE 115 illustrated in FIG. 1 may be said to communicate with the second cell 205-b by transmitting uplink transmissions and/or receiving downlink transmissions from the second base station 105-b via the second communication link 210-b.

In some aspects, the UE 115, the first base station 105-a, and the second base station 105-b of the wireless communications system 200 may support techniques for improved power savings techniques at the UEs 115. In particular, while communicatively coupled to the first cell 205-a, techniques described herein may enable the UE 115 of the wireless communications system 200 to perform procedures with channels of the second cell 205-a on a channel-by-channel basis. Specifically, techniques described herein may enable the UE 115 to perform (or refrain from performing) procedures with the second cell 205-b on a channel-by-channel basis in order to prevent the UE 115 from establishing a wireless connection with a channel of the second cell 205-b which is associated with a large bandwidth, and therefore a large power consumption. Therefore, techniques described herein may enable the UE 115 to perform (or refrain from performing) a procedure with a channel of the second cell 205-b to prevent large increases in power consumption, and preserve power of the UE 115. In this regard, as compared to some conventional power savings techniques which enact a blanket prohibition on NR/5G communications, techniques described herein may provide improved power saving granularity by enabling the UE 115 to perform (or refrain from performing) procedures with specific channels of the second cell 205-b on a channel-by-channel basis based on a bandwidth associated with each of the respective channels.

For example, while communicating with the first cell 205-a the UE 115 may identify a trigger condition for implementing power-saving techniques. The trigger condition may include a low power state of the UE 115, a low throughput at the UE 115, a low mobility state at the UE 115, or the like. Subsequently, the first cell 205-a (e.g., the first base station 105-a supporting the first cell 205-a) may transmit, to the UE 115, an indication for the UE 115 to perform a procedure (e.g., cell addition procedure, cell handover procedure) with the second cell 205-b of the wireless communications system 200. In some cases, the first cell 205-a may include an LTE cell or a 4G cell, and the second cell 205-b may include an NR cell or a 5G cell. Additionally or alternatively, both the first cell 205-a and the second cell 205-b may be associated with a common radio access technology, different radio access technologies, or both.

Continuing with the same example, upon receiving the indication to perform the procedure with the second cell 205-b and identifying the trigger condition has been satisfied, the UE 115 may compare bandwidths associated with channels of the second cell 205-a to one or more bandwidth thresholds. If a bandwidth of a channel of the second cell 205-b is greater than or equal to the bandwidth threshold (and therefore associated with high power consumption), the UE 115 may refrain from completing the procedure with the respective channel of the second cell 205-b. For instance, the UE 115 may refrain from measuring reference signals and/or reporting measurements associated with the channel of the second cell 205-b in order to refrain from completing the procedure with the respective channel of the second cell 205-b. Additionally or alternatively, the UE 115 may enter an idle state or transmit an indication of a RLF in order to refrain from completing the procedure with the respective channel of the second cell 205-b. Comparatively, if a bandwidth of a channel of the second cell 205-b is less than the bandwidth threshold (and therefore associated with lower power consumption), the UE 115 may complete the procedure with the respective channel of the second cell 205-b.

In some cases, the UE 115 may be configured to selectively adjust parameters associated with a procedure with the second cell 205-b in order to increase or decrease a probability that the UE 115 may complete the procedure with selected channel of the second cell 205-b. In particular, the UE 115 may selectively adjust parameters associated with the procedure with the second cell 205-b on a channel-by-channel basis based on a bandwidth of each respective channel. For example, while communicatively coupled to the first cell 205-a, the UE 115 may identify a trigger condition for implementing power savings techniques has been satisfied. In this example, the UE 115 may also identify that a channel supported by the second cell 205-b is greater than a bandwidth threshold, and therefore associated with a relatively high power consumption. In order to reduce a probability that the UE 115 will perform a procedure (e.g., cell reselection procedure, cell handover procedure) with the channel of the second cell 205-b, the UE 115 may selectively adjust one or more parameters associated with the procedure with the channel of the second cell 205-b. For instance, the UE 115 may adjust a cell reselection priority metric, a reference signal received power (RSRP) threshold, a reference signal received quality (RSRQ) threshold, or any combination thereof. In this regard, by selectively adjusting the parameters associated with the procedure associated with the channel of the second cell 205-b, the UE 115 may reduce a probability that the UE 115 will establish a wireless connection with the channel of the second cell 205-b which will result in a large increase in power consumption at the UE 115, thereby enabling the UE 115 to maintain relatively low power consumptions and conserve battery power.

Techniques described herein may provide for improved power savings at the UE 115 by enabling the UE 115 to perform or refrain from performing procedures (e.g., cell addition procedures, cell handover procedures) with individual channels of the second cell 205-b based on the respective bandwidths of the individual channels of the second cell 205-b. By enabling the UE 115 to perform (or refrain from performing) procedures with channels of the second cell 205-b on a channel-by-channel basis, techniques described herein may support power savings techniques at the UE 115 while simultaneously allowing the UE 115 to establish wireless connections with channels of cells 205 of the wireless communications system 200 that are associated with lower power consumptions.

Specific examples, as well as attendant advantages of the present disclosure, may be further shown and described with reference to FIGS. 3-7.

Figure 3:
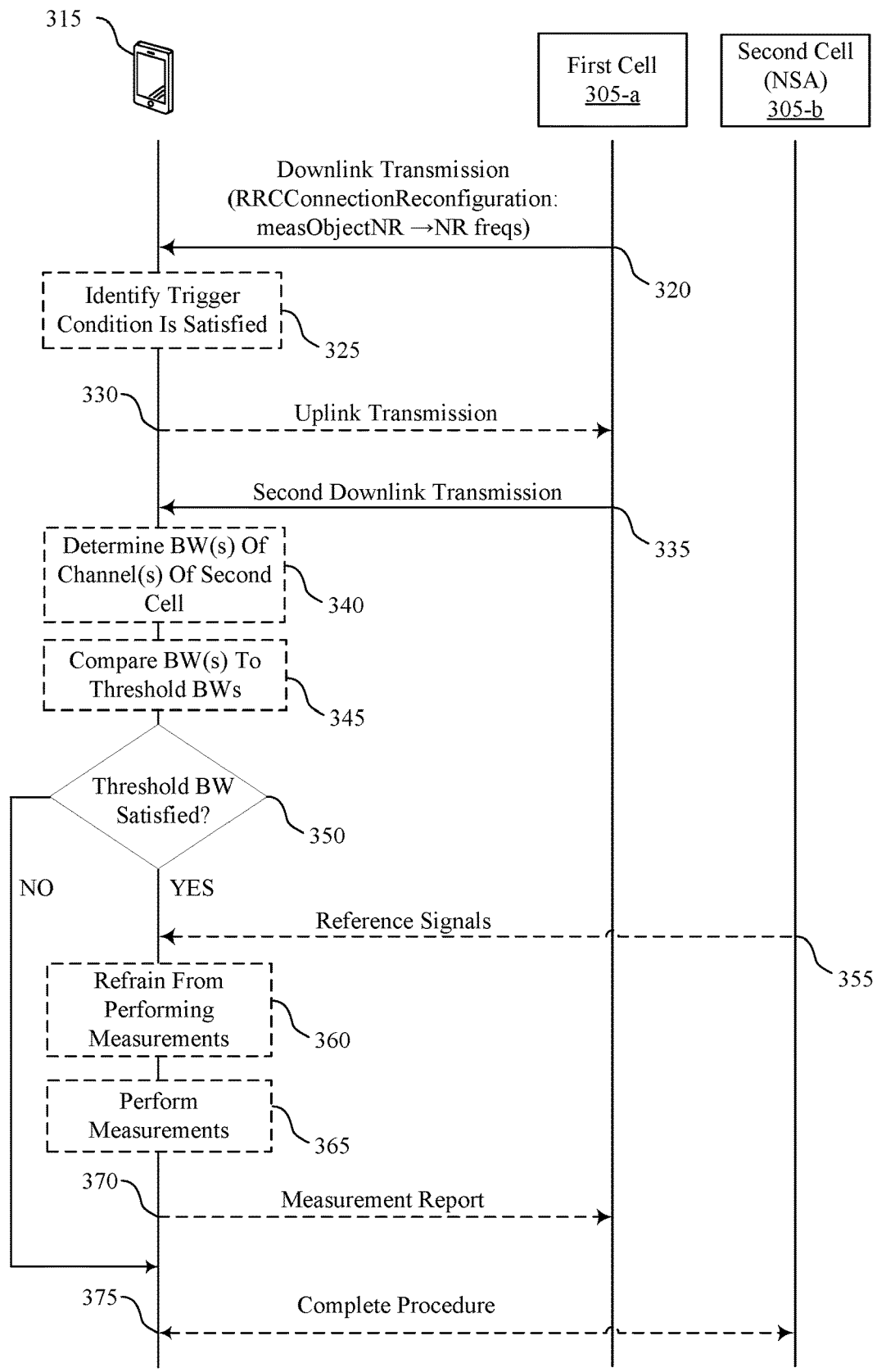
FIG. 3 illustrates an example of a process flow that supports techniques for user equipment power saving in accordance with aspects of the present disclosure.

FIG. 3 illustrates an example of a process flow 300 that supports techniques for user equipment power saving in accordance with aspects of the present disclosure. In some examples, process flow 300 may implement, or be implemented by, aspects of wireless communications system 100, wireless communications system 200, or both. For example, the process flow 300 may illustrate a UE 315 determining a trigger condition associated with an operational state has been satisfied, comparing a bandwidth associated with a second cell with a threshold bandwidth, and performing one or more actions associated with the second cell based on the comparison, as described with reference to FIGS. 1-2, among other aspects.

The process flow 300 may include a UE 315, a first cell 305-a, and a second cell 305-b, which may be examples of UEs 115 and cells 205 as described with reference to FIGS. 1 and 2. Each of the first cell 305-a and the second cell 305-b may be supported by one or more base stations. In some aspects, the first cell 305-c and the second cell 305-b may be associated with (e.g., supported by) a single base station of a wireless communications system (e.g., base station 105-a illustrated in FIG. 2). Additionally or alternatively, the first cell 305-a and the second cell 305-b may be associated with (e.g., supported by) different base stations 105. Additionally, the first cell 305-a and the second cell 305-b may be associated with a common radio access technology, or different radio access technologies. For example, in some cases, the first cell 305-a may be associated with an LTE or 4G radio access technology, and the second cell 305-b may be associated with an NR or 5G radio access technology. In additional or alternative cases, both the first cell 305-a and the second cell 305-b may be associated with an NR or 5G radio access technology.

In some examples, the operations illustrated in process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 320, the UE 315 may receive, from the first cell 305-a, a downlink transmission from the first cell. In some aspects, the downlink transmission may include a radio resource control (RRC) message, a downlink control information (DCI) message, a MAC-CE message, a system information block (SIB) message, a synchronization signal block (SSB) message, or any combination thereof.

In some aspects, the downlink transmission may include information for performing one or more actions associated with the second cell 305-b. For example, the downlink transmission may include information for performing a cell handover procedure, a cell addition procedure, a cell change procedure, a cell redirection procedure, or any combination thereof. For instance, as shown in FIG. 3, the downlink transmission may include an RRCConnectionReconfiguration message which indicates for the UE to perform one or more measurements (e.g., FR1 measurements, FR2 measurements) on reference signals received form the second cell 305-b. In this regard, the downlink transmission illustrated in FIG. 3 may include information for performing an ENDC measurement of reference signals transmitted by the second cell 305-b (e.g., information for an ENDC addition procedure).

In some aspects, the downlink transmission may additionally include an identifier associated with the second cell 305-b. Identifiers associated with the second cell 305-b may include, but are not limited to, a cell global identifier (CGI), an absolute radio frequency channel number (ARFCN), and the like.

At 325, the UE 315 may identify that a trigger condition associated with an operational parameter at the UE is satisfied. In this regard, the UE 315 may identify that a trigger condition associated with an operational power state at the UE 315 has been satisfied, which may indicate for the UE 315 to implement power savings techniques described herein. In some aspects, the UE 315 may identify that the trigger condition has been satisfied based on receiving the downlink transmission at 320 (e.g., based on receiving the information associated with the procedure with the second cell 305-b).

Operational parameters associated with the trigger condition for power savings techniques may include, but are not limited to, a power level (e.g., battery level) of the UE 315, an operational state of the UE 315 (e.g., idle mode of operation, connected mode of operation), a presence/absence of an external power source (e.g., battery pack, A/C power source) coupled to the UE 315, a mobility state of the UE 315. Additionally or alternatively, the operational parameter associated with the trigger condition for power savings techniques may include parameters associated with wireless communications at the UE 315 including, but not limited to, a throughput of wireless communications at the UE 315, an energy efficiency of wireless communications at the UE 315, an RSRP metric of wireless communications at the UE 315, or any combination thereof.

The UE 315 may be configured to determine that the trigger condition for power savings techniques has been satisfied by comparing one or more operational parameters of the UE 315 to one or more thresholds. For example, the UE 315 may identify that the trigger condition has been satisfied based on determining that a power level of the UE 315 satisfies a threshold power level. For instance, the UE 315 may identify that the trigger condition has been satisfied based on determining that a power level $P_{UE}$ (e.g., battery level) of the UE 315 is less than or equal to a threshold power level $P_{Thresh}$ (e.g., trigger condition satisfied if $P_{UE} \leq P_{Thresh}$). By way of another example, the UE 315 may identify that the trigger condition has been satisfied based on determining that a throughput $TP_{UE}$ of wireless communications at the UE 315 satisfies a threshold throughput $TP_{Thresh}$ (e.g., trigger condition satisfied if $TP_{UE} \leq TP_{Thresh}$). By way of another example, the UE 315 may identify that the trigger condition has been satisfied based on determining that an RSRP metric $RSRP_{UE}$ of wireless communications at the UE 315 satisfies a threshold RSRP metric $RSRP_{Thresh}$ (e.g., trigger condition satisfied if $RSRP_{UE} \leq RSRPP_{Thresh}$). By way of another example, the UE 315 may identify that the trigger condition has been satisfied based on determining that an energy efficiency $EE_{UE}$ (e.g., energy efficiency measured in Joules per data bit) of wireless communications at the UE 315 satisfies a threshold energy efficiency $EE_{Thresh}$ (e.g., trigger condition satisfied if $EE_{UE} \leq EE_{Thresh}$).

In some implementations, the UE 315 may be configured to identify that the trigger condition for power savings techniques is satisfied based on a mobility state of the UE 315. A mobility state of the UE 315 may be associated with a speed at which the UE 315 is moving, an acceleration of the UE 315, a pattern of movement of the UE 315, or any combination thereof. For example, higher rates of speed may be associated with higher mobility states, whereas lower rates of speed may be associated with lower mobility states. In some cases, the techniques described herein may implement power savings measures by preventing the UE 315 from performing procedures with (e.g., establishing wireless connections with) channels and/or cells which are associated with large power consumption (e.g., large bandwidths). Accordingly, some techniques described herein may limit a quantity of channels and/or cells in which the UE 315 may communicate with in order to conserve power. In this regard, techniques described herein which limit a quantity of channels/cells which the UE 315 may perform procedures with (e.g., cell handover procedures, cell reselection procedures) may be in tension with a need for the UE 315 to perform cell handover procedures or other procedures due to the movement of the UE 315.

For example, a UE 315 aboard a high-speed train may be moving at a high rate of speed (e.g., high mobility state), and may move across geographical regions of cells rapidly. In this regard, the UE 315 may be required to perform frequent cell handover procedures (or other procedures) in order to establish connections with cells (e.g., base stations) as the UE 315 moves through the respective geographical regions of the cells. In such cases, implanting some power savings techniques described herein may limit a quantity of cells in which the UE 315 may perform procedures with, which may inhibit the ability of the UE 315 to maintain a wireless connection with the network. In such cases, the UE 315 may refrain from implementing the power-savings techniques described herein in order to preserve a quantity of cells with which the UE 315 may communicate with as the UE 315 travels within the high-speed train. Accordingly, in some cases, the UE 315 may identify that the trigger condition has been satisfied based on determining that a mobility state $MS_{UE}$ (e.g., speed) of the UE 315 satisfies a mobility state threshold $MS_{Thresh}$ (e.g., trigger condition satisfied if $MS_{UE}MS_{Thresh}$). For instance, if a speed of the UE 315 is less than a threshold speed, the UE 315 may be configured to determine that the trigger condition is satisfied, and may therefore implement power-savings techniques.

In some aspects, the UE 315 may be configured to identify that the trigger condition has been satisfied based on multiple operational parameters (e.g., based on multiple operational parameters satisfying respective thresholds). For example, the UE 315 may be configured to identify that the trigger condition has been satisfied based on identifying that the UE 315 is in an idle or connected mode of operation, identifying that power level $P_{UE}$(e.g., battery level) of the UE 315 is less than or equal to a threshold power level $P_{Thresh}$(e.g., $P_{UE} \leq P_{Thresh}$), identifying that the UE 315 is not coupled to an external power source, identifying that a throughput $TP_{UE}$ of wireless communications at the UE 315 satisfies a threshold throughput $TP_{Thresh}$ (e.g., $TP_{UE} \leq TP_{Thresh}$), or any combination thereof.

At 330, the UE 315 may transmit an uplink transmission to the first cell 305-a. In some aspects, the uplink transmission may include an uplink control information (UCI) message, a MAC-CE message, or the like. In some aspects, the UE 315 may transmit the uplink transmission at 330 based on receiving the downlink transmission at 320, identifying that the trigger condition has been satisfied at 325, or both.

In some aspects, the uplink transmission may indicate that the trigger condition associated with the one or more operational parameters of the UE 315 has been satisfied. In this regard, the uplink transmission may include an indication that the trigger condition for implementing power-savings measures has been met. In some cases, the uplink transmission may include a request for information from the first cell 305-a regarding additional information for performing the procedure indicated by the downlink transmission received at 320. In particular, the uplink transmission may include a request for information regarding how the UE 315 should perform (or refrain from performing) the procedure associated with the second cell 305-b in a manner which may help reduce power consumption at the UE 315 and/or preserve a power level (e.g., battery level) of the UE 315.

At 335, the UE 315 may receive a second downlink transmission from the first cell 305-a. In some aspects, the UE 315 may receive the second downlink transmission based on (e.g., in response to) transmitting the uplink transmission at 330. Additionally or alternatively, first cell 305-a may transmit the second downlink transmission based on transmitting the downlink transmission at 320.

In some aspects, the second downlink transmission may include information for performing at least one action associated with the procedure. In particular, the second downlink transmission may include information associated with performing one or more actions for the UE 315 to complete (or refrain from completing) the procedure associated with the second cell 305-b in order to reduce power consumption at the UE 315 and/or conserve power at the UE 315. In other words, the second downlink transmission may include information associated with implementing power-savings techniques at the UE 315.

At 340, the UE 315 may determine one or more bandwidths associated with the second cell 305-b. In particular, the UE 315 may determine one or more bandwidths associated with one or more channels supported by the second cell 305-b. In some aspects, the UE 315-b may determine the one or more bandwidths associated with the second cell at 340 based on receiving the downlink transmission at 320, identifying the trigger condition has been satisfied at 325, transmitting the uplink transmission at 330, receiving the second downlink transmission at 335, or any combination thereof. For instance, the UE 315 may be configured to determine the one or more bandwidths of the second cell 305-b based on an indication of an ARFCN associated with the second cell 305-b which was included within the downlink transmission received at 320.

In cases where the second cell 305-a supports communications in FR1 and/or FR2, the second cell 305-b may support one or more channels. In such cases, the UE 315 may be configured to determine a bandwidth associated with each channel supported by the second cell 305-b. For example, in cases where the second cell 305-b supports a first channel and a second channel, the UE 315 may determine a first bandwidth associated with the first channel, and a second bandwidth associated with the second channel. In some aspects, the one or more determined bandwidths may include a maximum downlink channel bandwidth for each channel (e.g., each frequency range) of the second cell 305-b. Moreover, the one or more bandwidths determined at 340 may include a maximum downlink channel bandwidth which is currently configured for each BWP (e.g., maximum downlink channel bandwidth configured in locationAndBandwidth) of the second cell 305-b for ENDC procedures associated with the second cell 305-b The UE 315 may implement any number of techniques for determining the one or more bandwidths associated with the second cell 305-b. For example, in some implementations, the UE 315 may determine the one or more bandwidths associated with the second cell 305-b based on a previous wireless connection between the UE 315 and the second cell 305-b. For instance, the UE 315 may have established a previous wireless connection with the second cell 305-b, and may have stored (e.g., in a memory of the UE 315) determined bandwidths of channels supported by the second cell 305-b based on the previous wireless connection. Such techniques which use determine bandwidths of the second cell 305-b based on previously-established connections may generally be referred to as "bandwidth fingerprinting." In some cases, the UE 315 may be configured to generate a database (e.g., fingerprint database) of bandwidths associated with channels of cells which the UE 315 has been in communication with.

Additionally or alternatively, the UE 315 may determine the one or more bandwidths associated with the second cell 305-b by querying one or more servers, cells (e.g., first cell 305-a, second cell 305-b), UEs (e.g., other UEs), or any combination thereof. For example, the UE 315 may determine the one or more bandwidths associated with the second cell 305-b by querying a database (e.g., fingerprint database) of bandwidths which have been previously determined and compiled by UEs which have previously established wireless connections with the second cell 305-b. Such techniques in which the UE 315 transmits a query for determined bandwidths associated with the second cell 305-b may generally be referred to as "bandwidth crowdsourcing."

For example, other UEs which have previously established connections with the second cell 305-b may determine bandwidths associated with channels supported by the second cell 305-b. These bandwidths determined by other UEs may be stored in a database, which may be accessible via a network (e.g., via first cell 305-a and/or second cell 305-b). In this example, the UE 315 may transmit a request for information associated with the one or more bandwidths of the second cell 305-*b*, and may receive an indication of one or more bandwidths of the second cell 305-*b* based on (e.g., in response to) transmitting the request. For instance, the UE 315 may transmit a request to the first cell 305-*a*, where the first cell 305-*a* may access a database (e.g., fingerprint database) of determined bandwidths associated with the second cell 305-*b* and transmit a response including the one or more determined bandwidths associated with the second cell 305-*b*.

In some aspects, the UE 315 may use a combination of bandwidth fingerprinting techniques and bandwidth crowdsourcing techniques in order to determine the one or more bandwidths associated with the second cell 305-*b* at 340. Additionally or alternatively, the UE 315 may determine the bandwidths based on explicit signaling from the first cell 305-*a*. For example, the downlink transmission received at 320, the second downlink transmission received at 335, or both, may include an indication of the one or more bandwidths associated with the second cell 305-*b*. For instance, the downlink transmission received at 320 may include an indication for the UE 315 to perform an ENDC addition procedure with a given channel of the second cell 305-*b*, and may include an indication of a bandwidth associated with the given cell.

At 345, the UE 315 may compare the one or more determined bandwidths associated with the second cell 305-*b* to one or more threshold bandwidths. In some aspects, the UE 315 may perform the comparison at 345 based on receiving the downlink transmission at 320, identifying the trigger condition has been satisfied at 325, transmitting the uplink transmission at 330, receiving the second downlink transmission at 335, determining the one or more bandwidths at 340, or any combination thereof. For example, in cases where the UE 315 determines three bandwidths (e.g., first bandwidth, second bandwidth, third bandwidth) associated with three channels supported by the second cell 305-*b*, the UE 315 may compare each of the first bandwidth, the second bandwidth, and the third bandwidth to one or more threshold bandwidths.

At 350, the UE 315 may determine whether the one or more determined bandwidths satisfy the one or more threshold bandwidths. In this regard, the UE 315 may determine if the one or more threshold bandwidths are satisfied based on the comparison at 345. In some aspects, a determined bandwidth (BW) may be determined to satisfy the threshold bandwidth ($BW_{Thresh}$) if the determined bandwidth is greater than or equal to the threshold bandwidth (e.g., satisfied if $BW \geq BW_{Thresh}$).

In cases where the UE 315 determines that a bandwidth associated with a channel of the second cell 305-*b* fails to satisfy the one or more threshold bandwidths (e.g., step 350=NO), the process flow 300 may proceed to 375 with respect to that channel. Conversely, in cases where the UE 315 determines that a bandwidth associated with a channel of the second cell 305-*b* satisfies the one or more threshold bandwidths (e.g., step 350=YES), the process flow 300 may proceed to 355 with respect to that channel. In this regard, steps 355-375 of process flow 300 may be completed for each channel supported by the second cell 305-*b*.

For example, in cases where the UE 315 determines that a first bandwidth ($BW_1$) associated with a first channel supported by the second cell 305-*b* satisfies the threshold bandwidth ($BW_{Thresh}$) (e.g., $BW_1 < BW_{Thresh}$), the process flow 300 may proceed to 375 with respect to the first channel. In some cases, by proceeding to 375, the UE 315 may be configured to complete the procedure associated with the first channel of the second cell 305-*b* based on the first bandwidth associated with the first channel failing to satisfy the threshold bandwidth. Conversely, by way of another example, in cases where the UE 315 determines that a second bandwidth ($BW_2$) associated with a second channel supported by the second cell 305-*b* satisfies the threshold bandwidth ($BW_{Thresh}$) (e.g., $BW_2 \geq BW_{Thresh}$), the process flow 300 may proceed to 355 with respect to the second channel. In some cases, by proceeding to 355, the UE 315 may be configured to refrain from completing the procedure associated with the second channel of the second cell 305-*b* based on the second bandwidth associated with the second channel satisfying the threshold bandwidth.

The one or more threshold bandwidths may be configured at the UE 315, indicated to the UE 315 via signaling from the first cell 305-*a* (e.g., via the downlink transmission at 320 and/or the second downlink transmission at 355), or both. In some cases, the threshold bandwidth may include 50 MHz. In some aspects, the threshold bandwidth may be selectively modified based on one or more characteristics or parameters including, but not limited to, a desired power savings metric (power consumption metric), an energy efficiency of each respective channel, a signal quality/strength (e.g., RSRP, RSRQ) of each respective channel, or any combination thereof. For example, the UE 315 may modify the threshold bandwidth based on a level of power saving or power conservation that is desired (e.g., power saving metric, power conservation metric).

For example, in cases where the UE 315 is to implement drastic power savings or power conservation measures (e.g., high power savings/conservation metrics), the UE 315 may reduce the bandwidth threshold to ensure that the UE 315 may complete the procedure with channels of the second cell 305-*b* which are associated with lower bandwidths, and therefore lower power consumption levels. Conversely, in cases where the UE 315 determines to implement lower power savings/conservation metrics, the UE 315 may increase the threshold bandwidth to enable the UE 315 to complete the procedure with channels of the second cell 305-*b* which are associated with larger bandwidths, and therefore higher power consumption levels.

By way of another example, the UE 315 may adjust the threshold bandwidth for individual channels based on an energy efficiency, RSRP, and/or RSRQ of each respective channel. For example, the UE 315 may increase the threshold bandwidth for a channel with a high energy efficiency (e.g., high RSRP), as the increase in power consumption enabled by the increased threshold bandwidth may be at least partially offset due to the high energy efficiency of the channel.

At 355, the UE 315 may receive one or more reference signals from the second cell 305-*b*. In some aspects, the UE 315 may receive the one or more reference signals from the second cell 305-*b* based on determining that one or more bandwidths associated with one or more channels of the second cell 305-*b* satisfy the threshold bandwidth at 350.

In some aspects, the one or more reference signals received at 355 may be associated with one or more channels supported by the second cell 305-*b*. For example, in cases where the second cell 305-*b* includes a first channel, a second channel, and a third channel, the UE 315 may receive a first reference signal associated with the first channel, a second reference signal associated with the second channel, and a third reference signal associated with the third channel.

At 360, the UE 315 may refrain from performing measurements for at least one reference signal. In some cases, the UE 315 may refrain from performing measurements for received reference signals which are associated with a bandwidth that satisfies the threshold bandwidth at 350. In this regard, the UE 315 may refrain from performing measurements with respect to channels of the second cell 305-*b* which include bandwidths that are greater than or equal to the threshold bandwidth, and are therefore associated with higher power consumption levels at the UE 315.

For example, in cases where the second cell 305-*b* includes a first channel, a second channel, and a third channel, the UE 315 may receive a first reference signal associated with the first channel, a second reference signal associated with the second channel, and a third reference signal associated with the third channel. In this example, a second bandwidth associated with the second channel may satisfy the threshold bandwidth (e.g., $BW_2 \geq BW_{Thresh}$), whereas a first bandwidth and a third bandwidth associated with the first and third channels, respectively, may fail to satisfy the threshold bandwidth (e.g., $BW_1 < BW_{Thresh}$, $BW_3 < BW_{Thresh}$). In this example, the UE 315 may refrain from performing measurements for the second reference signal based on the second bandwidth satisfying the threshold bandwidth.

In some cases, by refraining from performing measurements for channels of the second cell 305-*b* which are associated with large bandwidths (and therefore larger power consumption levels), the UE 315 may be subsequently unable to report the measurements, and may therefore be unable to complete the procedure with respect to the respective channel. Accordingly, by refraining from performing measurements for channels of the second cell 305-*b* which satisfy the threshold bandwidth techniques described herein may enable the UE 315 from establishing wireless communications with channels of the second cell 305-*b* which may result in higher power consumption levels at the UE 315.

Additionally or alternatively, the UE 315 may perform measurements for channels of the second cell 305-*b* which satisfy the threshold bandwidth, but may refrain from transmitting indications of these measurements. This may be further understood with reference to 365.

At 365, the UE 315 may perform a set of measurements on one or more of the reference signals received at 355. The measurements performed at 365 may include any measurements known in the art including, but not limited to, received signal strength indicator (RSSI) measurements, RSRP measurements, RSRQ measurements, SNR measurements, SINR measurements, or any combination thereof.

In cases where the UE 315 refrains from performing measurements for channels of the second cell 305-*b* which satisfy the threshold bandwidth at 360, the UE 315 may perform a set of measurements at 365 only for reference signals which are associated with channels which fail to satisfy the threshold bandwidth. Conversely, in other cases, the UE 315 may perform measurements for each reference signal associated with each channel of the second cell 305-*b*, regardless of whether the respective cells are associated with bandwidths that satisfy the threshold bandwidth.

At 370, the UE 315 may transmit a measurement report to the first cell 305-*a*. The UE 315 may refrain from transmitting the measurement report based on receiving the reference signals at 355, refraining from performing measurements for one or more channels at 360, performing the measurements at 365, or any combination thereof.

In some cases, the UE 315 may omit measurements associated with one or more channels from the measurement report. In particular, the UE 315 may omit measurements associated with channels of the second cell 305-*a* which include bandwidths that satisfy the threshold bandwidth. For example, the UE 315 may receive reference signals associated with a first channel, a second channel, and a third channel supported by the second cell 305-*b*. In this example, the UE 315 may determine that a second bandwidth associated with the second channel satisfies the threshold bandwidth, and may therefore refrain from performing measurements on reference signals for the second channel at 360. In this regard, the measurement report may therefore omit measurements associated with the second channel based on the second bandwidth of the second channel satisfying the threshold bandwidth.

By way of another example, the UE 315 may receive reference signals associated with a first channel, a second channel, and a third channel supported by the second cell 305-*b*. In this example, the UE 315 may determine that a second bandwidth associated with the second channel satisfies the threshold bandwidth, but may perform measurements for reference signals associated with all three channels at 365. However, at 370, the UE 315 may omit measurements associated with the second channel from the measurement report based on the second bandwidth of the second channel satisfying the threshold bandwidth.

Accordingly, the UE 315 may omit, from the measurement report, measurements associated with channels that include bandwidths which are greater than or equal to the threshold bandwidth. Thus, the UE 315 may refrain from transmitting measurement reports triggered by a B1 event for channels that include bandwidths that satisfy the threshold bandwidth. For example, if the UE 315 determines that a signal quality or strength of a channel of the second cell 305-*b* satisfies a respective quality threshold and/or strength threshold (e.g., B1 event satisfied), the UE 315 may nonetheless refrain from transmitting a measurement report for the channel of the second cell 305-*b* based on the respective channel satisfying the threshold bandwidth.

In some aspects, the UE 315 may be configured to perform the actions described at 355-365 in cases where the UE 315 supports an NSA mode of operation. Procedures for completing (or refraining from completing) procedures for UEs which do not support an NSA mode of operation (e.g., UEs which only support SA mode of operation) will be described in further detail with respect to FIG. 5.

At 375, the UE 315 may complete the procedure with the second cell 305-*b*. In some aspects, the UE 315 may complete the procedure (e.g., ENDC addition procedure, cell handover procedure, cell addition procedure, cell reselection procedure) associated with a selected channel supported by the second cell 305-*b*. In particular, the UE 315 may complete the procedure associated with a selected channel supported by the second cell 305-*b* based on a bandwidth of the selected channel failing to satisfy the threshold bandwidth at 350, based on receiving reference signals for the selected channel at 355, based on performing measurements for the selected channel at 365, based on refraining from transmitting a measurement report including measurements for the selected channel at 370, or any combination thereof.

By completing (or refraining from completing) the procedure with channels of the second cell 305-*b* based on a bandwidth of the respective channels, the techniques described herein may ensure that the UE 315 completes the procedure with channels of the second cell 305-*b* which are associated with relatively small bandwidths, and therefore relatively small power consumption levels.

Techniques described herein may provide for improved power savings at the UE 315 by enabling the UE 115 to perform or refrain from performing procedures (e.g., cell addition procedures, cell handover procedures) with individual channels of the second cell 305-*b* based on the respective bandwidths of the individual channels of the second cell 305-*b*. By enabling the UE 315 to perform (or refrain from performing) procedures with channels of the second cell 305-*b* on a channel-by-channel basis, techniques described herein may support power savings techniques at the UE 315 while simultaneously allowing the UE 315 to establish wireless connections with channels of cells 305 (e.g., second cell 305-*b*) which are associated with lower power consumptions.

Figure 4:
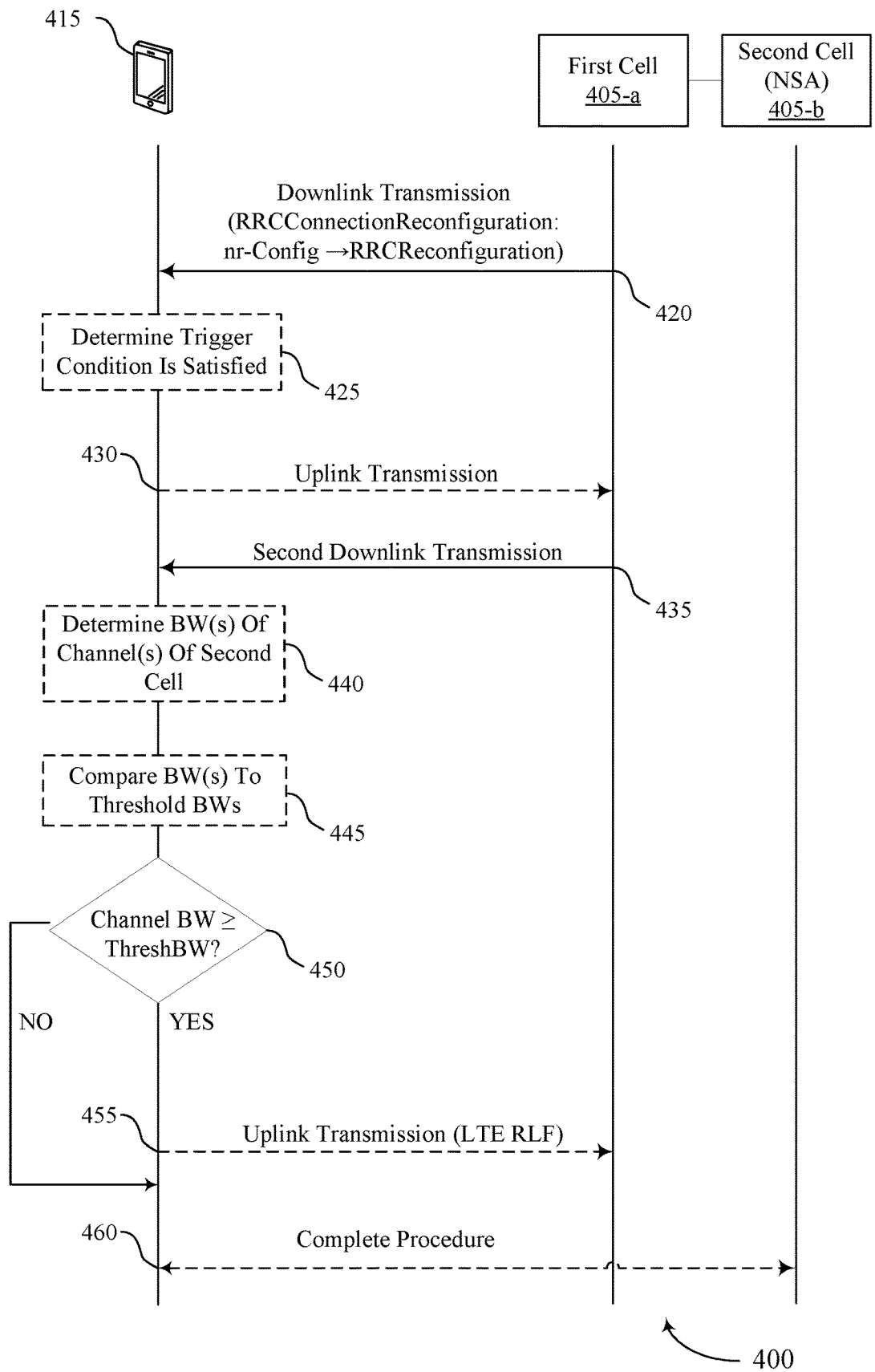
FIG. 4 illustrates an example of a process flow that supports techniques for user equipment power saving in accordance with aspects of the present disclosure.

FIG. 4 illustrates an example of a process flow 400 that supports techniques for user equipment power saving in accordance with aspects of the present disclosure. In some examples, process flow 400 may implement, or be implemented by, aspects of wireless communications system 100, wireless communications system 200, or both. For example, the process flow 400 may illustrate a UE 415 determining a trigger condition associated with an operational state has been satisfied, comparing a bandwidth associated with a second cell with a threshold bandwidth, and performing one or more actions associated with the second cell based on the comparison, as described with reference to FIGS. 1-2, among other aspects.

The process flow 400 may include a UE 415, a first cell 405-*a*, and a second cell 405-*b*, which may be examples of UEs 115 and cells 205 as described with reference to FIGS. 1 and 2. Each of the first cell 405-*a* and the second cell 405-*b* may be supported by one or more base stations. In some aspects, the first cell 405-*c* and the second cell 405-*b* may be associated with (e.g., supported by) a single base station of a wireless communications system (e.g., base station 105-*a* illustrated in FIG. 2). Additionally or alternatively, the first cell 405-*a* and the second cell 405-*b* may be associated with (e.g., supported by) different base stations 105. Additionally, the first cell 305-*a* and the second cell 405-*b* may be associated with a common radio access technology, or different radio access technologies. For example, in some cases, the first cell 305-*a* may be associated with an LTE or 4G radio access technology, and the second cell 405-*b* may be associated with an NR or 5G radio access technology. In additional or alternative cases, both the first cell 305-*a* and the second cell 405-*b* may be associated with an NR or 5G radio access technology.

In some examples, the operations illustrated in process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 420, the UE 415 may receive, from the first cell 405-*a*, a downlink transmission from the first cell. In some aspects, the downlink transmission may include an RRC message, a DCI message, a MAC-CE message, a SIB message, an SSB message, or any combination thereof. In some aspects, the downlink transmission may include information for performing one or more actions associated with the second cell 405-*b*. For example, the downlink transmission may include information for performing a cell handover procedure, a cell addition procedure, a cell change procedure, a cell redirection procedure, or any combination thereof. For instance, as shown in FIG. 4, the downlink transmission may include an RRCConnectionReconfiguration message which indicates for the UE to perform a cell reconfiguration procedure (e.g., ENDC addition procedure, SCG addition procedure) with the second cell 405-*b*.

In some aspects, the downlink transmission may additionally include an identifier associated with the second cell 405-*b*. Identifiers associated with the second cell 405-*b* may include, but are not limited to, a CGI, an ARFCN, and the like.

At 425, the UE 415 may identify that a trigger condition associated with an operational parameter at the UE is satisfied. In this regard, the UE 415 may identify that a trigger condition associated with an operational power state at the UE 415 has been satisfied, which may indicate for the UE 415 to implement power savings techniques described herein. In some aspects, the UE 415 may identify that the trigger condition has been satisfied based on receiving the downlink transmission at 420 (e.g., based on receiving the information associated with the procedure with the second cell 405-*b*).

It is noted herein that any discussion regarding the identification of a trigger condition at step 325 of process flow 300 illustrated in FIG. 3 may be regarded as applying to step 425 illustrated in FIG. 4, to the extent applicable. For example, as described previously herein, operational parameters associated with the trigger condition for power savings techniques may include, but are not limited to, a power level (e.g., battery level) of the UE 415, an operational state of the UE 415 (e.g., idle mode of operation, connected mode of operation), a presence/absence of an external power source (e.g., battery pack, A/C power source) coupled to the UE 415, a mobility state of the UE 415, a throughput of wireless communications at the UE 415, an energy efficiency of wireless communications at the UE 415, an RSRP metric of wireless communications at the UE 415, or any combination thereof.

At 430, the UE 415 may transmit an uplink transmission to the first cell 405-*a*. In some aspects, the uplink transmission may include a UCI message, a MAC-CE message, or the like. In some aspects, the UE 415 may transmit the uplink transmission at 430 based on receiving the downlink transmission at 420, identifying that the trigger condition has been satisfied at 425, or both. In some aspects, the uplink transmission may indicate that the trigger condition associated with the one or more operational parameters of the UE 415 has been satisfied. In this regard, the uplink transmission may include an indication that the trigger condition for implementing power-savings measures has been met. In some cases, the uplink transmission may include a request for information from the first cell 405-*a* regarding additional information for performing the procedure indicated by the downlink transmission received at 420. In particular, the uplink transmission may include a request for information regarding how the UE 415 should perform (or refrain from performing) the procedure associated with the second cell 405-*b* in a manner which may help reduce power consumption at the UE 415 and/or preserve a power level (e.g., battery level) of the UE 415.

At 435, the UE 415 may receive a second downlink transmission from the first cell 405-*a*. In some aspects, the UE 415 may receive the second downlink transmission based on (e.g., in response to) transmitting the uplink transmission at 430. Additionally or alternatively, first cell 405-*a* may transmit the second downlink transmission based on transmitting the downlink transmission at 420.

In some aspects, the second downlink transmission may include information for performing at least one action associated with the procedure. In particular, the second downlink transmission may include information associated with performing one or more actions for the UE 415 to complete (or refrain from completing) the procedure associated with the second cell 405-*b* in order to reduce power consumption at the UE 415 and/or conserve power at the UE 415. In other words, the second downlink transmission may include information associated with implementing power-savings techniques at the UE 415.

At 440, the UE 415 may determine one or more bandwidths associated with the second cell 405-*b*. In particular, the UE 415 may determine one or more bandwidths associated with one or more channels supported by the second cell 405-*b*. In some aspects, the UE 415-*b* may determine the one or more bandwidths associated with the second cell at 440 based on receiving the downlink transmission at 420, identifying the trigger condition has been satisfied at 425, transmitting the uplink transmission at 430, receiving the second downlink transmission at 435, or any combination thereof. For instance, the UE 415 may be configured to determine the one or more bandwidths of the second cell 405-*b* based on an indication of a CGI associated with the second cell 405-*b* which was included within the downlink transmission received at 420.

In some aspects, the UE 415 may determine a bandwidth associated with each channel supported by the second cell 405-*b*. Moreover, it is noted herein that any discussion regarding the determination of one or more bandwidths at step 340 of process flow 300 illustrated in FIG. 3 may be regarded as applying to step 440 illustrated in FIG. 4, to the extent applicable. For example, as described herein with reference to FIG. 3, the UE 415 may determine the one or more bandwidths at 440 using bandwidth fingerprinting techniques, bandwidth crowdsourcing techniques, based on explicit signaling from the first cell 405-*a*, or any combination thereof.

At 445, the UE 415 may compare the one or more determined bandwidths associated with the second cell 405-*b* to one or more threshold bandwidths. In some aspects, the UE 415 may perform the comparison at 445 based on receiving the downlink transmission at 420, identifying the trigger condition has been satisfied at 425, transmitting the uplink transmission at 430, receiving the second downlink transmission at 435, determining the one or more bandwidths at 440, or any combination thereof. For example, in cases where the UE 415 determines three bandwidths (e.g., first bandwidth, second bandwidth, third bandwidth) associated with three channels supported by the second cell 405-*b*, the UE 415 may compare each of the first bandwidth, the second bandwidth, and the third bandwidth to one or more threshold bandwidths. It is noted herein that any discussion regarding the comparison of bandwidths to bandwidth thresholds at step 345 of process flow 300 illustrated in FIG. 3 may be regarded as applying to step 445 illustrated in FIG. 4, to the extent applicable.

At 450, the UE 415 may determine whether the one or more determined bandwidths satisfy the one or more threshold bandwidths. In this regard, the UE 415 may determine if the one or more threshold bandwidths are satisfied based on the comparison at 445. In some aspects, a determined bandwidth (BW) may be determined to satisfy the threshold bandwidth ($BW_{Thresh}$) if the determined bandwidth is greater than or equal to the threshold bandwidth (e.g., satisfied if $BW \geq BW_{Thresh}$).

In cases where the UE 415 determines that a bandwidth associated with a channel of the second cell 405-*b* fails to satisfy the one or more threshold bandwidths (e.g., step 450=NO), the process flow 300 may proceed to 375 with respect to that channel. Conversely, in cases where the UE 415 determines that a bandwidth associated with a channel of the second cell 405-*b* satisfies the one or more threshold bandwidths (e.g., step 450=YES), the process flow 300 may proceed to 455 with respect to that channel. In this regard, steps 455-460 of process flow 300 may be completed for each channel supported by the second cell 405-*b*. It is noted herein that any discussion regarding the comparison of bandwidths to bandwidth thresholds at step 350 of process flow 300 illustrated in FIG. 3 may be regarded as applying to step 450 illustrated in FIG. 4, to the extent applicable.

At 455, the UE 415 may transmit, to the first cell 405-*a*, an uplink transmission associated with an RLF at the UE 415. In this regard, the uplink transmission may include an indication of the RLF at the UE 415. In some aspects, the UE 415 may transmit the uplink transmission at 455 based on a bandwidth associated with one or more channels of the second cell 405-*b* satisfying the threshold bandwidth.

For example, in cases where the downlink transmission received at 420 includes an indication of an ENDC addition procedure and/or a SCG addition procedure, the UE 415 may transmit the uplink transmission including the indication of RLF in order to fail the ENDC addition procedure and/or SCG addition procedure by RLF (e.g., via LTE or SCG RLF). In some aspects, the uplink transmission may additionally include an indication of one or more channels of the second cell 405-*b* which are associated with the RLF. For example, in cases where a first bandwidth of a first channel supported by the second cell satisfies the threshold bandwidth, and a second bandwidth of a second channel supported by the second cell fails to satisfy the threshold bandwidth, the uplink transmission may indicate that an RLF is associated with the first channel. Accordingly, the UE 415 may be configured to fail the procedure (e.g., ENDC addition procedure, SCG addition procedure) on a channel-by-channel basis by transmitting the uplink transmission including the indication of RLF (e.g., via LTE or SCG RLF).

At 460, the UE 415 may complete the procedure (e.g., ENDC addition procedure, SCG addition procedure) with the second cell 405-*b*. In some aspects, the UE 415 may complete the procedure (e.g., ENDC addition procedure, cell handover procedure, cell addition procedure, cell reselection procedure) associated with a selected channel supported by the second cell 405-*b*. In particular, the UE 415 may complete the procedure associated with a selected channel supported by the second cell 405-*b* based on a bandwidth of the selected channel failing to satisfy the threshold bandwidth at 450, based on receiving reference signals for the selected channel at 455, based on transmitting the uplink transmission at 455, or any combination thereof.

By completing (or refraining from completing) the procedure with channels of the second cell 405-*b* based on a bandwidth of the respective channels, the techniques described herein may ensure that the UE 415 completes the procedure with channels of the second cell 405-*b* which are associated with relatively small bandwidths, and therefore relatively small power consumption levels.

Techniques described herein may provide for improved power savings at the UE 415 by enabling the UE 115 to perform or refrain from performing procedures (e.g., cell addition procedures, cell handover procedures) with individual channels of the second cell 405-*b* based on the respective bandwidths of the individual channels of the second cell 405-*b*. By enabling the UE 415 to perform (or refrain from performing) procedures with channels of the second cell 405-*b* on a channel-by-channel basis, techniques described herein may support power savings techniques at the UE 415 while simultaneously allowing the UE 415 to establish wireless connections with channels of cells 405 (e.g., second cell 405-*b*) which are associated with lower power consumptions.

Figure 5:
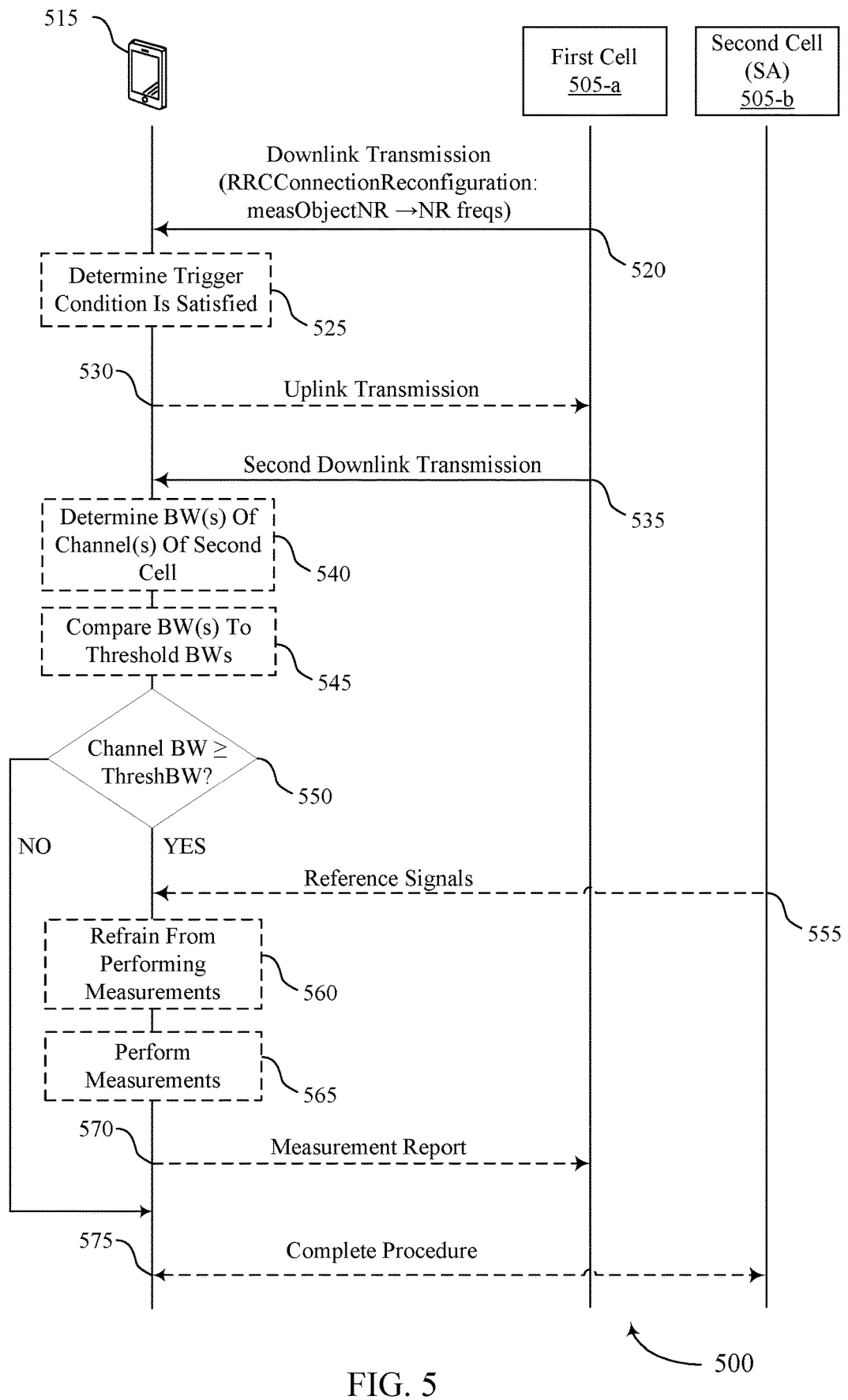
FIG. 5 illustrates an example of a process flow that supports techniques for user equipment power saving in accordance with aspects of the present disclosure.

FIG. 5 illustrates an example of a process flow 500 that supports techniques for user equipment power saving in accordance with aspects of the present disclosure. In some examples, process flow 500 may implement, or be implemented by, aspects of wireless communications system 100, wireless communications system 200, or both. For example, the process flow 500 may illustrate a UE 515 determining a trigger condition associated with an operational state has been satisfied, comparing a bandwidth associated with a second cell with a threshold bandwidth, and performing one or more actions associated with the second cell based on the comparison, as described with reference to FIGS. 1-2, among other aspects.

The process flow 500 may include a UE 315, a first cell 505-*a*, and a second cell 505-*b*, which may be examples of UEs 115 and cells 205 as described with reference to FIGS. 1 and 2. Each of the first cell 505-*a* and the second cell 505-*b* may be supported by one or more base stations. In some aspects, the first cell 505-*c* and the second cell 505-*b* may be associated with (e.g., supported by) a single base station of a wireless communications system (e.g., base station 105-*a* illustrated in FIG. 2). Additionally or alternatively, the first cell 505-*a* and the second cell 505-*b* may be associated with (e.g., supported by) different base stations 105. Additionally, the first cell 505-*a* and the second cell 505-*b* may be associated with a common radio access technology, or different radio access technologies. For example, in some cases, the first cell 505-*a* may be associated with an LTE or 4G radio access technology, and the second cell 505-*b* may be associated with an NR or 5G radio access technology. In additional or alternative cases, both the first cell 505-*a* and the second cell 505-*b* may be associated with an NR or 5G radio access technology.

In some examples, the operations illustrated in process flow 500 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 520, the UE 515 may receive, from the first cell 505-*a*, a downlink transmission from the first cell. In some aspects, the downlink transmission may include an RRC message, a DCI message, a MAC-CE message, a SIB message, an SSB message, or any combination thereof. In some aspects, the downlink transmission may include information for performing one or more actions associated with the second cell 505-*b*. For example, the downlink transmission may include information for performing a cell handover procedure, a cell addition procedure, a cell change procedure, a cell redirection procedure, or any combination thereof. For instance, as shown in FIG. 3, the downlink transmission may include an RRCConnectionReconfiguration message which indicates for the UE to perform one or more measurements (e.g., FR1 measurements, FR2 measurements) on reference signals received form the second cell 505-*b*.

As noted previously herein, the process flow 300 illustrated in FIG. 3, illustrates a UE 315 completing (or refraining from completing) a procedure (e.g., ENDC addition procedure) in the context of a UE 315 operating in an NSA mode of operation. Comparatively, the process flow 500 illustrated in FIG. 5 illustrates a UE 515 completing (or refraining from completing) a cell handoff procedure (e.g., packet-switched handoff (PSHO) procedure) in the context of a UE 515 operating in a SA mode of operation. For example, the downlink transmission received at 520 may include information for performing a cell handoff procedure (e.g., PSHO procedure) from the first cell 505-*a* to the second cell 505-*b*. For instance the downlink transmission received at 520 may include information for performing a cell handoff procedure (e.g., PSHO procedure) from the first cell 505-*a* associated with an LTE radio access technology to the second cell 505-*b* associated with an NR radio access technology.

Accordingly, it is noted herein that any discussion of steps 325-375 of process flow 300 illustrated in FIG. 3 may be regarded as applying to steps 525-575 of process flow 500 illustrated in FIG. 5. For example, the UE 515 may determine a trigger condition is satisfied at 525, transmit an uplink transmission indicating the trigger condition at 530, receive a second downlink transmission based on the uplink transmission at 535, determine one or more bandwidths of one or more channels of the second cell 505-*b* and compare the determined bandwidths to one or more threshold bandwidths at 540-550, receive reference signals at 555, refrain from performing measurements on the reference signals at 560, perform measurements on the reference signals at 565, refrain from transmitting a measurement report at 570, and complete the procedure with a channel of the second cell 505-*b* at 575.

In some aspects, in addition to refraining from at 570, the UE 515 may refrain from transmitting measurement reports triggered by a B2 event for channels that include bandwidths that satisfy the threshold bandwidth. For example, if the UE 515 determines that a signal quality or strength of a channel of the first cell 505-*a* satisfies a first threshold (e.g., $RSRP_1 \leq RSRP_{Thresh}$, $RSRQ_1 \leq RSRQ_{Thresh}$), and a signal quality or strength of a channel of the second cell 505-*b* satisfies a second threshold (e.g., $RSRP_2 \geq RSRP_{Thresh}$, $RSRQ_2 \leq RSRQ_{Thresh}$) (e.g., B2 event satisfied), the UE 515 may nonetheless refrain from transmitting a measurement report for the channel of the second cell 505-*b* based on the respective channel satisfying the threshold bandwidth.

Additionally, in some cases, the UE 515 may selectively adjust the threshold bandwidth based on identifying a change in a mobility state at the UE 515. For example, the UE 515 may initially determine that it is in a low mobility state (e.g., low speed, low levels of movement), and may therefore enact the power savings techniques described in process flow 500 to prevent the UE 515 from completing (or refraining from completing) a procedure with a channel of the second cell 505-*b* which is associated with a large bandwidth, and therefore high power consumption levels. In this example, the UE 515 may subsequently determine that the UE 515 is in a high mobility state (e.g., aboard a high-speed train). In this regard, the UE 515 may prioritize an ability to communicatively couple to cells (e.g., second cell 505-*b*) in order to maintain a wireless connection with the network while in the high mobility state. Accordingly, the UE 515 may selectively adjust (e.g., selectively increase) the threshold bandwidth in order to enable the UE 515 to complete the procedure with larger quantities of channels of the second cell 505-*b*.

By completing (or refraining from completing) the procedure with channels of the second cell 505-*b* based on a bandwidth of the respective channels, the techniques described herein may ensure that the UE 515 completes the procedure with channels of the second cell 505-*b* which are associated with relatively small bandwidths, and therefore relatively small power consumption levels. Furthermore, as compared to process flow 300 illustrated in FIG. 3 which enables completion (or lack thereof) of a procedure on a channel-by-channel basis in the context of NSA modes of operation, the process flow 500 illustrated in FIG. 5 may enable completion (or lack thereof) of a procedure on a channel-by-channel basis in the context of SA modes of operation. In particular, the process flow 500 may enable the UE 515 operating in a SA mode of operation to complete (or refrain from completing) a procedure (e.g., cell handover procedure, PSHO procedure) with the second cell 505-*b* on a channel-by-channel basis dependent on a bandwidth (and therefore power consumption level) of each respective channel of the second cell 505-*b*.

Techniques described herein may provide for improved power savings at the UE 515 by enabling the UE 115 to perform or refrain from performing procedures (e.g., cell addition procedures, cell handover procedures) with individual channels of the second cell 505-*b* based on the respective bandwidths of the individual channels of the second cell 505-*b*. By enabling the UE 515 to perform (or refrain from performing) procedures with channels of the second cell 505-*b* on a channel-by-channel basis, techniques described herein may support power savings techniques at the UE 515 while simultaneously allowing the UE 515 to establish wireless connections with channels of cells 505 (e.g., second cell 505-*b*) which are associated with lower power consumptions.

Figure 6:
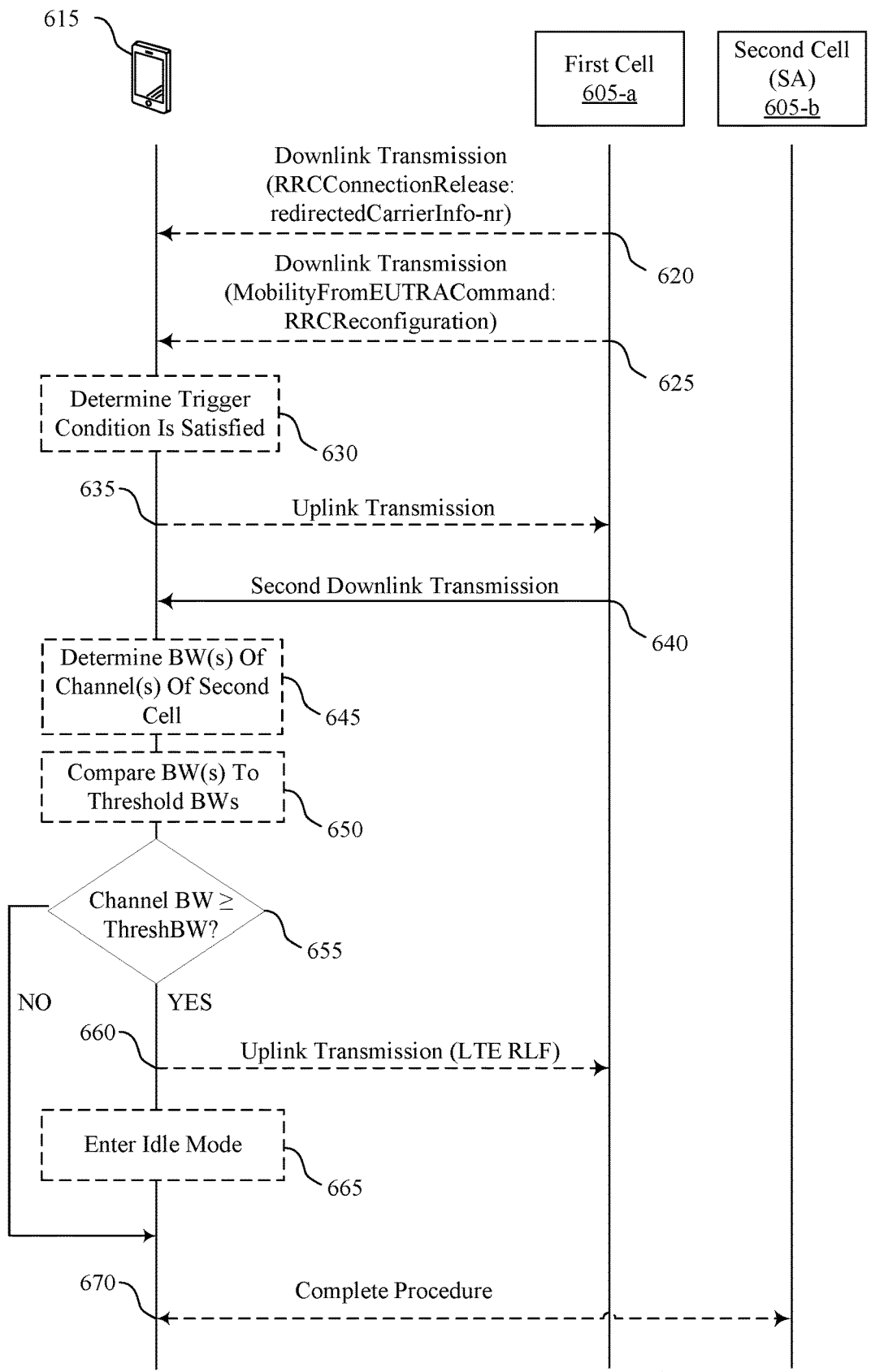
FIG. 6 illustrates an example of a process flow that supports techniques for user equipment power saving in accordance with aspects of the present disclosure.

FIG. 6 illustrates an example of a process flow 600 that supports techniques for user equipment power saving in accordance with aspects of the present disclosure. In some examples, process flow 600 may implement, or be implemented by, aspects of wireless communications system 100, wireless communications system 200, or both. For example, the process flow 600 may illustrate a UE 615 determining a trigger condition associated with an operational state has been satisfied, comparing a bandwidth associated with a second cell with a threshold bandwidth, and performing one or more actions associated with the second cell based on the comparison, as described with reference to FIGS. 1-2, among other aspects.

The process flow 600 may include a UE 615, a first cell 605-*a*, and a second cell 605-*b*, which may be examples of UEs 115 and cells 205 as described with reference to FIGS. 1 and 2. Each of the first cell 605-*a* and the second cell 605-*b* may be supported by one or more base stations. In some aspects, the first cell 605-*c* and the second cell 605-*b* may be associated with (e.g., supported by) a single base station of a wireless communications system (e.g., base station 105-*a* illustrated in FIG. 2). Additionally or alternatively, the first cell 605-*a* and the second cell 605-*b* may be associated with (e.g., supported by) different base stations 105. Additionally, the first cell 605-*a* and the second cell 605-*b* may be associated with a common radio access technology, or different radio access technologies. For example, in some cases, the first cell 605-*a* may be associated with an LTE or 4G radio access technology, and the second cell 605-*b* may be associated with an NR or 5G radio access technology. In additional or alternative cases, both the first cell 605-*a* and the second cell 605-*b* may be associated with an NR or 5G radio access technology.

In some examples, the operations illustrated in process flow 600 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 620, the UE 615 may receive, from the first cell 605-*a*, a downlink transmission from the first cell. In some aspects, the downlink transmission may include an RRC message, a DCI message, a MAC-CE message, a SIB message, an SSB message, or any combination thereof. In some aspects, the downlink transmission may include information for performing one or more actions associated with the second cell 605-*b*. For example, as shown in FIG. 6, the downlink transmission may include an RRCConnectionRelease message including information for performing a cell redirection procedure from the first cell 605-*a* to the second cell 605-*b* (e.g., indication of redirectedCarrierInfo-nr).

At 625, the UE 615 may receive, from the first cell 605-*a*, a downlink transmission from the first cell (e.g., the UE 615 may receive the downlink transmission at 625 as an alternative to receiving the RRCConnectionRelease message at 620). In some aspects, the downlink transmission may include an RRC message, a DCI message, a MAC-CE message, a SIB message, an SSB message, or any combination thereof. In some aspects, the downlink transmission may include information for performing one or more actions associated with the second cell 605-*b*. For example, as shown in FIG. 6, the downlink transmission may include RRCReconfiguration message including information for performing a cell handover procedure (e.g., PSHO procedure) from the first cell 605-*a* to the second cell 605-*b* (e.g., indication of MobilityFromEUTRACmmand).

As noted previously herein, the process flow 400 illustrated in FIG. 4, illustrates a UE 415 completing (or refraining from completing) a procedure (e.g., ENDC addition procedure, SCG addition procedure) in the context of the UE 415 operating in an NSA mode of operation. Comparatively, the process flow 600 illustrated in FIG. 6 illustrates a UE 615 completing (or refraining from completing) a cell redirection procedure and/or cell redirection procedure in the context of the UE 615 operating in a SA mode of operation.

Accordingly, it is noted herein that any discussion of steps 425-450 of process flow 400 illustrated in FIG. 4 may be regarded as applying to steps 630-655 of process flow 600 illustrated in FIG. 6. For example, the UE 615 may determine a trigger condition is satisfied at 630, transmit an uplink transmission indicating the trigger condition at 635, receive a second downlink transmission based on the uplink transmission at 640, and determine one or more bandwidths of one or more channels of the second cell 605-*b* and compare the determined bandwidths to one or more threshold bandwidths at 645-655.

At 660, the UE 615 may transmit, to the first cell 605-*a*, an uplink transmission associated with an RLF at the UE 615. In this regard, the uplink transmission may include an indication of the RLF at the UE 615. In some aspects, the UE 615 may transmit the uplink transmission at 660 based on a bandwidth associated with one or more channels of the second cell 405-*b* satisfying the threshold bandwidth. Additionally or alternatively, the UE 615 may transmit the uplink transmission indicating the RLF in order to fail the cell handover procedure indicated via the downlink transmission received at 625. In this regard, the UE 615 may transmit the uplink transmission in order to refrain from completing the cell handover procedure with a channel of the second cell 605-b which is associated with a large bandwidth, and therefore a large power consumption.

For example, in cases where the downlink transmission received at 625 includes an indication of a cell handover procedure, the UE 615 may transmit the uplink transmission including the indication of RLF in order to fail the cell handover procedure. In some aspects, the uplink transmission may additionally include an indication of one or more channels of the second cell 605-b which are associated with the RLF. For example, in cases where a first bandwidth of a first channel supported by the second cell satisfies the threshold bandwidth, and a second bandwidth of a second channel supported by the second cell fails to satisfy the threshold bandwidth, the uplink transmission may indicate that an RLF is associated with the first channel. Accordingly, the UE 615 may be configured to fail the procedure (e.g., cell handover procedure) on a channel-by-channel basis by transmitting the uplink transmission including the indication of RLF (e.g., LTE RLF).

At 665, the UE 615 may enter an idle mode of operation. In some cases, the UE 615 may enter the idle mode of operation to release a wireless connection with the first cell 605-a. In some aspects, the UE 615 may enter the idle mode of operation in order to fail (e.g., refrain from completing) a procedure or action with a channel indicated by the first cell 605-a based on a bandwidth of the respective channel satisfying the threshold bandwidth. For example, in cases where the first cell 605-a indicates for the UE 615 to perform a cell release with a cell redirection procedure via the downlink transmission received at 620, the UE 615 may enter an idle mode of operation based on one or bandwidths of the second cell satisfying the threshold bandwidth. In particular, the UE 615 may enter the idle mode of operation in order to refrain from completing the cell redirection procedure with a channel of the second cell 605-a which satisfies the threshold bandwidth.

At 670, the UE 615 may complete the procedure (e.g., release with cell redirection procedure, cell handover procedure) with the second cell 605-b. In some aspects, the UE 615 may complete the procedure associated with a selected channel supported by the second cell 605-b. In particular, the UE 615 may complete the procedure associated with a selected channel supported by the second cell 605-b based on a bandwidth of the selected channel failing to satisfy the threshold bandwidth at 655, based on transmitting the uplink transmission at 660, based on entering the idle mode of operation at 665, or any combination thereof.

By completing (or refraining from completing) the procedure with channels of the second cell 605-b based on a bandwidth of the respective channels, the techniques described herein may ensure that the UE 615 completes the procedure with channels of the second cell 605-b which are associated with relatively small bandwidths, and therefore relatively small power consumption levels. In particular, transmitting the uplink transmission indicating an RLF at 660 and/or entering the idle mode of operation at 665 may enable the UE 615 to refrain from completing the actions/procedures with channels of the second cell 605-b which are associated with high power consumptions. Accordingly, by refraining from completing the actions/procedures on a channel-by-channel basis, the techniques described herein may ensure the UE 615 may establish wireless communications with channels of the second cell 605-b which are associated with low bandwidths, and therefore low power consumptions.

Techniques described herein may provide for improved power savings at the UE 615 by enabling the UE 115 to perform or refrain from performing actions or procedures (e.g., cell addition procedures, cell handover procedures) with individual channels of the second cell 605-b based on the respective bandwidths of the individual channels of the second cell 605-b. By enabling the UE 615 to perform (or refrain from performing) actions or procedures with channels of the second cell 605-b on a channel-by-channel basis, techniques described herein may support power savings techniques at the UE 615 while simultaneously allowing the UE 615 to establish wireless connections with channels of cells 605 (e.g., second cell 605-b) which are associated with lower power consumptions.

Figure 7:
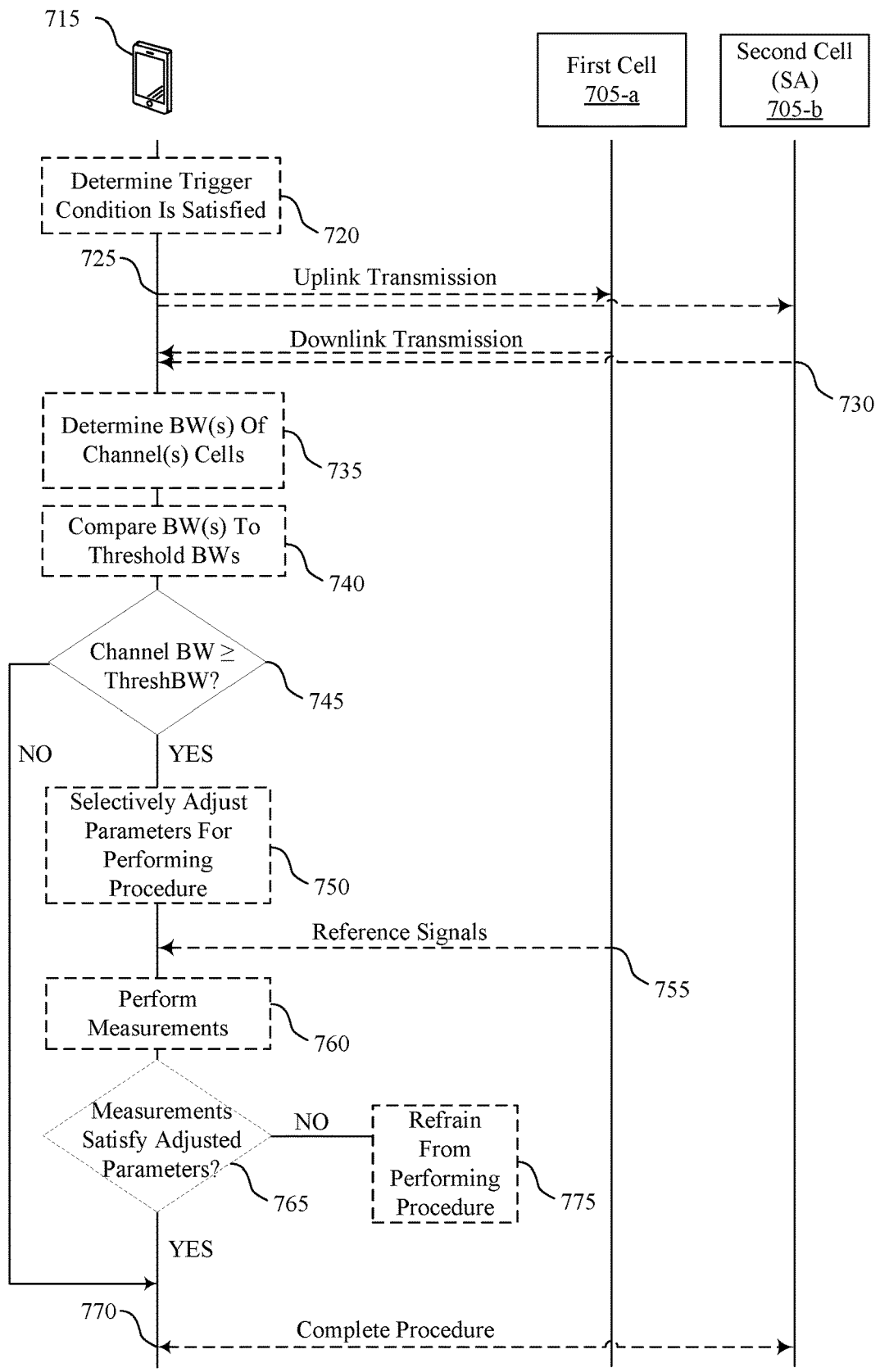
FIG. 7 illustrates an example of a process flow that supports techniques for user equipment power saving in accordance with aspects of the present disclosure.

FIG. 7 illustrates an example of a process flow 700 that supports techniques for user equipment power saving in accordance with aspects of the present disclosure. In some examples, process flow 700 may implement, or be implemented by, aspects of wireless communications system 100, wireless communications system 200, or both. For example, the process flow 300 may illustrate a UE 715 determining a trigger condition associated with an operational state has been satisfied, comparing a bandwidth associated with a second cell with a threshold bandwidth, and performing one or more actions associated with the second cell based on the comparison, as described with reference to FIGS. 1-2, among other aspects.

The process flow 700 may include a UE 715, a first cell 705-a, and a second cell 705-b, which may be examples of UEs 115 and cells 205 as described with reference to FIGS. 1 and 2. Each of the first cell 705-a and the second cell 705-b may be supported by one or more base stations. In some aspects, the first cell 705-c and the second cell 705-b may be associated with (e.g., supported by) a single base station of a wireless communications system (e.g., base station 105-a illustrated in FIG. 2). Additionally or alternatively, the first cell 705-a and the second cell 705-b may be associated with (e.g., supported by) different base stations 105. Additionally, the first cell 705-a and the second cell 705-b may be associated with a common radio access technology, or different radio access technologies. For example, in some cases, the first cell 705-a may be associated with an LTE or 4G radio access technology, and the second cell 705-b may be associated with an NR or 5G radio access technology. In additional or alternative cases, both the first cell 705-a and the second cell 705-b may be associated with an NR or 5G radio access technology.

In some examples, the operations illustrated in process flow 700 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 720, the UE 715 may determine that a trigger condition associated with one or more operational parameters at the UE is satisfied. It is noted herein that any discussion regarding the identification of a trigger condition in FIGS. 1-6 may be regarded as applying to step 720 of process flow 700. In this regard, the UE 715 may identify the trigger condition based on operational parameters including, but not limited to, power level (e.g., battery level), operational state of the UE 315 (e.g., idle mode of operation, connected mode of operation), presence/absence of an external power source (e.g., battery pack, A/C power source), mobility state of the UE 315, throughput, energy efficiency, RSRP metric, or any combination thereof.

In some aspects, the process flow 700 illustrated in FIG. 7 may enable the UE 715 to selectively adjust parameters for performing actions associated with an LTE-to-NR (L2N) selection procedure (e.g., L2N reselection procedure), an NR-to-NR (N2N) selection procedure (e.g., NR reselection procedure), or both. In particular, the process flow 700 may enable the UE 715 to selectively adjust parameters for performing actions associated with L2N and/or N2N procedures on a channel-by-channel basis based on a bandwidth of each respective channel. In this regard, the UE 715 may identify that the trigger condition is satisfied at 720 while communicatively coupled to the first cell 705-*a* or the second cell 705-*b*.

For instance, in cases where UE 715 is coupled to the first cell 705-*a*, the UE 715 may perform various steps of process flow 700 in order to adjust parameters for performing actions with an L2N procedure between the first cell 705-*a* (e.g., LTE cell) and the second cell 705-*b* (e.g., NR cell). By way of another example, in cases where UE 715 is coupled to the second cell 705-*b*, the UE 715 may perform various steps of process flow 700 in order to adjust parameters for performing actions with an N2N procedure between the second cell 705-*b* (e.g., NR cell) and another NR cell (not shown). Specifically, process flow 700 may enable the UE 715 to adjust parameters associated with L2N and/or N2N procedures with respect to individual channels of respective cells (e.g., second cell 705-*b*, additional NR cell) in order to make it more or less likely that the UE 715 will complete actions for an L2N and/or N2N procedure with specific channels of the respective cells. In some aspects, the UE 715 may be configured to perform the various steps or actions of process flow 700 while operating in a SA mode of operation.

At 725, the UE 715 may transmit an uplink transmission to the first cell 705-*a*, the second cell 705-*b*, or both. For example, in cases where the UE 715 is in wireless communication with the first cell 705-*a*, the UE 715 may transmit the uplink transmission to the first cell 705-*a*. By way of another example, in cases where the UE 715 is in wireless communication with the second cell 705-*b*, the UE 715 may transmit the uplink transmission to the second cell 705-*b*. As noted previously herein, the UE 715 may transmit the uplink transmission to the first cell 705-*a* or second cell 705-*b* based on identifying the trigger condition at 720. In this regard, any discussion regarding identification of the trigger condition in FIGS. 1-6 may be regarded as applying to step 725 of process flow 700, to the extent applicable.

At 730, the UE 715 may receive a downlink transmission from the first cell 705-*a*, the second cell 705-*b*, or both. In some aspects, the UE 715 may receive the downlink transmission based on (e.g., in response to) transmitting the uplink transmission. In this regard, the UE 715 may receive the downlink transmission from the same cell which received the uplink transmission at 715. In some aspects, the downlink transmission may include information for performing one or more actions associated with a procedure (e.g., L2N procedure, N2N procedure) at the UE 715. In particular, the downlink transmission may include information which may enable the UE 715 to perform (or refrain from performing) actions of the procedures in such a manner as to reduce power consumption and conserver power at the UE 715. In this regard, any discussion regarding receiving the second downlink transmissions at step 335 of process flow 300, step 435 of process flow 400, step 535 of process flow 500, and/or step 640 of process flow 600 may be regarded as applying to step 730 of process flow 700, to the extent applicable.

Moreover, any discussion regarding the determination of bandwidths of channels and comparing determined bandwidths to threshold bandwidths in FIGS. 1-6 may be regarded as applying to steps 735-745 of process flow 700. For example, as described previously herein, the UE 715 may determine one or more bandwidths associated with one or more channels of a cell (e.g., first cell 705-*a*, second cell 705-*b*, additional NR cell) at 735, and compare the one or more determined bandwidths to one or more bandwidth thresholds at 740 and 745.

In some aspects, at 735, the UE 715 may determine one or more bandwidths associated with a channel of a cell associated with an L2N and/or N2N procedure. For example, while communicating with the first cell 705-*a* (e.g., LTE cell), the UE 715 may determine one or more bandwidths associated with the second cell 705-*b* in order to determine whether parameters for an L2N procedure between the first cell 705-*a* and the second cell 705-*b* may be adjusted to implement power savings techniques. By way of another example, while communicating with the second cell 705-*b* (e.g., NR cell), the UE 715 may determine one or more bandwidths associated with an additional NR cell (not shown) in order to determine whether parameters for an N2N procedure between the second cell 705-*b* and the additional NR cell may be adjusted to implement power savings techniques.

In cases where a bandwidth associated with a channel of the selected cell (e.g., second cell 705-*b*, additional NR cell) fails to satisfy the threshold bandwidth at 745, process flow 700 may proceed to 770, where the UE 715 may complete at least one action associated with the procedure (e.g., L2N procedure, N2N procedure) with respect to the determined channel. Comparatively, in cases where a bandwidth associated with a channel of the selected cell (e.g., second cell 705-*b*, additional NR cell) satisfies the threshold bandwidth at 745, process flow 700 may proceed to 750. Moreover, as noted previously herein, steps 750-770 of process flow 700 may be performed with respect to each channel of a cell which is being considered for an L2N and/or N2N procedure.

At 750, the UE 715 may selectively adjust one or more parameters for performing a procedure (e.g., L2N procedure, N2N procedure) with a cell (e.g., second cell 705-*b*, additional NR cell). In some aspects, the UE 715 may selectively adjust the one or more parameters for performing the procedure based on the comparison performed at 740 and 745. In particular, the UE 715 may selectively adjust the one or more parameters for performing the procedure based on a bandwidth of a channel supported by the cell being considered for an L2N/N2N procedure satisfying the threshold bandwidth at 745.

Parameters for performing a procedure (e.g., L2N procedure, N2N procedure) which may be selectively adjusted at 750 may include, but are not limited to, a cell reselection priority metric (e.g., priority Offset), an RSRP threshold (e.g., ThresX,P_Offset), an RSRQ threshold (e.g., ThresX, Q_Offset), or any combination thereof. Moreover, parameters may be adjusted on a channel-by-channel basis. For example, while communicating with the first cell 705-*a*, the UE 715 may determine that a first channel of the second cell 705-*b* satisfies the threshold bandwidth, and may therefore selectively adjust a reselection priority metric, an RSRP threshold, and/or an RSRQ threshold associated with the first channel. In particular, the UE 715 may selectively adjust the one or more parameters for the first channel in order to reduce a probability that the UE 715 may perform an L2N procedure with the first channel of the second cell 705-*b*. For instance, the UE 715 may decrease (e.g., lower) the reselection priority metric of the first channel (e.g., change the priority Offset), increase the RSRP threshold of the first channel, increase the RSRQ threshold of the first channel, or any combination thereof, in order to reduce a probability that the UE 715 will complete the L2N procedure with the second cell 705-*b*.

By way of another example, while communicating with the second cell 705-*b*, the UE 715 may determine that a second channel of an additional NR cell satisfies the threshold bandwidth, and may therefore selectively adjust a reselection priority metric, an RSRP threshold, and/or an RSRQ threshold associated with the second channel. In particular, the UE 715 may selectively adjust the one or more parameters for the second channel in order to reduce a probability that the UE 715 may perform an N2N procedure with the second channel of the additional NR cell. For instance, the UE 715 may decrease (e.g., lower) the reselection priority metric of the second channel (e.g., change the priority Offset), increase the RSRP threshold of the second channel, increase the RSRQ threshold of the second channel, or any combination thereof, in order to reduce a probability that the UE 715 will complete the N2N procedure with the additional NR cell.

In the context of a potential N2N procedure between the second cell 705-*b* and an additional NR cell, the UE 715 may selectively adjust one or more parameters associated with performing the N2N procedure with the additional NR cell in order to prioritize the second cell 705-*b* (e.g., camp on the second cell 705-*b*). For example, the UE 715 may determine that the second cell 705-*b* includes one or more channels with smaller bandwidths than each channel supported by an additional NR cell. In this regard, the UE 715 may prevent increases in power consumption by refraining from completing an N2N procedure from the second cell 705-*b* to the additional NR cell. Accordingly, the UE 715 may selectively adjust one or more parameters associated with the N2N procedure from the second cell 705-*b* to the additional NR cell in order to prioritize the second cell 705-*b*, thereby enabling the UE 715 to camp on the second cell 705-*b* and conserve power.

At 755, the UE 715 may receive one or more reference signals from the second cell 705-*b* (e.g., NR cell), an additional NR cell (not shown), or both. For example, in the context of an L2N procedure between the first cell 705-*a* and the second cell 705-*b*, the UE 715 may receive one or more reference signals form the second cell 705-*b*, which is a candidate for the L2N procedure. By way of another example, in the context of an N2N procedure between the second cell 705-*b* and an additional NR cell (not shown), the UE 715 may receive one or more reference signals form the additional NR cell, which is a candidate for the N2N procedure. In some aspects, the received reference signals may be associated with one or more channels supported by the respective cells.

At 760, the UE 715 may perform a set of measurements for the received reference signals. Measurements may include, but are not limited to, RSSI measurements, RSRP measurements, RSRQ measurements, SNR measurements, SINR measurements, or any combination thereof.

At 765, the UE 715 may compare the measurements performed at 760 to one or more selectively adjusted parameters (e.g., adjusted reselection priority metric, adjusted RSRP/RSRQ thresholds) generated at 750. In this regard, the UE 715 may determine whether the measurements performed for the reference signals at 760 satisfy the selectively adjusted thresholds. In some aspects, RSRP measurements may satisfy an adjusted RSRP threshold if the RSRP measurements are greater than or equal to the adjusted RSRP threshold (e.g., satisfied if $RSRP \geq RSRP_{Thresh}$). Similarly, RSRQ measurements may satisfy an adjusted RSRQ threshold if the RSRQ measurements are greater than or equal to the adjusted RSRQ threshold (e.g., satisfied if $RSRQ \geq RSRQ_{Thresh}$).

For example, at 750, the UE 715 may selectively adjust (e.g., selectively increase) an RSRP threshold for a first channel of the second cell 705-*b*, and may subsequently perform RSRP measurements for reference signals received from the first channel of the second cell 705-*b*. In this example, the UE 715 may compare the determined RSRP measurements to the adjusted RSRP threshold to determine whether the RSRP measurements satisfy the RSRP threshold.

If the measurements fail to satisfy the one or more selectively adjusted parameters at 765 (e.g., fail to satisfy the adjusted cell reselection priority metric, adjusted RSRP/RSRQ thresholds), the process flow 700 may proceed to 775. At 775, the UE 715 may refrain from performing the procedure (e.g., L2N procedure, N2N procedure) with the respective channel. For example, if the measurements of a first channel of the second cell 705-*b* fail to satisfy the adjusted reselection priority metric, the adjusted RSRP threshold, the adjusted RSRQ threshold, or any combination thereof, the UE 715 may refrain from performing an L2N procedure with the first channel of the second cell 705-*b* at 775.

If the measurements satisfy the one or more selectively adjusted parameters at 765 (e.g., satisfy the adjusted cell reselection priority metric, adjusted RSRP/RSRQ thresholds), the process flow 700 may proceed to 770. At 770, the UE 715 may complete the procedure (e.g., L2N procedure, N2N procedure) with the respective channel. For example, if the measurements of a first channel of the second cell 705-*b* satisfy the adjusted reselection priority metric, the adjusted RSRP threshold, the adjusted RSRQ threshold, or any combination thereof, the UE 715 may perform one or more actions to complete an L2N procedure with the first channel of the second cell 705-*b* at 770.

By completing (or refraining from completing) the procedure with channels of the second cell 705-*b* and/or an additional NR cell based on a bandwidth of the respective channels, the techniques described herein may ensure that the UE 715 completes the procedure (e.g., L2N procedure, N2N procedure) with channels which are associated with relatively small bandwidths, and therefore relatively small power consumption levels. In particular, by selectively adjusting parameters associated with L2N and/or N2N procedures on a channel-by-channel basis, the UE 715 may refrain from completing the actions/procedures with channels which are associated with high power consumptions.

Techniques described herein may provide for improved power savings at the UE 715 by enabling the UE 115 to perform or refrain from performing actions or procedures (e.g., L2N procedures, N2N procedures) with individual channels of the second cell 705-*b* and/or additional NR cell based on the respective bandwidths of the individual channels of the respective cells. By enabling the UE 715 to perform (or refrain from performing) actions or procedures with channels of the second cell 705-*b* on a channel-by-channel basis, techniques described herein may support power savings techniques at the UE 715 while simultaneously allowing the UE 715 to establish wireless connections with channels of cells 705 (e.g., second cell 705-*b*) which are associated with lower power consumptions.

Figure 8:
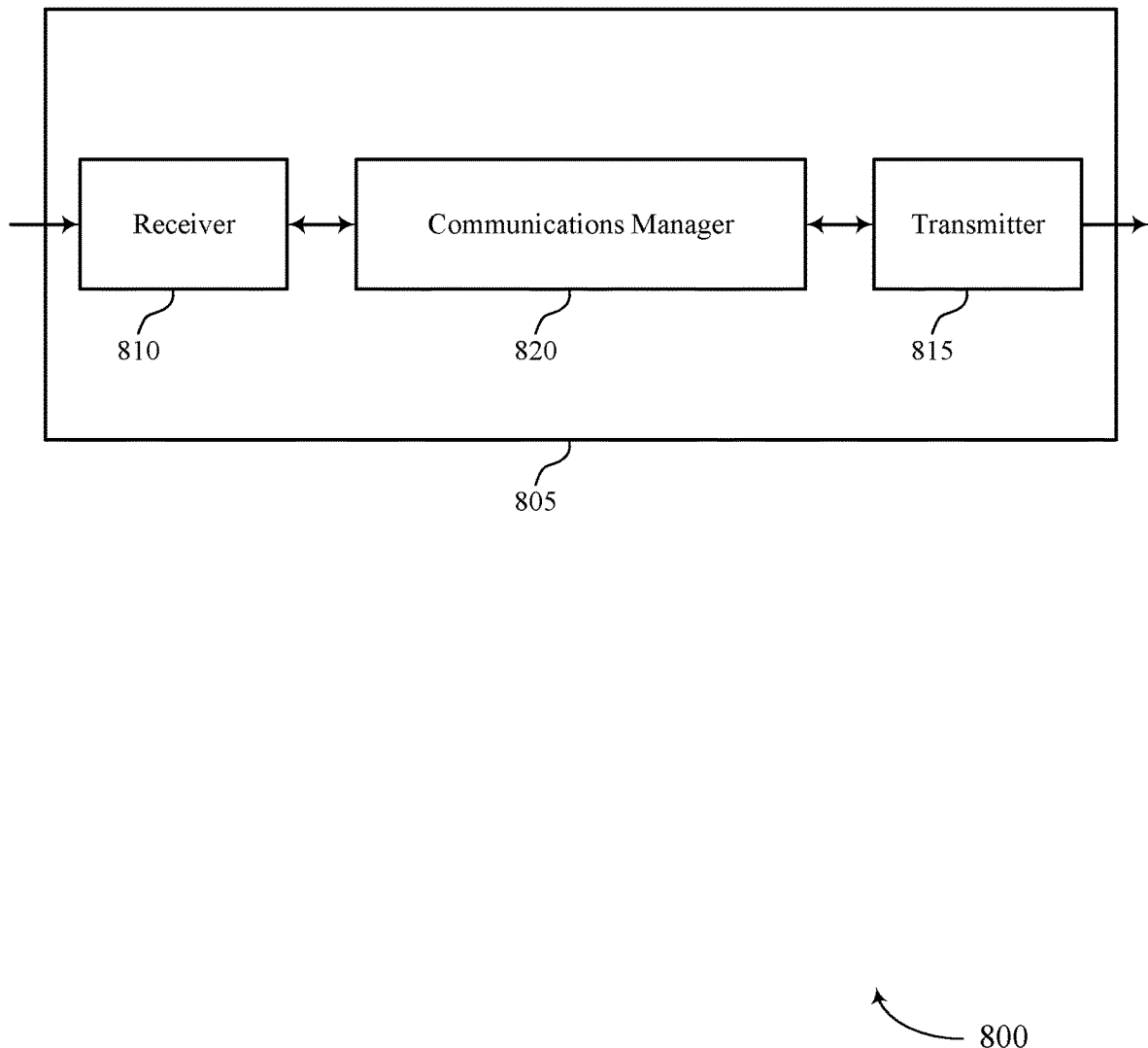
FIGS. 8 and 9 show block diagrams of devices that support techniques for user equipment power saving in accordance with aspects of the present disclosure.

FIG. 8 shows a block diagram 800 of a device 805 that supports techniques for user equipment power saving in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for user equipment power saving). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for user equipment power saving). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for user equipment power saving as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. For example, the communications manager 820 may be configured as or otherwise support a means for receiving a downlink transmission from a first cell, the downlink transmission including information for performing one or more actions associated with a second cell. The communications manager 820 may be configured as or otherwise support a means for identifying a satisfaction of a trigger condition associated with one or more operational parameters at the UE based on a power level of the UE being less than or equal to a threshold power level, a throughput at the UE being less than or equal to a threshold throughput, or both. The communications manager 820 may be configured as or otherwise support a means for identifying, based on the satisfaction of the trigger condition, at least one bandwidth associated with the second cell based on a previous wireless connection between the second cell and the UE, a previous wireless connection between the second cell and an additional UE, or both. The communications manager 820 may be configured as or otherwise support a means for comparing the at least one bandwidth associated with the second cell with a threshold bandwidth. The communications manager 820 may be configured as or otherwise support a means for performing at least one action associated with a procedure based on the comparing.

Additionally or alternatively, the communications manager 820 may support wireless communication at a UE in accordance with examples as disclosed herein. For example, the communications manager 820 may be configured as or otherwise support a means for identifying a satisfaction of a trigger condition associated with one or more operational parameters at the UE based on a power level of the UE being less than or equal to a threshold power level, a throughput at the UE being less than or equal to a threshold throughput, or both. The communications manager 820 may be configured as or otherwise support a means for identifying, based on the satisfaction of the trigger condition, at least one bandwidth associated with a second cell based on a previous wireless connection between the second cell and the UE, a previous wireless connection between the second cell and an additional UE, or both. The communications manager 820 may be configured as or otherwise support a means for comparing, the at least one bandwidth associated with the second cell with a threshold bandwidth. The communications manager 820 may be configured as or otherwise support a means for selectively adjusting one or more parameters for performing one or more actions associated with the second cell based on the comparing. The communications manager 820 may be configured as or otherwise support a means for performing at least one action associated with a procedure based on the adjusting.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for improved power savings at the UE 115 by enabling the UE 115 to perform or refrain from performing procedures (e.g., cell addition procedures, cell handover procedures) with individual channels of a cell based on respective bandwidths of the individual channels of the cell. By enabling the UE 115 to perform (or refrain from performing) procedures with channels of a second cell on a channel-by-channel basis, techniques described herein may support power savings techniques at the UE 115 while simultaneously allowing the UE 115 to establish wireless connections with channels of cells which are associated with lower power consumptions. Therefore, techniques described herein may enable for reduced power consumption and improved wireless communications at the UE 115.

Figure 9:
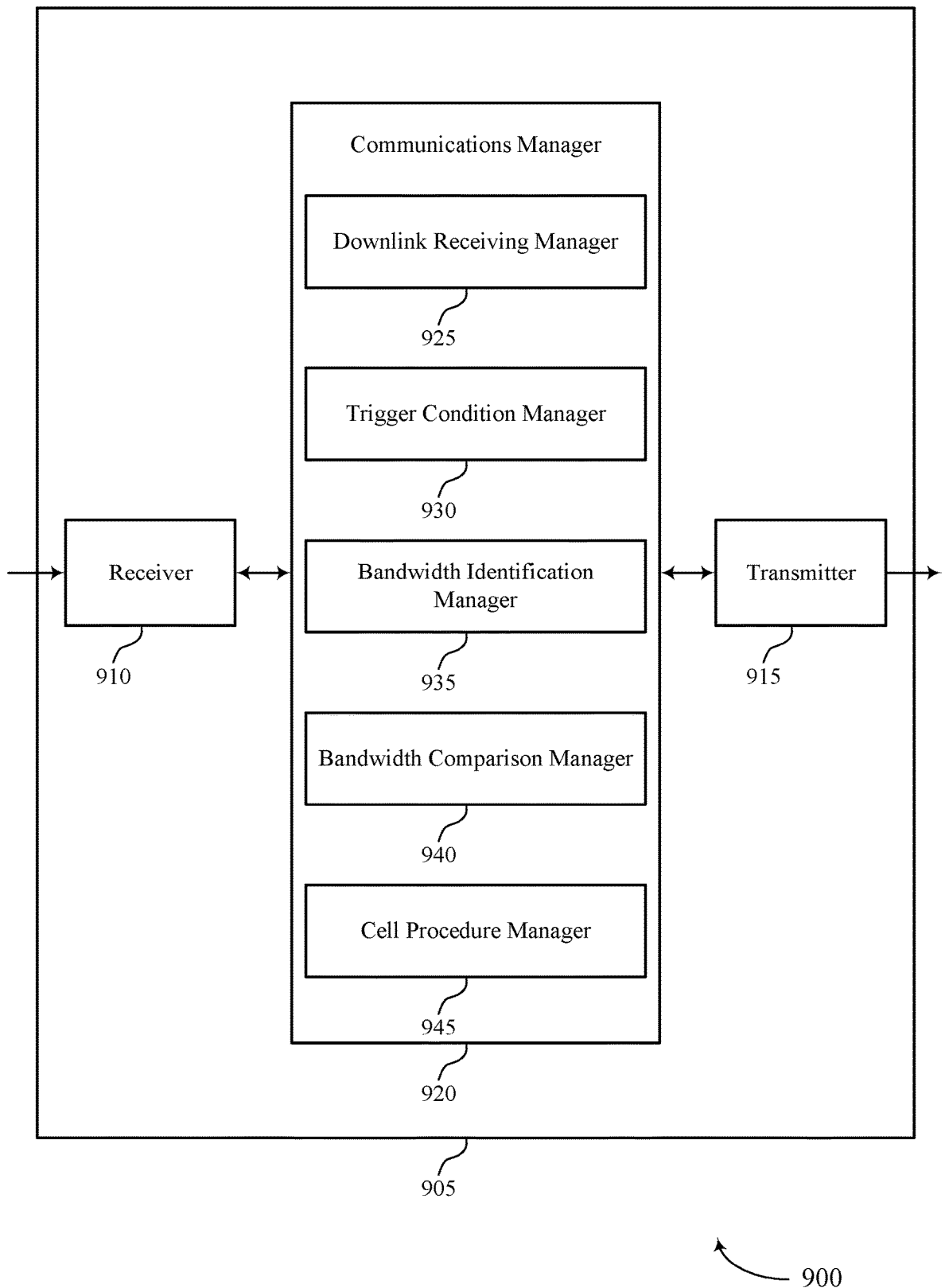

FIG. 9 shows a block diagram 900 of a device 905 that supports techniques for user equipment power saving in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for user equipment power saving). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for user equipment power saving). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for user equipment power saving as described herein. For example, the communications manager 920 may include a downlink receiving manager 925, a trigger condition manager 930, a bandwidth identification manager 935, a bandwidth comparison manager 940, a cell procedure manager 945, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. The downlink receiving manager 925 may be configured as or otherwise support a means for receiving a downlink transmission from a first cell, the downlink transmission including information for performing one or more actions associated with a second cell. The trigger condition manager 930 may be configured as or otherwise support a means for identifying a satisfaction of a trigger condition associated with one or more operational parameters at the UE based on a power level of the UE being less than or equal to a threshold power level, a throughput at the UE being less than or equal to a threshold throughput, or both. The bandwidth identification manager 935 may be configured as or otherwise support a means for identifying, based on the satisfaction of the trigger condition, at least one bandwidth associated with the second cell based on a previous wireless connection between the second cell and the UE, a previous wireless connection between the second cell and an additional UE, or both. The bandwidth comparison manager 940 may be configured as or otherwise support a means for comparing the at least one bandwidth associated with the second cell with a threshold bandwidth. The cell procedure manager 945 may be configured as or otherwise support a means for performing at least one action associated with a procedure based on the comparing.

Additionally or alternatively, the communications manager 920 may support wireless communication at a UE in accordance with examples as disclosed herein. The trigger condition manager 930 may be configured as or otherwise support a means for identifying a satisfaction of a trigger condition associated with one or more operational parameters at the UE based on a power level of the UE being less than or equal to a threshold power level, a throughput at the UE being less than or equal to a threshold throughput, or both. The bandwidth identification manager 935 may be configured as or otherwise support a means for identifying, based on the satisfaction of the trigger condition, at least one bandwidth associated with a second cell based on a previous wireless connection between the second cell and the UE, a previous wireless connection between the second cell and an additional UE, or both. The bandwidth comparison manager 940 may be configured as or otherwise support a means for comparing, the at least one bandwidth associated with the second cell with a threshold bandwidth. The cell procedure manager 945 may be configured as or otherwise support a means for selectively adjusting one or more parameters for performing one or more actions associated with the second cell based on the comparing. The cell procedure manager 945 may be configured as or otherwise support a means for performing at least one action associated with a procedure based on the adjusting.

Figure 10:
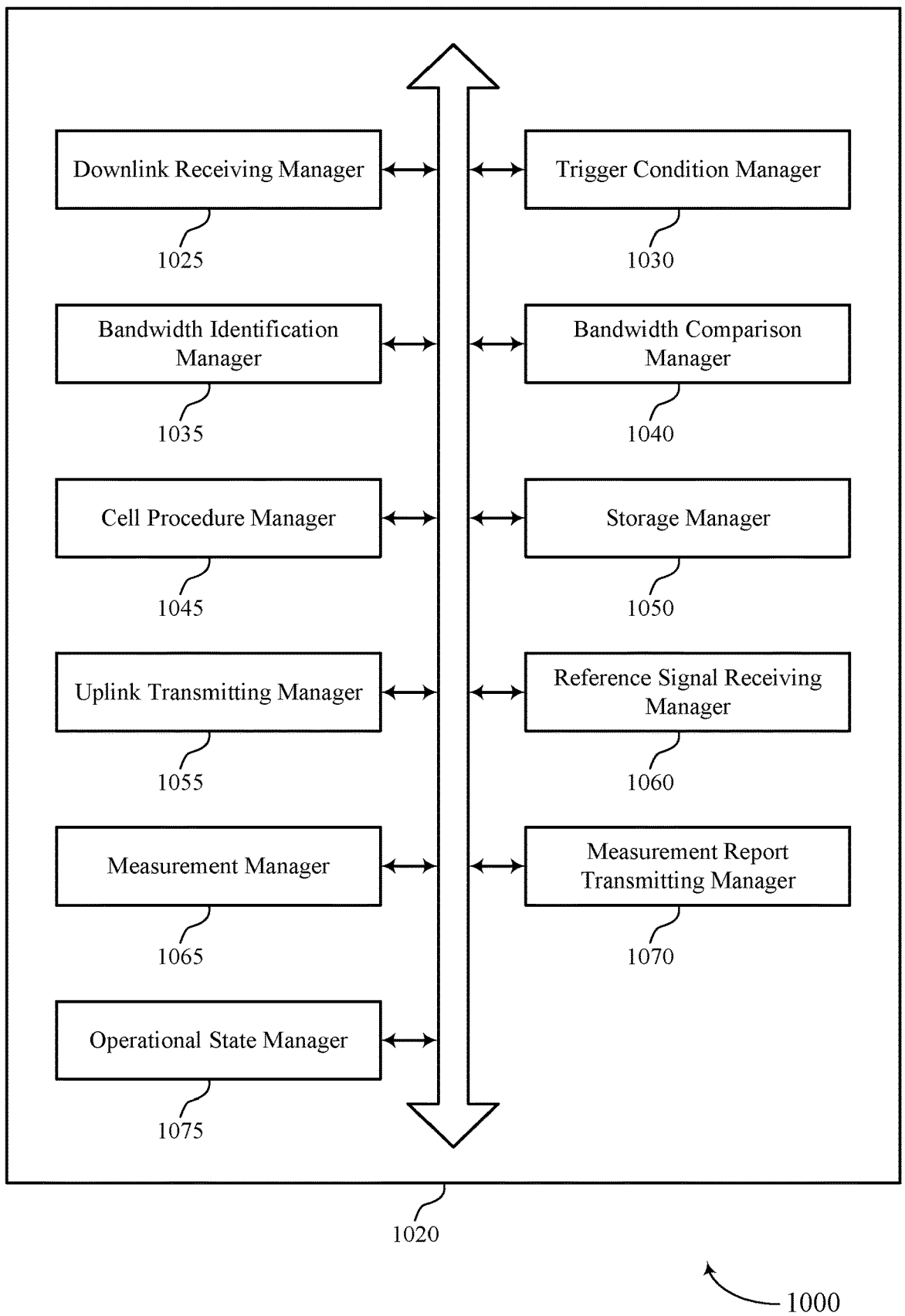
FIG. 10 shows a block diagram of a communications manager that supports techniques for user equipment power saving in accordance with aspects of the present disclosure.

FIG. 10 shows a block diagram 1000 of a communications manager 1020 that supports techniques for user equipment power saving in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for user equipment power saving as described herein. For example, the communications manager 1020 may include a downlink receiving manager 1025, a trigger condition manager 1030, a bandwidth identification manager 1035, a bandwidth comparison manager 1040, a cell procedure manager 1045, a storage manager 1050, an uplink transmitting manager 1055, a reference signal receiving manager 1060, a measurement manager 1065, a measurement report transmitting manager 1070, an operational state manager 1075, or any combination thereof. Each of these components may communicate, directly or indirectly, with one another (e.g., via one or more buses).

The communications manager 1020 may support wireless communication at a UE in accordance with examples as disclosed herein. The downlink receiving manager 1025 may be configured as or otherwise support a means for receiving a downlink transmission from a first cell, the downlink transmission including information for performing one or more actions associated with a second cell. The trigger condition manager 1030 may be configured as or otherwise support a means for identifying a satisfaction of a trigger condition associated with one or more operational parameters at the UE based on a power level of the UE being less than or equal to a threshold power level, a throughput at the UE being less than or equal to a threshold throughput, or both. The bandwidth identification manager 1035 may be configured as or otherwise support a means for identifying, based on the satisfaction of the trigger condition, at least one bandwidth associated with the second cell based on a previous wireless connection between the second cell and the UE, a previous wireless connection between the second cell and an additional UE, or both. The bandwidth comparison manager 1040 may be configured as or otherwise support a means for comparing the at least one bandwidth associated with the second cell with a threshold bandwidth. The cell procedure manager 1045 may be configured as or otherwise support a means for performing at least one action associated with a procedure based on the comparing.

In some examples, to support performing the at least one action associated with the procedure, the cell procedure manager 1045 may be configured as or otherwise support a means for refraining from completing the procedure associated with the channel supported by the second cell based on the at least one bandwidth associated with the channel being greater than or equal to the threshold bandwidth.

In some examples, to support performing the at least one action associated with the procedure, the cell procedure manager 1045 may be configured as or otherwise support a means for completing the procedure associated with the channel supported by the second cell based on the at least one bandwidth associated with the channel being less than or equal to the threshold bandwidth.

In some examples, to support identifying the at least one bandwidth associated with the second cell, the bandwidth identification manager 1035 may be configured as or otherwise support a means for determining the at least one bandwidth associated with the second cell based on the previous wireless connection between the second cell and the UE, where the downlink transmission is received after communicating with the second cell. In some examples, to support identifying the at least one bandwidth associated with the second cell, the storage manager 1050 may be configured as or otherwise support a means for storing the at least one bandwidth in memory.

In some examples, to support identifying the at least one bandwidth associated with the second cell, the uplink transmitting manager 1055 may be configured as or otherwise support a means for transmitting, to the first cell, the second cell, a second UE, or any combination thereof, a request for information associated with the at least one bandwidth of the second cell based on the satisfaction of the trigger condition. In some examples, to support identifying the at least one bandwidth associated with the second cell, the downlink receiving manager 1025 may be configured as or otherwise support a means for receiving an indication of the at least one bandwidth associated with the second cell in response to the request, where identifying the at least one bandwidth is based on the indication.

In some examples, identifying that the trigger condition has been satisfied is based on identifying that the UE is in an idle mode of operation or a connected mode of operation.

In some examples, the uplink transmitting manager 1055 may be configured as or otherwise support a means for transmitting, to the first cell, an uplink transmission indicating the satisfaction of the trigger condition. In some examples, the downlink receiving manager 1025 may be configured as or otherwise support a means for receiving, from the first cell based on transmitting the uplink transmission, a second downlink transmission including information for performing the at least one action associated with the procedure.

In some examples, to support performing the at least one action, the reference signal receiving manager 1060 may be configured as or otherwise support a means for receiving the one or more reference signals from the second cell, the one or more reference signals associated with a set of channels supported by the second cell. In some examples, to support performing the at least one action, the measurement manager 1065 may be configured as or otherwise support a means for performing a set of measurements for the one or more reference signals received from the second cell. In some examples, to support performing the at least one action, the measurement report transmitting manager 1070 may be configured as or otherwise support a means for transmitting, to the first cell, a measurement report based on performing the set of measurements, where the measurement report omits measurements associated with one or more channels of the set of channels based on the at least one bandwidth associated with the one or more channels being greater than or equal to the threshold bandwidth.

In some examples, to support performing the at least one action, the reference signal receiving manager 1060 may be configured as or otherwise support a means for receiving, from the second cell, a reference signal associated with a channel supported by the second cell, where the at least one bandwidth is associated with the channel. In some examples, to support performing the at least one action, the measurement manager 1065 may be configured as or otherwise support a means for refraining from performing measurements for the received reference signal based on the at least one bandwidth associated with the channel being greater than or equal to the threshold bandwidth.

In some examples, to support performing the at least one action, the uplink transmitting manager 1055 may be configured as or otherwise support a means for transmitting, to the first cell, an uplink transmission associated with a radio link failure at the UE based on the at least one bandwidth being greater than or equal to the threshold bandwidth.

In some examples, to support performing the at least one action, the reference signal receiving manager 1060 may be configured as or otherwise support a means for receiving one or more reference signals from the second cell, the one or more reference signals associated with a set of channels supported by the second cell. In some examples, to support performing the at least one action, the measurement manager 1065 may be configured as or otherwise support a means for performing a set of measurements for the one or more reference signals received from the second cell. In some examples, to support performing the at least one action, the measurement report transmitting manager 1070 may be configured as or otherwise support a means for transmitting, to the first cell, a measurement report based on performing the set of measurements, where the measurement report omits measurements associated with one or more channels of the set of channels based on the at least one bandwidth associated with the one or more channels being greater than or equal to the threshold bandwidth.

In some examples, to support performing the at least one action, the reference signal receiving manager 1060 may be configured as or otherwise support a means for receiving, from the second cell, a reference signal associated with a channel supported by the second cell. In some examples, to support performing the at least one action, the measurement manager 1065 may be configured as or otherwise support a means for refraining from performing measurements for the received reference signal based on the at least one bandwidth associated with the channel being greater than or equal to the threshold bandwidth.

In some examples, to support performing the at least one action, the uplink transmitting manager 1055 may be configured as or otherwise support a means for transmitting, to the first cell, an uplink transmission associated with a radio link failure at the UE based on the at least one bandwidth being greater than or equal to the threshold bandwidth.

In some examples, to support performing the at least one action, the operational state manager 1075 may be configured as or otherwise support a means for entering an idle mode of operation based on the at least one bandwidth being greater than or equal to the threshold bandwidth.

In some examples, the bandwidth identification manager 1035 may be configured as or otherwise support a means for identifying the at least one bandwidth associated with the second cell based on an indication of the at least one bandwidth included within the downlink transmission. In some examples, the procedure includes a cell handover procedure, a cell addition procedure, a cell change procedure, a cell redirection procedure, or any combination thereof. In some examples, the first cell is associated with a first radio access technology, and the second cell is associated with a second radio access technology different from the first radio access technology.

In some examples, the first radio access technology includes a long-term evolution radio access technology, a fourth generation radio access technology, or both. In some examples, the second radio access technology includes a New Radio access technology, a fifth generation radio access technology, or both. In some examples, the first cell and the second cell are associated with a common radio access technology. In some examples, the common radio access technology includes a New Radio access technology, a fifth generation radio access technology, or both.

Additionally or alternatively, the communications manager 1020 may support wireless communication at a UE in accordance with examples as disclosed herein. In some examples, the trigger condition manager 1030 may be configured as or otherwise support a means for identifying a satisfaction of a trigger condition associated with one or more operational parameters at the UE based on a power level of the UE being less than or equal to a threshold power level, a throughput at the UE being less than or equal to a threshold throughput, or both. In some examples, the bandwidth identification manager 1035 may be configured as or otherwise support a means for identifying, based on the satisfaction of the trigger condition, at least one bandwidth associated with a second cell based on a previous wireless connection between the second cell and the UE, a previous wireless connection between the second cell and an additional UE, or both. In some examples, the bandwidth comparison manager 1040 may be configured as or otherwise support a means for comparing, the at least one bandwidth associated with the second cell with a threshold bandwidth. In some examples, the cell procedure manager 1045 may be configured as or otherwise support a means for selectively adjusting one or more parameters for performing one or more actions associated with the second cell based on the comparing. In some examples, the cell procedure manager 1045 may be configured as or otherwise support a means for performing at least one action associated with a procedure based on the adjusting.

In some examples, to support performing the at least one action associated with the procedure, the cell procedure manager 1045 may be configured as or otherwise support a means for refraining from completing the procedure associated with the channel supported by the second cell based on the at least one bandwidth associated with the channel being greater than or equal to the threshold bandwidth. In some examples, to support performing the at least one action associated with the procedure, the cell procedure manager 1045 may be configured as or otherwise support a means for completing the procedure associated with the channel supported by the second cell based on the at least one bandwidth associated with the channel being less than or equal to the threshold bandwidth.

In some examples, to support identifying the at least one bandwidth associated with the second cell, the bandwidth comparison manager 1040 may be configured as or otherwise support a means for determining the at least one bandwidth associated with the second cell based on the previous wireless connection between the second cell and the UE. In some examples, to support identifying the at least one bandwidth associated with the second cell, the storage manager 1050 may be configured as or otherwise support a means for storing the at least one bandwidth in memory.

In some examples, the uplink transmitting manager 1055 may be configured as or otherwise support a means for transmitting, to a first cell, an uplink transmission indicating the satisfaction of the trigger condition. In some examples, the downlink receiving manager 1025 may be configured as or otherwise support a means for receiving, from the first cell based on transmitting the uplink transmission, a downlink transmission including additional information for performing the at least one action associated with the procedure.

In some examples, to support selectively adjusting the one or more parameters, the cell procedure manager 1045 may be configured as or otherwise support a means for selectively increasing a reference signal received power threshold, a reference signal received quality threshold, or both.

In some examples, None, and the cell procedure manager 1045 may be configured as or otherwise support a means for receiving one or more reference signals from the second cell, the one or more reference signals associated with one or more channels supported by the second cell. In some examples, None, and the cell procedure manager 1045 may be configured as or otherwise support a means for performing a set of measurements for the one or more reference signals received from the second cell. In some examples, None, and the cell procedure manager 1045 may be configured as or otherwise support a means for determining that measurements associated with the one or more channels satisfy the reference signal received power threshold, the reference signal received quality threshold, or both, where performing the at least one action is based on determining that the measurements associated with the one or more channels satisfy the reference signal received power threshold, the reference signal received quality threshold, or both.

In some examples, the measurements associated with the one or more channels satisfy the reference signal received power threshold if the measurements are greater than or equal to the reference signal received power threshold. In some examples, the measurements associated with the one or more channels satisfy the reference signal received quality threshold if the measurements are greater than or equal to the reference signal received quality threshold.

Figure 11:
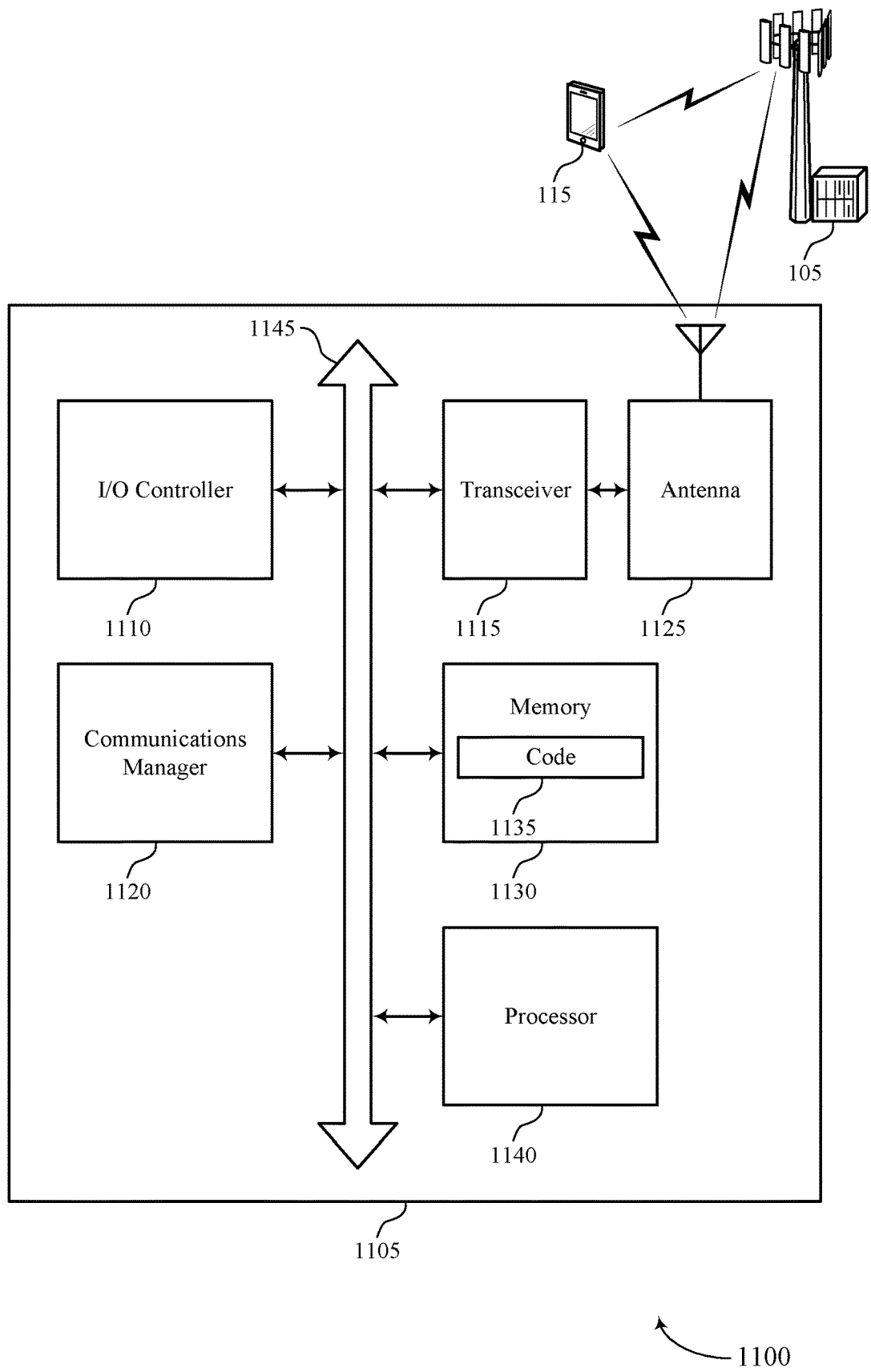
FIG. 11 shows a diagram of a system including a device that supports techniques for user equipment power saving in accordance with aspects of the present disclosure.

FIG. 11 shows a diagram of a system 1100 including a device 1105 that supports techniques for user equipment power saving in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for user equipment power saving). For example, the device 1105 or a component of the device 1105 may include a processor 1140 and memory 1130 coupled to the processor 1140, the processor 1140 and memory 1130 configured to perform various functions described herein.

The communications manager 1120 may support wireless communication at a UE in accordance with examples as disclosed herein. For example, the communications manager 1120 may be configured as or otherwise support a means for receiving a downlink transmission from a first cell, the downlink transmission including information for performing one or more actions associated with a second cell. The communications manager 1120 may be configured as or otherwise support a means for identifying a satisfaction of a trigger condition associated with one or more operational parameters at the UE based on a power level of the UE being less than or equal to a threshold power level, a throughput at the UE being less than or equal to a threshold throughput, or both. The communications manager 1120 may be configured as or otherwise support a means for identifying, based on the satisfaction of the trigger condition, at least one bandwidth associated with the second cell based on a previous wireless connection between the second cell and the UE, a previous wireless connection between the second cell and an additional UE, or both. The communications manager 1120 may be configured as or otherwise support a means for comparing the at least one bandwidth associated with the second cell with a threshold bandwidth. The communications manager 1120 may be configured as or otherwise support a means for performing at least one action associated with a procedure based on the comparing.

Additionally or alternatively, the communications manager 1120 may support wireless communication at a UE in accordance with examples as disclosed herein. For example, the communications manager 1120 may be configured as or otherwise support a means for identifying a satisfaction of a trigger condition associated with one or more operational parameters at the UE based on a power level of the UE being less than or equal to a threshold power level, a throughput at the UE being less than or equal to a threshold throughput, or both. The communications manager 1120 may be configured as or otherwise support a means for identifying, based on the satisfaction of the trigger condition, at least one bandwidth associated with a second cell based on a previous wireless connection between the second cell and the UE, a previous wireless connection between the second cell and an additional UE, or both. The communications manager 1120 may be configured as or otherwise support a means for comparing, the at least one bandwidth associated with the second cell with a threshold bandwidth. The communications manager 1120 may be configured as or otherwise support a means for selectively adjusting one or more parameters for performing one or more actions associated with the second cell based on the comparing. The communications manager 1120 may be configured as or otherwise support a means for performing at least one action associated with a procedure based on the adjusting.

By including or configuring the communications manager 1120 in accordance with examples as described herein, the device 1105 may support techniques for improved power savings at the UE 115 by enabling the UE 115 to perform or refrain from performing procedures (e.g., cell addition procedures, cell handover procedures) with individual channels of a cell based on respective bandwidths of the individual channels of the cell. By enabling the UE 115 to perform (or refrain from performing) procedures with channels of a second cell on a channel-by-channel basis, techniques described herein may support power savings techniques at the UE 115 while simultaneously allowing the UE 115 to establish wireless connections with channels of cells which are associated with lower power consumptions. Therefore, techniques described herein may enable for reduced power consumption, improved battery life, and improved wireless communications at the UE 115.

In some examples, the communications manager 20 may be configured to perform various operations (e.g., receiving, monitoring, transmitting) using or otherwise in cooperation with the transceiver 15, the one or more antennas 25, or any combination thereof. Although the communications manager 20 is illustrated as a separate component, in some examples, one or more functions described with reference to the communications manager 20 may be supported by or performed by the processor 40, the memory 30, the code 35, or any combination thereof. For example, the code 35 may include instructions executable by the processor 40 to cause the device 05 to perform various aspects of techniques for user equipment power saving as described herein, or the processor 40 and the memory 30 may be otherwise configured to perform or support such operations.

Figure 12:
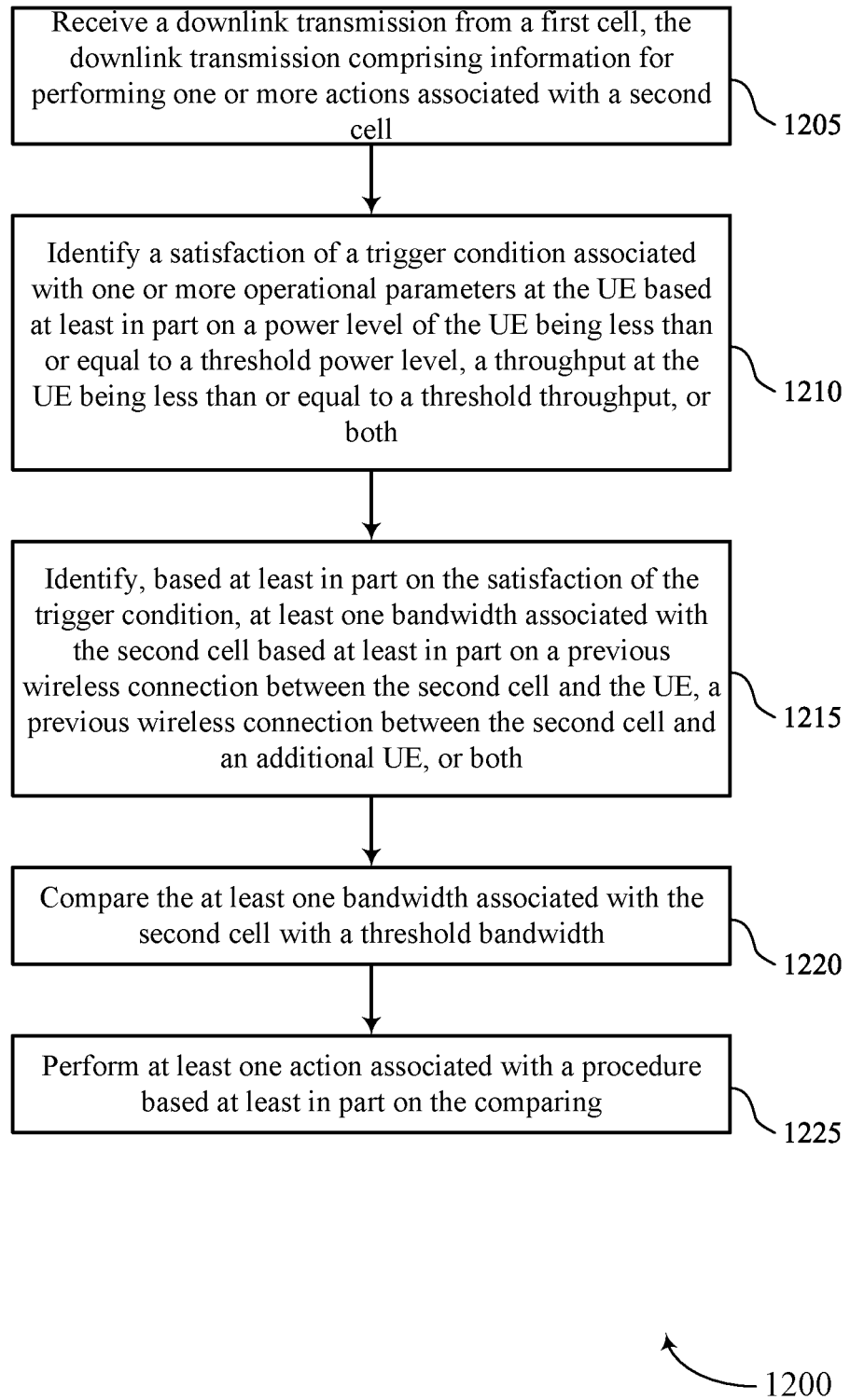
FIGS. 12 through 16 show flowcharts illustrating methods that support techniques for user equipment power saving in accordance with aspects of the present disclosure.

FIG. 12 shows a flowchart illustrating a method 1200 that supports techniques for user equipment power saving in accordance with aspects of the present disclosure. The operations of the method 1200 may be implemented by a UE or its components as described herein. For example, the operations of the method 1200 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1205, the method may include receiving a downlink transmission from a first cell, the downlink transmission including information for performing one or more actions associated with a second cell. The operations of 1205 may be performed in accordance with examples as disclosed herein. In some examples, aspects of the operations of 1205 may be performed by a downlink receiving manager 1025 as described with reference to FIG. 10.

At 1210, the method may include identifying a satisfaction of a trigger condition associated with one or more operational parameters at the UE based on a power level of the UE being less than or equal to a threshold power level, a throughput at the UE being less than or equal to a threshold throughput, or both. The operations of 1210 may be performed in accordance with examples as disclosed herein. In some examples, aspects of the operations of 1210 may be performed by a trigger condition manager 1030 as described with reference to FIG. 10.

At 1215, the method may include identifying, based on the satisfaction of the trigger condition, at least one bandwidth associated with the second cell based on a previous wireless connection between the second cell and the UE, a previous wireless connection between the second cell and an additional UE, or both. The operations of 1215 may be performed in accordance with examples as disclosed herein. In some examples, aspects of the operations of 1215 may be performed by a bandwidth identification manager 1035 as described with reference to FIG. 10.

At 1220, the method may include comparing the at least one bandwidth associated with the second cell with a threshold bandwidth. The operations of 1220 may be performed in accordance with examples as disclosed herein. In some examples, aspects of the operations of 1220 may be performed by a bandwidth comparison manager 1040 as described with reference to FIG. 10.

At 1225, the method may include performing at least one action associated with a procedure based on the comparing. The operations of 1225 may be performed in accordance with examples as disclosed herein. In some examples, aspects of the operations of 1225 may be performed by a cell procedure manager 1045 as described with reference to FIG. 10.

Figure 13:
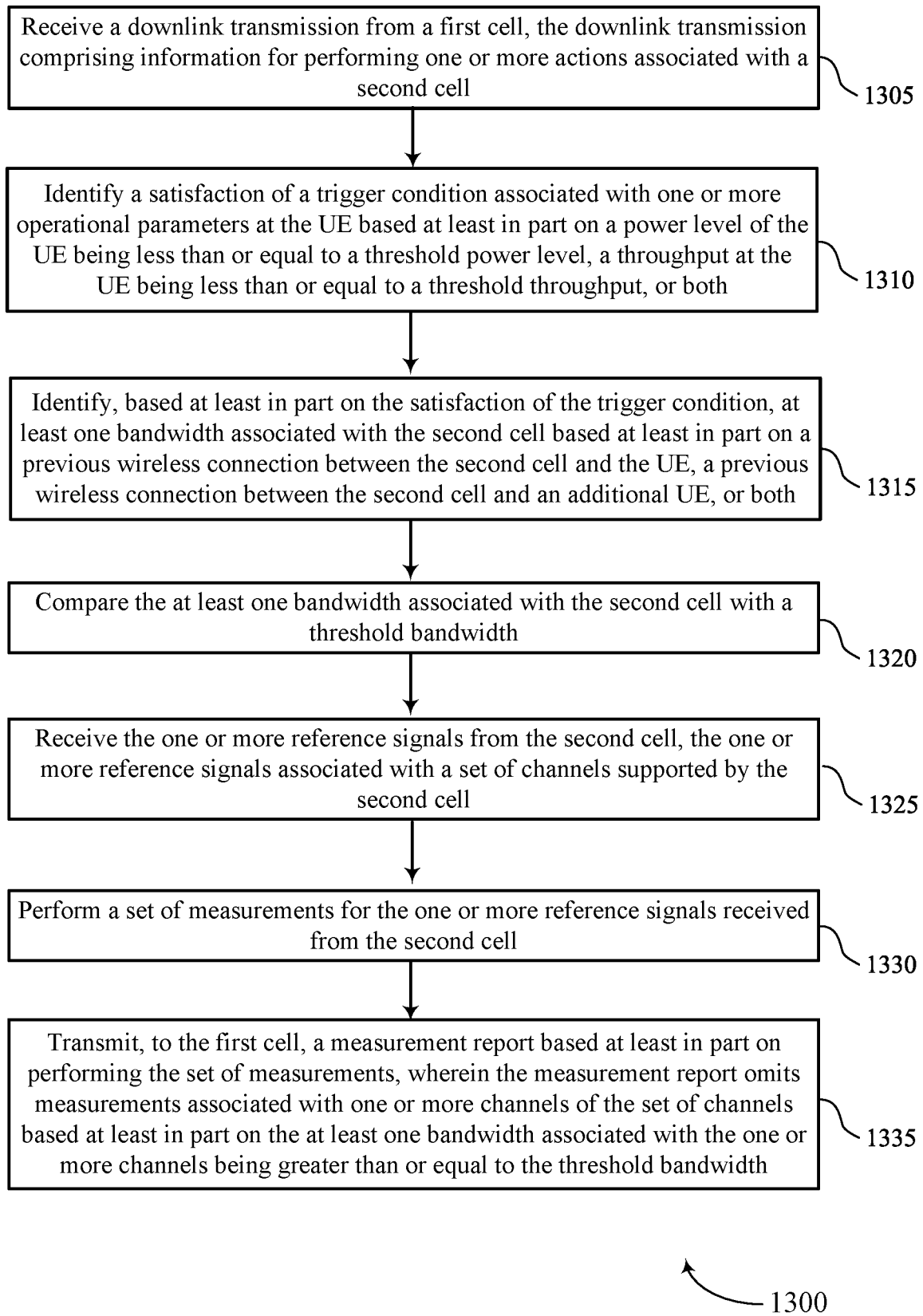

FIG. 13 shows a flowchart illustrating a method 1300 that supports techniques for user equipment power saving in accordance with aspects of the present disclosure. The operations of the method 1300 may be implemented by a UE or its components as described herein. For example, the operations of the method 1300 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1305, the method may include receiving a downlink transmission from a first cell, the downlink transmission including information for performing one or more actions associated with a second cell. The operations of 1305 may be performed in accordance with examples as disclosed herein. In some examples, aspects of the operations of 1305 may be performed by a downlink receiving manager 1025 as described with reference to FIG. 10.

At 1310, the method may include identifying a satisfaction of a trigger condition associated with one or more operational parameters at the UE based on a power level of the UE being less than or equal to a threshold power level, a throughput at the UE being less than or equal to a threshold throughput, or both. The operations of 1310 may be performed in accordance with examples as disclosed herein. In some examples, aspects of the operations of 1310 may be performed by a trigger condition manager 1030 as described with reference to FIG. 10.

At 1315, the method may include identifying, based on the satisfaction of the trigger condition, at least one bandwidth associated with the second cell based on a previous wireless connection between the second cell and the UE, a previous wireless connection between the second cell and an additional UE, or both. The operations of 1315 may be performed in accordance with examples as disclosed herein. In some examples, aspects of the operations of 1315 may be performed by a bandwidth identification manager 1035 as described with reference to FIG. 10.

At 1320, the method may include comparing the at least one bandwidth associated with the second cell with a threshold bandwidth. The operations of 1320 may be performed in accordance with examples as disclosed herein. In some examples, aspects of the operations of 1320 may be performed by a bandwidth comparison manager 1040 as described with reference to FIG. 10.

At 1325, the method may include receiving the one or more reference signals from the second cell, the one or more reference signals associated with a set of channels supported by the second cell. The operations of 1325 may be performed in accordance with examples as disclosed herein. In some examples, aspects of the operations of 1325 may be performed by a reference signal receiving manager 1060 as described with reference to FIG. 10.

At 1330, the method may include performing a set of measurements for the one or more reference signals received from the second cell. The operations of 1330 may be performed in accordance with examples as disclosed herein. In some examples, aspects of the operations of 1330 may be performed by a measurement manager 1065 as described with reference to FIG. 10.

At 1335, the method may include transmitting, to the first cell, a measurement report based on performing the set of measurements, where the measurement report omits measurements associated with one or more channels of the set of channels based on the at least one bandwidth associated with the one or more channels being greater than or equal to the threshold bandwidth. The operations of 1335 may be performed in accordance with examples as disclosed herein. In some examples, aspects of the operations of 1335 may be performed by a measurement report transmitting manager 1070 as described with reference to FIG. 10.

Figure 14:
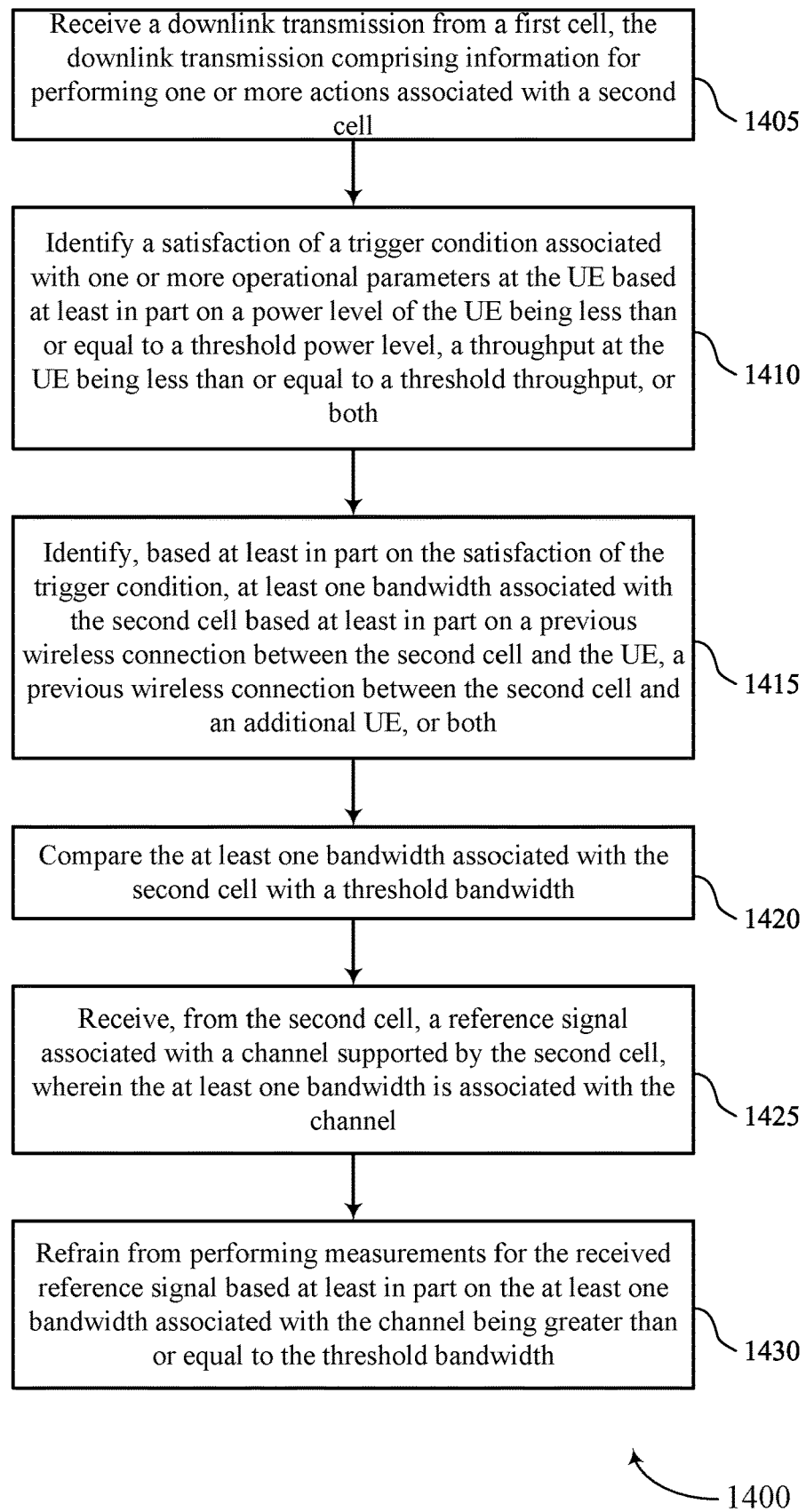

FIG. 14 shows a flowchart illustrating a method 1400 that supports techniques for user equipment power saving in accordance with aspects of the present disclosure. The operations of the method 1400 may be implemented by a UE or its components as described herein. For example, the operations of the method 1400 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1405, the method may include receiving a downlink transmission from a first cell, the downlink transmission including information for performing one or more actions associated with a second cell. The operations of 1405 may be performed in accordance with examples as disclosed herein. In some examples, aspects of the operations of 1405 may be performed by a downlink receiving manager 1025 as described with reference to FIG. 10.

At 1410, the method may include identifying a satisfaction of a trigger condition associated with one or more operational parameters at the UE based on a power level of the UE being less than or equal to a threshold power level, a throughput at the UE being less than or equal to a threshold throughput, or both. The operations of 1410 may be performed in accordance with examples as disclosed herein. In some examples, aspects of the operations of 1410 may be performed by a trigger condition manager 1030 as described with reference to FIG. 10.

At 1415, the method may include identifying, based on the satisfaction of the trigger condition, at least one bandwidth associated with the second cell based on a previous wireless connection between the second cell and the UE, a previous wireless connection between the second cell and an additional UE, or both. The operations of 1415 may be performed in accordance with examples as disclosed herein. In some examples, aspects of the operations of 1415 may be performed by a bandwidth identification manager 1035 as described with reference to FIG. 10.

At 1420, the method may include comparing the at least one bandwidth associated with the second cell with a threshold bandwidth. The operations of 1420 may be performed in accordance with examples as disclosed herein. In some examples, aspects of the operations of 1420 may be performed by a bandwidth comparison manager 1040 as described with reference to FIG. 10.

At 1425, the method may include receiving, from the second cell, a reference signal associated with a channel supported by the second cell, where the at least one bandwidth is associated with the channel. The operations of 1425 may be performed in accordance with examples as disclosed herein. In some examples, aspects of the operations of 1425 may be performed by a reference signal receiving manager 1060 as described with reference to FIG. 10.

At 1430, the method may include refraining from performing measurements for the received reference signal based on the at least one bandwidth associated with the channel being greater than or equal to the threshold bandwidth. The operations of 1430 may be performed in accordance with examples as disclosed herein. In some examples, aspects of the operations of 1430 may be performed by a measurement manager 1065 as described with reference to FIG. 10.

Figure 15:
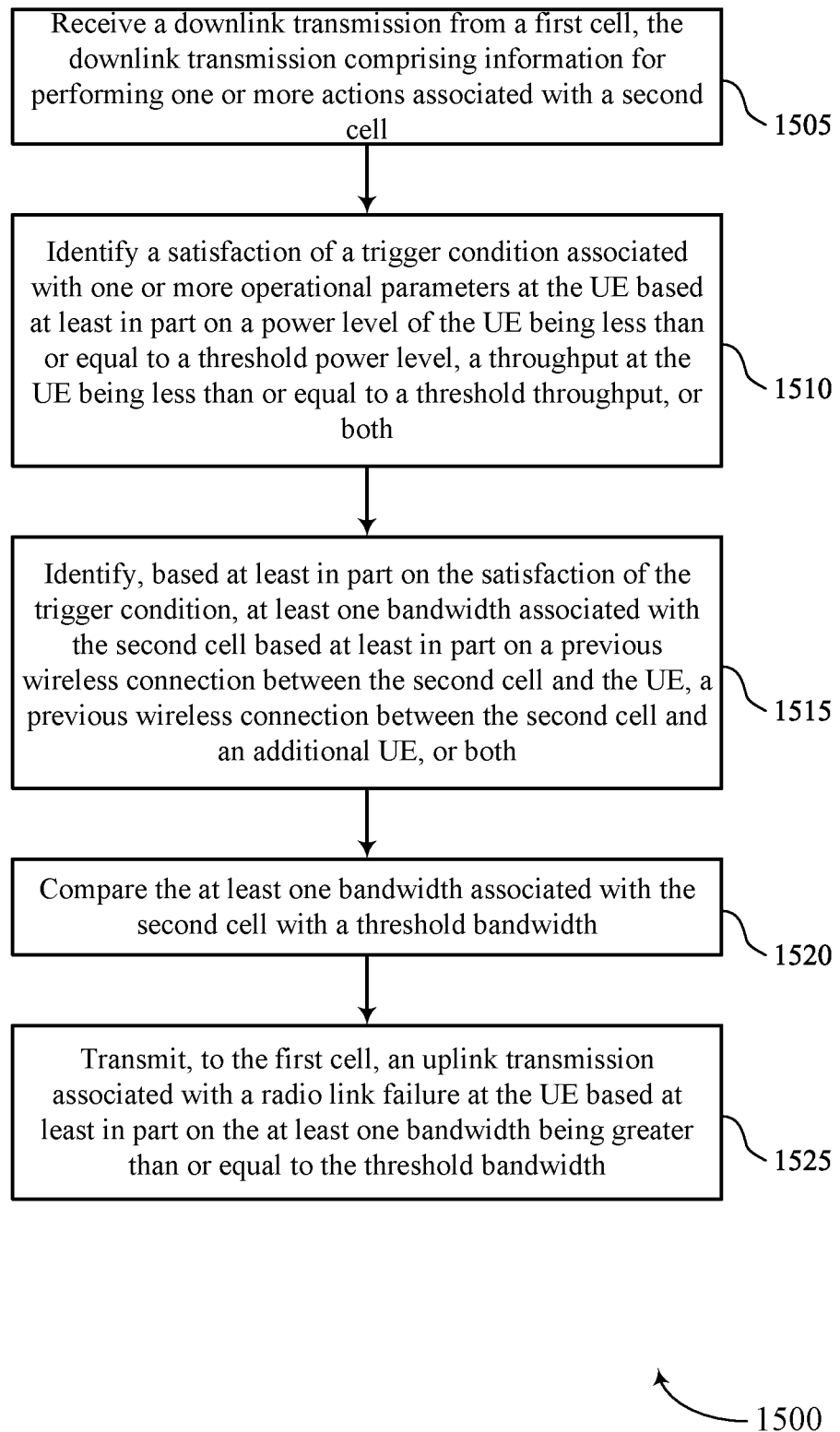

FIG. 15 shows a flowchart illustrating a method 1500 that supports techniques for user equipment power saving in accordance with aspects of the present disclosure. The operations of the method 1500 may be implemented by a UE or its components as described herein. For example, the operations of the method 1500 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1505, the method may include receiving a downlink transmission from a first cell, the downlink transmission including information for performing one or more actions associated with a second cell. The operations of 1505 may be performed in accordance with examples as disclosed herein. In some examples, aspects of the operations of 1505 may be performed by a downlink receiving manager 1025 as described with reference to FIG. 10.

At 1510, the method may include identifying a satisfaction of a trigger condition associated with one or more operational parameters at the UE based on a power level of the UE being less than or equal to a threshold power level, a throughput at the UE being less than or equal to a threshold throughput, or both. The operations of 1510 may be performed in accordance with examples as disclosed herein. In some examples, aspects of the operations of 1510 may be performed by a trigger condition manager 1030 as described with reference to FIG. 10.

At 1515, the method may include identifying, based on the satisfaction of the trigger condition, at least one bandwidth associated with the second cell based on a previous wireless connection between the second cell and the UE, a previous wireless connection between the second cell and an additional UE, or both. The operations of 1515 may be performed in accordance with examples as disclosed herein. In some examples, aspects of the operations of 1515 may be performed by a bandwidth identification manager 1035 as described with reference to FIG. 10.

At 1520, the method may include comparing the at least one bandwidth associated with the second cell with a threshold bandwidth. The operations of 1520 may be performed in accordance with examples as disclosed herein. In some examples, aspects of the operations of 1520 may be performed by a bandwidth comparison manager 1040 as described with reference to FIG. 10.

At 1525, the method may include transmitting, to the first cell, an uplink transmission associated with a radio link failure at the UE based on the at least one bandwidth being greater than or equal to the threshold bandwidth. The operations of 1525 may be performed in accordance with examples as disclosed herein. In some examples, aspects of the operations of 1525 may be performed by an uplink transmitting manager 1055 as described with reference to FIG. 10.

Figure 16:
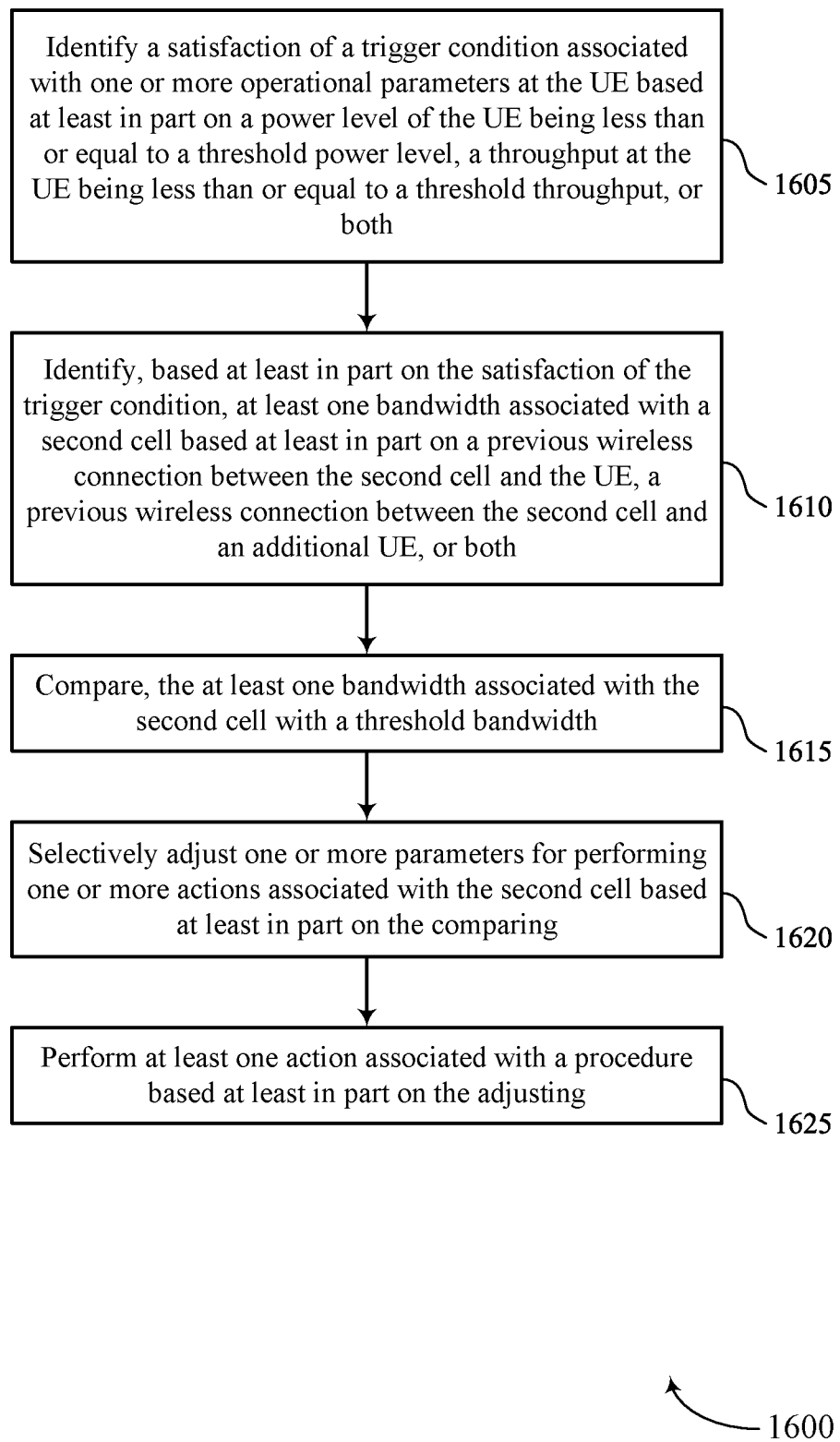

FIG. 16 shows a flowchart illustrating a method 1600 that supports techniques for user equipment power saving in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1605, the method may include identifying a satisfaction of a trigger condition associated with one or more operational parameters at the UE based on a power level of the UE being less than or equal to a threshold power level, a throughput at the UE being less than or equal to a threshold throughput, or both. The operations of 1605 may be performed in accordance with examples as disclosed herein. In some examples, aspects of the operations of 1605 may be performed by a trigger condition manager 1030 as described with reference to FIG. 10.

At 1610, the method may include identifying, based on the satisfaction of the trigger condition, at least one bandwidth associated with a second cell based on a previous wireless connection between the second cell and the UE, a previous wireless connection between the second cell and an additional UE, or both. The operations of 1610 may be performed in accordance with examples as disclosed herein. In some examples, aspects of the operations of 1610 may be performed by a bandwidth identification manager 1035 as described with reference to FIG. 10.

At 1615, the method may include comparing, the at least one bandwidth associated with the second cell with a threshold bandwidth. The operations of 1615 may be performed in accordance with examples as disclosed herein. In some examples, aspects of the operations of 1615 may be performed by a bandwidth comparison manager 1040 as described with reference to FIG. 10.

At 1620, the method may include selectively adjusting one or more parameters for performing one or more actions associated with the second cell based on the comparing. The operations of 1620 may be performed in accordance with examples as disclosed herein. In some examples, aspects of the operations of 1620 may be performed by a cell procedure manager 1045 as described with reference to FIG. 10.

At 1625, the method may include performing at least one action associated with a procedure based on the adjusting. The operations of 1625 may be performed in accordance with examples as disclosed herein. In some examples, aspects of the operations of 1625 may be performed by a cell procedure manager 1045 as described with reference to FIG. 10.

The following provides an overview of aspects of the present disclosure:

Aspect 1: A method for wireless communication at a UE, comprising: receiving a downlink transmission from a first cell, the downlink transmission comprising information for performing one or more actions associated with a second cell; identifying a satisfaction of a trigger condition associated with one or more operational parameters at the UE based at least in part on a power level of the UE being less than or equal to a threshold power level, a throughput at the UE being less than or equal to a threshold throughput, or both; identifying, based at least in part on the satisfaction of the trigger condition, at least one bandwidth associated with the second cell based at least in part on a previous wireless connection between the second cell and the UE, a previous wireless connection between the second cell and an additional UE, or both; comparing the at least one bandwidth associated with the second cell with a threshold bandwidth; and performing at least one action associated with a procedure based at least in part on the comparing.

Aspect 2: The method of aspect 1, wherein the at least one bandwidth is associated with a channel supported by the second cell, wherein performing the at least one action associated with the procedure comprises: refraining from completing the procedure associated with the channel supported by the second cell based at least in part on the at least one bandwidth associated with the channel being greater than or equal to the threshold bandwidth.

Aspect 3: The method of aspect 1, wherein the at least one bandwidth is associated with a channel supported by the second cell, wherein performing the at least one action associated with the procedure comprises: completing the procedure associated with the channel supported by the second cell based at least in part on the at least one bandwidth associated with the channel being less than or equal to the threshold bandwidth.

Aspect 4: The method of any of aspects 1 through 3, wherein identifying the at least one bandwidth associated with the second cell comprises: determining the at least one bandwidth associated with the second cell based at least in part on the previous wireless connection between the second cell and the UE, wherein the downlink transmission is received after communicating with the second cell; and storing the at least one bandwidth in memory.

Aspect 5: The method of any of aspects 1 through 3, wherein identifying the at least one bandwidth associated with the second cell comprises: transmitting, to the first cell, the second cell, a second UE, or any combination thereof, a request for information associated with the at least one bandwidth of the second cell based at least in part on the satisfaction of the trigger condition; and receiving an indication of the at least one bandwidth associated with the second cell in response to the request, wherein identifying the at least one bandwidth is based at least in part on the indication.

Aspect 6: The method of any of aspects 1 through 5, wherein identifying that the trigger condition has been satisfied is based at least in part on identifying that the UE is in an idle mode of operation or a connected mode of operation.

Aspect 7: The method of any of aspects 1 through 6, further comprising: transmitting, to the first cell, an uplink transmission indicating the satisfaction of the trigger condition; and receiving, from the first cell based at least in part on transmitting the uplink transmission, a second downlink transmission comprising information for performing the at least one action associated with the procedure.

Aspect 8: The method of any of aspects 1 through 7, wherein the downlink transmission comprises an indication for the UE to perform measurements on one or more reference signals received from the second cell, wherein performing the at least one action comprises: receiving the one or more reference signals from the second cell, the one or more reference signals associated with a set of channels supported by the second cell; performing a set of measurements for the one or more reference signals received from the second cell; and transmitting, to the first cell, a measurement report based at least in part on performing the set of measurements, wherein the measurement report omits measurements associated with one or more channels of the set of channels based at least in part on the at least one bandwidth associated with the one or more channels being greater than or equal to the threshold bandwidth.

Aspect 9: The method of any of aspects 1 through 7, wherein the downlink transmission comprises an indication for the UE to perform measurements on one or more reference signals received from the second cell, wherein performing the at least one action comprises: receiving, from the second cell, a reference signal associated with a channel supported by the second cell, wherein the at least one bandwidth is associated with the channel; and refraining from performing measurements for the received reference signal based at least in part on the at least one bandwidth associated with the channel being greater than or equal to the threshold bandwidth.

Aspect 10: The method of any of aspects 1 through 7, wherein the downlink transmission comprises an indication for the UE to establish a wireless connection with the second cell, wherein performing the at least one action comprises: transmitting, to the first cell, an uplink transmission associated with a radio link failure at the UE based at least in part on the at least one bandwidth being greater than or equal to the threshold bandwidth.

Aspect 11: The method of any of aspects 1 through 7, wherein the downlink transmission comprises an indication for the UE to perform a handover procedure from the first cell to the second cell, wherein performing the at least one action comprises: receiving one or more reference signals from the second cell, the one or more reference signals associated with a set of channels supported by the second cell; performing a set of measurements for the one or more reference signals received from the second cell; and transmitting, to the first cell, a measurement report based at least in part on performing the set of measurements, wherein the measurement report omits measurements associated with one or more channels of the set of channels based at least in part on the at least one bandwidth associated with the one or more channels being greater than or equal to the threshold bandwidth.

Aspect 12: The method of any of aspects 1 through 7, wherein the downlink transmission comprises an indication for the UE to perform a handover procedure from the first cell to the second cell, wherein performing the at least one action comprises: receiving, from the second cell, a reference signal associated with a channel supported by the second cell; and refraining from performing measurements for the received reference signal based at least in part on the at least one bandwidth associated with the channel being greater than or equal to the threshold bandwidth.

Aspect 13: The method of any of aspects 1 through 7, wherein the downlink transmission comprises an indication for the UE to perform a handover procedure from the first cell to the second cell, wherein performing the at least one action comprises: transmitting, to the first cell, an uplink transmission associated with a radio link failure at the UE based at least in part on the at least one bandwidth being greater than or equal to the threshold bandwidth.

Aspect 14: The method of any of aspects 1 through 7, wherein the downlink transmission comprises an indication for the UE to perform a release with a cell redirection procedure from the first cell to the second cell, wherein performing the at least one action comprises: entering an idle mode of operation based at least in part on the at least one bandwidth being greater than or equal to the threshold bandwidth.

Aspect 15: The method of any of aspects 1 through 14, further comprising: identifying the at least one bandwidth associated with the second cell based at least in part on an indication of the at least one bandwidth included within the downlink transmission.

Aspect 16: The method of any of aspects 1 through 15, wherein the procedure comprises a cell handover procedure, a cell addition procedure, a cell change procedure, a cell redirection procedure, or any combination thereof.

Aspect 17: The method of any of aspects 1 through 16, wherein the first cell is associated with a first radio access technology, and the second cell is associated with a second radio access technology different from the first radio access technology.

Aspect 18: The method of aspect 17, wherein the first radio access technology comprises a long-term evolution radio access technology, a fourth generation radio access technology, or both, and the second radio access technology comprises a New Radio access technology, a fifth generation radio access technology, or both.

Aspect 19: The method of any of aspects 1 through 16, wherein the first cell and the second cell are associated with a common radio access technology.

Aspect 20: The method of aspect 19, wherein the common radio access technology comprises a New Radio access technology, a fifth generation radio access technology, or both.

Aspect 21: A method for wireless communication at a UE, comprising: identifying a satisfaction of a trigger condition associated with one or more operational parameters at the UE based at least in part on a power level of the UE being less than or equal to a threshold power level, a throughput at the UE being less than or equal to a threshold throughput, or both; identifying, based at least in part on the satisfaction of the trigger condition, at least one bandwidth associated with a second cell based at least in part on a previous wireless connection between the second cell and the UE, a previous wireless connection between the second cell and an additional UE, or both; comparing, the at least one bandwidth associated with the second cell with a threshold bandwidth; selectively adjusting one or more parameters for performing one or more actions associated with the second cell based at least in part on the comparing; and performing at least one action associated with a procedure based at least in part on the adjusting.

Aspect 22: The method of aspect 21, wherein the at least one bandwidth is associated with a channel supported by the second cell, wherein performing the at least one action associated with the procedure comprises: refraining from completing the procedure associated with the channel supported by the second cell based at least in part on the at least one bandwidth associated with the channel being greater than or equal to the threshold bandwidth.

Aspect 23: The method of aspect 21, wherein the at least one bandwidth is associated with a channel supported by the second cell, wherein performing the at least one action associated with the procedure comprises: completing the procedure associated with the channel supported by the second cell based at least in part on the at least one bandwidth associated with the channel being less than or equal to the threshold bandwidth.

Aspect 24: The method of any of aspects 21 through 23, wherein identifying the at least one bandwidth associated with the second cell comprises: determining the at least one bandwidth associated with the second cell based at least in part on the previous wireless connection between the second cell and the UE; and storing the at least one bandwidth in memory.

Aspect 25: The method of any of aspects 21 through 24, further comprising: transmitting, to a first cell, an uplink transmission indicating the satisfaction of the trigger condition; and receiving, from the first cell based at least in part on transmitting the uplink transmission, a downlink transmission comprising additional information for performing the at least one action associated with the procedure.

Aspect 26: The method of any of aspects 21 through 25, wherein selectively adjusting the one or more parameters comprises: selectively increasing a reference signal received power threshold, a reference signal received quality threshold, or both.

Aspect 27: The method of aspect 26, the method further comprising: receiving one or more reference signals from the second cell, the one or more reference signals associated with one or more channels supported by the second cell performing a set of measurements for the one or more reference signals received from the second cell; and determining that measurements associated with the one or more channels satisfy the reference signal received power threshold, the reference signal received quality threshold, or both, wherein performing the at least one action is based at least in part on determining that the measurements associated with the one or more channels satisfy the reference signal received power threshold, the reference signal received quality threshold, or both.

Aspect 28: The method of aspect 27, wherein the measurements associated with the one or more channels satisfy the reference signal received power threshold if the measurements are greater than or equal to the reference signal received power threshold, and the measurements associated with the one or more channels satisfy the reference signal received quality threshold if the measurements are greater than or equal to the reference signal received quality threshold.

Aspect 29: An apparatus for wireless communication at a UE, comprising a processor; memory coupled with the processor; and instructions stored in the memory and executable by the processor to cause the apparatus to perform a method of any of aspects 1 through 20.

Aspect 30: An apparatus for wireless communication at a UE, comprising at least one means for performing a method of any of aspects 1 through 20.

Aspect 31: A non-transitory computer-readable medium storing code for wireless communication at a UE, the code comprising instructions executable by a processor to perform a method of any of aspects 1 through 20.

Aspect 32: An apparatus for wireless communication at a UE, comprising a processor; memory coupled with the processor; and instructions stored in the memory and executable by the processor to cause the apparatus to perform a method of any of aspects 21 through 28.

Aspect 33: An apparatus for wireless communication at a UE, comprising at least one means for performing a method of any of aspects 21 through 28.

Aspect 34: A non-transitory computer-readable medium storing code for wireless communication at a UE, the code comprising instructions executable by a processor to perform a method of any of aspects 21 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving a downlink transmission from a first cell, the downlink transmission comprising information for performing one or more actions associated with a second cell;
   identifying a satisfaction of a trigger condition associated with one or more operational parameters at the UE based at least in part on a power level of the UE being less than or equal to a threshold power level, a throughput at the UE being less than or equal to a threshold throughput, or both;
   identifying, based at least in part on the satisfaction of the trigger condition, at least one bandwidth associated with the second cell based at least in part on a previous wireless connection between the second cell and the UE, a previous wireless connection between the second cell and an additional UE, or both;
   comparing the at least one bandwidth associated with the second cell with a threshold bandwidth; and
   performing at least one action associated with a procedure based at least in part on the comparing.

2. The method of claim 1, wherein the at least one bandwidth is associated with a channel supported by the second cell, wherein performing the at least one action associated with the procedure comprises:
   refraining from completing the procedure associated with the channel supported by the second cell based at least in part on the at least one bandwidth associated with the channel being greater than or equal to the threshold bandwidth.

3. The method of claim 1, wherein the at least one bandwidth is associated with a channel supported by the second cell, wherein performing the at least one action associated with the procedure comprises:
   completing the procedure associated with the channel supported by the second cell based at least in part on the at least one bandwidth associated with the channel being less than or equal to the threshold bandwidth.

4. The method of claim 1, wherein identifying the at least one bandwidth associated with the second cell comprises:
   determining the at least one bandwidth associated with the second cell based at least in part on the previous wireless connection between the second cell and the UE, wherein the downlink transmission is received after communicating with the second cell; and
   storing the at least one bandwidth in memory.

5. The method of claim 1, wherein identifying the at least one bandwidth associated with the second cell comprises:
   transmitting, to the first cell, the second cell, a second UE, or any combination thereof, a request for information associated with the at least one bandwidth of the second cell based at least in part on the satisfaction of the trigger condition; and
   receiving an indication of the at least one bandwidth associated with the second cell in response to the request, wherein identifying the at least one bandwidth is based at least in part on the indication.

6. The method of claim 1, wherein identifying that the trigger condition has been satisfied is based at least in part on identifying that the UE is in an idle mode of operation or a connected mode of operation.

7. The method of claim 1, further comprising:
transmitting, to the first cell, an uplink transmission indicating the satisfaction of the trigger condition; and
receiving, from the first cell based at least in part on transmitting the uplink transmission, a second downlink transmission comprising information for performing the at least one action associated with the procedure.

8. The method of claim 1, wherein the downlink transmission comprises an indication for the UE to perform measurements on one or more reference signals received from the second cell, wherein performing the at least one action comprises:
receiving the one or more reference signals from the second cell, the one or more reference signals associated with a set of channels supported by the second cell;
performing a set of measurements for the one or more reference signals received from the second cell; and
transmitting, to the first cell, a measurement report based at least in part on performing the set of measurements, wherein the measurement report omits measurements associated with one or more channels of the set of channels based at least in part on the at least one bandwidth associated with the one or more channels being greater than or equal to the threshold bandwidth.

9. The method of claim 1, wherein the downlink transmission comprises an indication for the UE to perform measurements on one or more reference signals received from the second cell, wherein performing the at least one action comprises:
receiving, from the second cell, a reference signal associated with a channel supported by the second cell, wherein the at least one bandwidth is associated with the channel; and
refraining from performing measurements for the received reference signal based at least in part on the at least one bandwidth associated with the channel being greater than or equal to the threshold bandwidth.

10. The method of claim 1, wherein the downlink transmission comprises an indication for the UE to establish a wireless connection with the second cell, wherein performing the at least one action comprises:
transmitting, to the first cell, an uplink transmission associated with a radio link failure at the UE based at least in part on the at least one bandwidth being greater than or equal to the threshold bandwidth.

11. The method of claim 1, wherein the downlink transmission comprises an indication for the UE to perform a handover procedure from the first cell to the second cell, wherein performing the at least one action comprises:
receiving one or more reference signals from the second cell, the one or more reference signals associated with a set of channels supported by the second cell;
performing a set of measurements for the one or more reference signals received from the second cell; and
transmitting, to the first cell, a measurement report based at least in part on performing the set of measurements, wherein the measurement report omits measurements associated with one or more channels of the set of channels based at least in part on the at least one bandwidth associated with the one or more channels being greater than or equal to the threshold bandwidth.

12. The method of claim 1, wherein the downlink transmission comprises an indication for the UE to perform a handover procedure from the first cell to the second cell, wherein performing the at least one action comprises:
receiving, from the second cell, a reference signal associated with a channel supported by the second cell; and
refraining from performing measurements for the received reference signal based at least in part on the at least one bandwidth associated with the channel being greater than or equal to the threshold bandwidth.

13. The method of claim 1, wherein the downlink transmission comprises an indication for the UE to perform a handover procedure from the first cell to the second cell, wherein performing the at least one action comprises:
transmitting, to the first cell, an uplink transmission associated with a radio link failure at the UE based at least in part on the at least one bandwidth being greater than or equal to the threshold bandwidth.

14. The method of claim 1, wherein the downlink transmission comprises an indication for the UE to perform a release with a cell redirection procedure from the first cell to the second cell, wherein performing the at least one action comprises:
entering an idle mode of operation based at least in part on the at least one bandwidth being greater than or equal to the threshold bandwidth.

15. The method of claim 1, further comprising:
identifying the at least one bandwidth associated with the second cell based at least in part on an indication of the at least one bandwidth included within the downlink transmission.

16. The method of claim 1, wherein the procedure comprises a cell handover procedure, a cell addition procedure, a cell change procedure, a cell redirection procedure, or any combination thereof.

17. The method of claim 1, wherein the first cell is associated with a first radio access technology, and the second cell is associated with a second radio access technology different from the first radio access technology.

18. The method of claim 17, wherein the first radio access technology comprises a long-term evolution radio access technology, a fourth generation radio access technology, or both, and wherein the second radio access technology comprises a New Radio access technology, a fifth generation radio access technology, or both.

19. The method of claim 1, wherein the first cell and the second cell are associated with a common radio access technology.

20. The method of claim 19, wherein the common radio access technology comprises a New Radio access technology, a fifth generation radio access technology, or both.

21. A method for wireless communication at a user equipment (UE), comprising:
identifying a satisfaction of a trigger condition associated with one or more operational parameters at the UE based at least in part on a power level of the UE being less than or equal to a threshold power level, a throughput at the UE being less than or equal to a threshold throughput, or both;
identifying, based at least in part on the satisfaction of the trigger condition, at least one bandwidth associated with a second cell based at least in part on a previous wireless connection between the second cell and the UE, a previous wireless connection between the second cell and an additional UE, or both;
comparing, the at least one bandwidth associated with the second cell with a threshold bandwidth;

selectively adjusting one or more parameters for performing one or more actions associated with the second cell based at least in part on the comparing; and performing at least one action associated with a procedure based at least in part on the adjusting.

22. The method of claim 21, wherein the at least one bandwidth is associated with a channel supported by the second cell, wherein performing the at least one action associated with the procedure comprises:

refraining from completing the procedure associated with the channel supported by the second cell based at least in part on the at least one bandwidth associated with the channel being greater than or equal to the threshold bandwidth.

23. The method of claim 21, wherein the at least one bandwidth is associated with a channel supported by the second cell, wherein performing the at least one action associated with the procedure comprises:

completing the procedure associated with the channel supported by the second cell based at least in part on the at least one bandwidth associated with the channel being less than or equal to the threshold bandwidth.

24. The method of claim 21, wherein identifying the at least one bandwidth associated with the second cell comprises:

determining the at least one bandwidth associated with the second cell based at least in part on the previous wireless connection between the second cell and the UE; and storing the at least one bandwidth in memory.

25. The method of claim 21, further comprising:

transmitting, to a first cell, an uplink transmission indicating the satisfaction of the trigger condition; and receiving, from the first cell based at least in part on transmitting the uplink transmission, a downlink transmission comprising additional information for performing the at least one action associated with the procedure.

26. The method of claim 21, wherein selectively adjusting the one or more parameters comprises:

selectively increasing a reference signal received power threshold, a reference signal received quality threshold, or both.

27. The method of claim 26, the method further comprising:

receiving one or more reference signals from the second cell, the one or more reference signals associated with one or more channels supported by the second cell;

performing a set of measurements for the one or more reference signals received from the second cell; and determining that measurements associated with the one or more channels satisfy the reference signal received power threshold, the reference signal received quality threshold, or both, wherein performing the at least one action is based at least in part on determining that the measurements associated with the one or more channels satisfy the reference signal received power threshold, the reference signal received quality threshold, or both.

28. The method of claim 27, wherein the measurements associated with the one or more channels satisfy the reference signal received power threshold if the measurements are greater than or equal to the reference signal received power threshold, and wherein the measurements associated with the one or more channels satisfy the reference signal received quality threshold if the measurements are greater than or equal to the reference signal received quality threshold.

29. An apparatus for wireless communication at a user equipment (UE), comprising:

a processor;

memory coupled with the processor; and instructions stored in the memory and executable by the processor to cause the apparatus to:

receive a downlink transmission from a first cell, the downlink transmission comprising information for performing one or more actions associated with a second cell;

identify a satisfaction of a trigger condition associated with one or more operational parameters at the UE based at least in part on a power level of the UE being less than or equal to a threshold power level, a throughput at the UE being less than or equal to a threshold throughput, or both;

identify, based at least in part on the satisfaction of the trigger condition, at least one bandwidth associated with the second cell based at least in part on a previous wireless connection between the second cell and the UE, a previous wireless connection between the second cell and an additional UE, or both;

compare, the at least one bandwidth associated with the second cell with a threshold bandwidth; and perform at least one action associated with a procedure based at least in part on the comparing.

30. An apparatus for wireless communication at a user equipment (UE), comprising:

a processor;

memory coupled with the processor; and instructions stored in the memory and executable by the processor to cause the apparatus to:

identify a satisfaction of a trigger condition associated with one or more operational parameters at the UE based at least in part on a power level of the UE being less than or equal to a threshold power level, a throughput at the UE being less than or equal to a threshold throughput, or both;

identify, based at least in part on the satisfaction of the trigger condition, at least one bandwidth associated with a second cell based at least in part on a previous wireless connection between the second cell and the UE, a previous wireless connection between the second cell and an additional UE, or both;

compare, the at least one bandwidth associated with the second cell with a threshold bandwidth;

selectively adjust one or more parameters for performing one or more actions associated with the second cell based at least in part on the comparing; and perform at least one action associated with a procedure based at least in part on the adjusting.

\* \* \* \* \*